United States Patent
Nojiri et al.

(10) Patent No.: US 12,391,174 B2
(45) Date of Patent: Aug. 19, 2025

(54) VEHICLE NOTIFICATION CONTROL DEVICE AND VEHICLE NOTIFICATION CONTROL METHOD

(71) Applicant: DENSO CORPORATION, Kariya (JP)

(72) Inventors: Shota Nojiri, Kariya (JP); Shiori Maneyama, Kariya (JP); Kazuki Izumi, Kariya (JP); Takuya Kume, Kariya (JP)

(73) Assignee: DENSO CORPORATION, Kariya (JP)

( * ) Notice: Subject to any disclaimer, the term of this patent is extended or adjusted under 35 U.S.C. 154(b) by 19 days.

(21) Appl. No.: 18/489,413

(22) Filed: Oct. 18, 2023

(65) Prior Publication Data

US 2024/0042928 A1   Feb. 8, 2024

Related U.S. Application Data

(63) Continuation of application No. PCT/JP2022/018613, filed on Apr. 22, 2022.

(30) Foreign Application Priority Data

Apr. 27, 2021 (JP) .................. 2021-075155
Apr. 14, 2022 (JP) .................. 2022-067146

(51) Int. Cl.
*B60Q 1/50* (2006.01)
*B60W 30/18* (2012.01)
(Continued)

(52) U.S. Cl.
CPC ............ *B60Q 1/543* (2022.05); *B60Q 1/507* (2022.05); *B60W 30/18154* (2013.01);
(Continued)

(58) Field of Classification Search
CPC . B60Q 1/543; B60Q 1/507; B60W 30/18154; B60W 30/18163; B60W 40/08;
(Continued)

(56) References Cited

U.S. PATENT DOCUMENTS 11,285,966 B2 * 3/2022 Whikehart ........ B60W 50/0205
2016/0355122 A1 * 12/2016 Cotter .................... B60Q 1/507
(Continued)

FOREIGN PATENT DOCUMENTS

| JP | 2017007417 A | 1/2017 |
|----|--------------|--------|
| JP | 2019156266 A | 9/2019 |
| JP | 2020059389 A | 4/2020 |

OTHER PUBLICATIONS

U.S. Appl. No. 18/489,069, filed Oct. 18, 2023, Shota Nojiri et al.
(Continued)

*Primary Examiner* — Mohamed Barakat
(74) *Attorney, Agent, or Firm* — Harness, Dickey & Pierce, P.L.C.

(57) ABSTRACT

By a vehicle notification control device or a vehicle notification control method, an automated driving-related state is identified, a vehicle exterior notification device is controlled for performing vehicle exterior notification that is notification of information related to the automated driving toward an outside of the vehicle; and an execution timing of the vehicle exterior notification is changed according to the identified automated driving-related state.

34 Claims, 20 Drawing Sheets

(51) Int. Cl.
*B60W 40/08* (2012.01)
*B60W 50/14* (2020.01)
*B60W 60/00* (2020.01)
*G06V 20/59* (2022.01)

(52) U.S. Cl.
CPC ...... *B60W 30/18163* (2013.01); *B60W 40/08* (2013.01); *B60W 50/14* (2013.01); *B60W 60/0059* (2020.02); *G06V 20/597* (2022.01); *B60W 2040/0818* (2013.01); *B60W 2050/143* (2013.01); *B60W 2050/146* (2013.01); *B60W 2420/403* (2013.01); *B60W 2540/12* (2013.01); *B60W 2540/225* (2020.02); *B60W 2540/229* (2020.02); *B60W 2554/802* (2020.02)

(58) Field of Classification Search
CPC ............. B60W 50/14; B60W 60/0059; B60W 2040/0818; B60W 2050/143; B60W 2050/146; B60W 2420/403; B60W 2540/12; B60W 2540/225; B60W 2540/229; B60W 2554/802; G06V 20/597
See application file for complete search history.

(56) References Cited

U.S. PATENT DOCUMENTS

| 2017/0106790 A1* | 4/2017 | Huntzicker | ............ G08B 21/24 |
| 2019/0265700 A1* | 8/2019 | Honda | .................. B60W 50/14 |
| 2020/0110407 A1* | 4/2020 | Miura | .................... B60W 50/14 |
| 2020/0114816 A1* | 4/2020 | Morimura | ............. B60Q 1/442 |
| 2021/0078491 A1 | 3/2021 | Morimura | |
| 2021/0188159 A1* | 6/2021 | Fukutaka | ................. B60Q 1/46 |

OTHER PUBLICATIONS

U.S. Appl. No. 18/489,139, filed Oct. 18, 2023, Shota Nojiri et al.

* cited by examiner

| PERIPHERAL SITUATION | VE EXTERIOR NOTIFICATION |
|---|---|
| VE EXIST | RE NOTIFICATION |
| NO VE EXIST | NONE |

FIG. 26

| STATE AT VE LANE CHANGE | VE NOTIFICATION TYPE | TURN LAMP STATE |
|---|---|---|
| DURING PERIPHERY MONITORING | — | BLINKING |
| DURING NO PERIPHERY MONITORING | LIGHTING | BLINKING |

FIG. 27

| STATE AT VE LANE CHANGE | VE LANE CHANGE DIRECTION | PORTION OF WAITING NOTIFICATION |
|---|---|---|
| WAITING STATE | RIGHT SIDE | RIGHT SIDE PORTION |
|  | LEFT SIDE | LEFT SIDE PORTION |
| NON-WAITING STATE |  | NONE |

FIG. 32
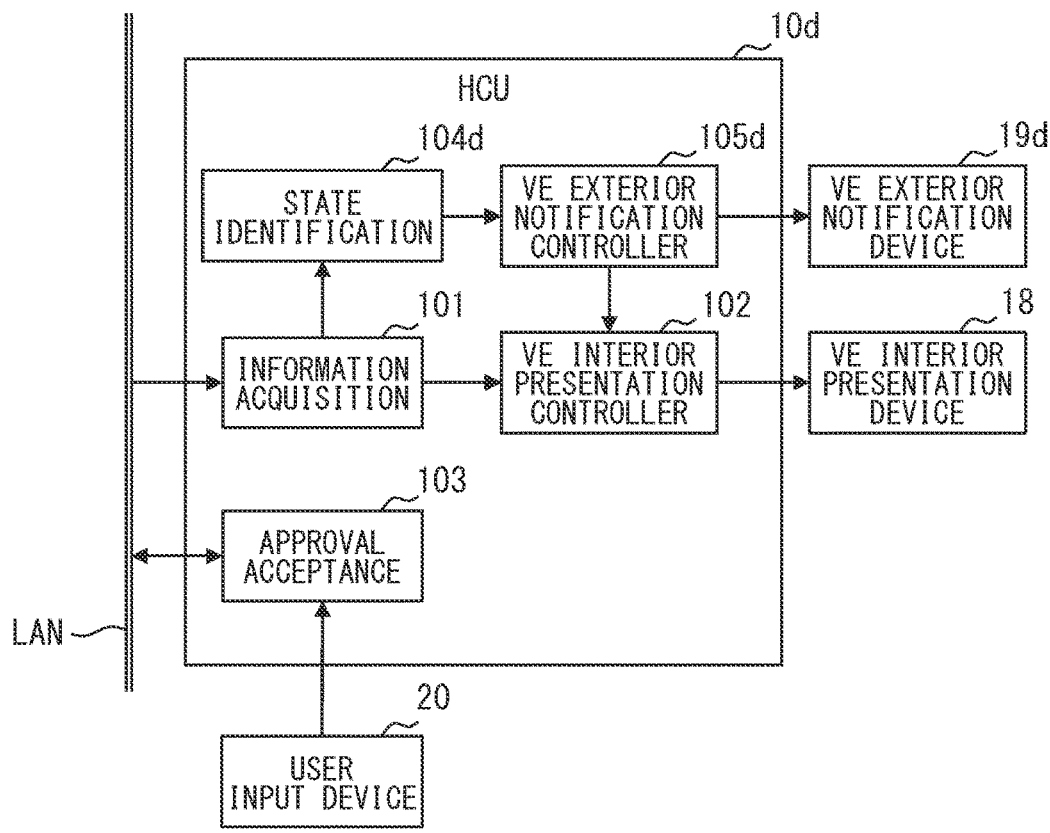
FIG. 33
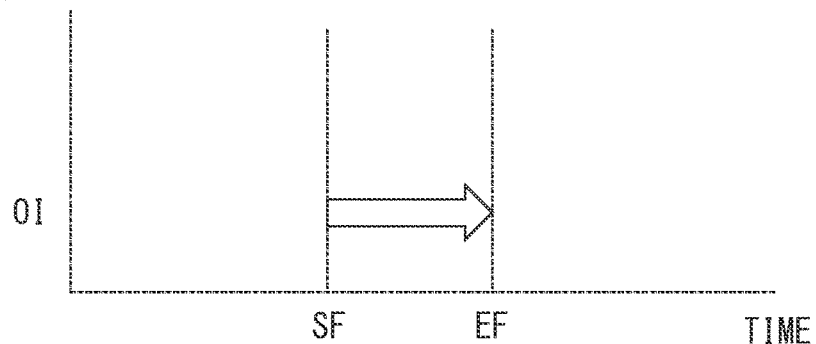
FIG. 34
| FOLLOWING STATE | VE NOTIFICATION TYPE |
|---|---|
| VE SPEED ADJUSTMENT | BLINKING |
| CONSTANT SPEED TRAVELING | LIGHTING |

VEHICLE NOTIFICATION CONTROL DEVICE AND VEHICLE NOTIFICATION CONTROL METHOD

CROSS REFERENCE TO RELATED APPLICATIONS

The present application is a continuation application of International Patent Application No. PCT/JP2022/018613 filed on Apr. 22, 2022, which designated the U.S. and claims the benefit of priority from Japanese Patent Application No. 2021-075155 filed on Apr. 27, 2021 and the benefit of priority from Japanese Patent Application No. 2022-067146 filed on Apr. 14, 2022. The entire disclosures of all of the above applications are incorporated herein by reference.

TECHNICAL FIELD

The present disclosure relates to a vehicle notification control device and a vehicle notification control method.

BACKGROUND

In a technology of a comparative example, a display device is attached to a roof of a subject vehicle and displays a state of "during automated driving" while the subject vehicle performs the automated driving.

SUMMARY

By a vehicle notification control device or a vehicle notification control method, an automated driving-related state is identified, a vehicle exterior notification device is controlled for performing vehicle exterior notification that is notification of information related to the automated driving toward an outside of the vehicle; and an execution timing of the vehicle exterior notification is changed according to the identified automated driving-related state.

BRIEF DESCRIPTION OF THE DRAWINGS

FIG. 26 is a diagram for illustrating an example of changing the vehicle exterior notification according to whether the driver monitors the periphery.
FIG. 27 is a diagram illustrating an example of changing the vehicle exterior notification according to a situation of the lane change.

FIG. 32 is a diagram showing an example of a configuration of an HCU.

FIG. 33 is a diagram illustrating an example of a timing of the vehicle exterior notification according to a following situation of the subject vehicle.

FIG. 34 is a diagram illustrating an example of changing the vehicle exterior notification when the vehicle exterior notification is performed in a case where the vehicle follows the preceding vehicle.

DETAILED DESCRIPTION

Figure 1:
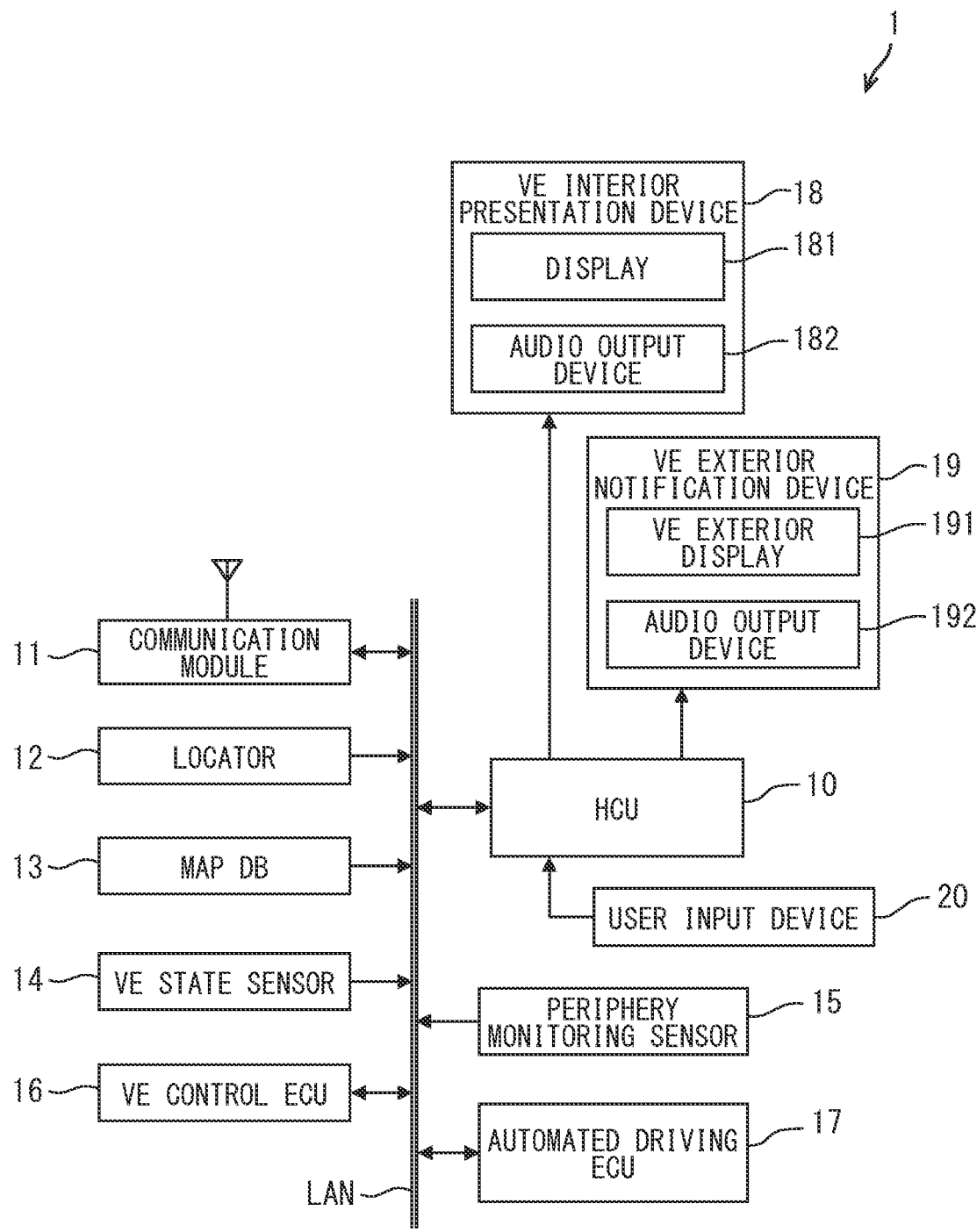
FIG. 1 is a diagram showing an example of a schematic configuration of a vehicle system.

In automated driving, a system control and driver behavior differ depending on an automation level. On the other hand, in the comparative example, only a notification indicating that the vehicle is "automatically driving (in other words, performing the automated driving)" is provided to the outside of the vehicle while the subject vehicle is automatically driving. Therefore, according to the technology of the comparative example, it is difficult to perform vehicle exterior notification that is more preferable for the periphery of the subject vehicle, depending on the state of the vehicle related to automated driving.

One example of the present disclosure provides a vehicle notification control device and a vehicle notification control method capable of performing notification related to automated driving towards an outside of a vehicle according to a vehicle state related to the automated driving in a manner that is more preferable for the periphery of the vehicle, when the vehicle performs the automated driving.

According to one example embodiment, a vehicle notification control device is used for a vehicle capable of: performing automated driving at a plurality of automation levels; and switching the plurality of automation levels each indicating a degree of the automated driving. The vehicle notification control device includes: a state identification unit configured to identify an automated driving-related state that is a state of the vehicle, the state being related to the automated driving; and a vehicle exterior notification controller configured to control a vehicle exterior notification device that performs vehicle exterior notification that is notification of information related to the automated driving toward an outside of the vehicle. The vehicle exterior notification controller changes an execution timing of the vehicle exterior notification according to the automated driving-related state identified by the state identification unit.

According to another example embodiment, a vehicle notification control method is used for a vehicle capable of: performing automated driving at a plurality of automation levels; and switching the plurality of automation levels each indicating a degree of the automated driving. The vehicle notification control method includes causing at least one processor to: identify an automated driving-related state that is a state of the vehicle, the state being related to the automated driving; control a vehicle exterior notification device that performs vehicle exterior notification that is notification of information related to the automated driving toward an outside of the vehicle; and change an execution timing of the vehicle exterior notification according to the identified automated driving-related state.

According to the examples, it is possible to change the timing of performing the vehicle exterior notification, which is the notification of information regarding the automated driving and provided to the outside of the vehicle, according to the vehicle state regarding the automated driving. Therefore, it becomes possible to execute the vehicle exterior notification at a timing that is more preferable for the periphery of the vehicle, according to the state of the vehicle related to automated driving. As the result, it is possible to perform the notification related to automated driving towards an outside of a vehicle according to a vehicle state related to the automated driving in a manner that is more preferable for the periphery of the vehicle, when the vehicle performs the automated driving.

The following will describe embodiments of the present disclosure with reference to the accompanying drawings.

First Embodiment

<Schematic Configuration of Vehicle System>

Hereinafter, a first embodiment according to the present disclosure will be described with reference to the drawings. A vehicle system 1 shown in FIG. 1 can be used for a vehicle configured to perform automated driving (hereinafter referred to as an automated driving vehicle). In the drawings, the term of "vehicle" may be also referred to as "VE". As shown in FIG. 1, the vehicle system 1 includes an HCU (Human Machine Interface Control Unit) 10, a communication module 11, a locator 12, a map database (hereinafter referred to as map DB) 13, a vehicle state sensor 14, a periphery monitoring sensor 15, a vehicle control ECU 16, an automated driving ECU 17, a vehicle interior presentation device 18, a vehicle exterior notification device 19, and a user input device 20. For example, the HCU 10, the communication module 11, the locator 12, the map DB 13, the vehicle state sensor 14, the periphery monitoring sensor 15, the vehicle control ECU 16, and the automated driving ECU 17 are connected to a vehicle interior LAN (see LAN in FIG. 1). Although the vehicle using the vehicle system 1 is not necessarily limited to an automobile, hereinafter, an example using the automobile will be described.

The degree of the automated driving (hereinafter, referred to as an automation level) of an automated driving vehicle includes a plurality of levels as defined by, for example, SAE. This automation level is classified into, for example, five levels including LV 0 to LV 5 as follows.

The LV 0 is a level where the driver performs all driving tasks without any intervention of the system of the vehicle. The driving task may be rephrased as a dynamic driving task. The driving tasks are, for example, steering, acceleration and deceleration, and periphery monitoring. The LV 0 corresponds to so-called manual driving. The LV 1 is a level at which the system supports either the steering or the acceleration and deceleration. The LV 1 corresponds to so-called driving assistance. The LV 2 is a level at which the system supports both the steering and the acceleration and deceleration. The LV 2 corresponds to so-called partial driving automation. The LVs 1 and 2 are a part of the automated driving.

For example, the automated driving at LVs 1 and 2 is automated driving in which a driver has an obligation of monitoring related to safe driving (hereinafter simply referred to as a monitoring obligation). Examples of the monitoring obligation include periphery monitoring by visual observation. The autonomous driving at LV1 and 2 can be referred to as automated driving in which a second task is not permitted. The second task is an action other than driving permitted for the driver, and is a specific action defined in advance. The second task can also be referred to as a secondary activity, other activities, or the like. The second task must not prevent the driver from responding to a request to take over a driving operation from an automated driving system. As an example, viewing of a content such as a video, operation of a smartphone, reading, and eating are assumed as the second task.

The LV 3 of the automated driving is a level where the system performs all driving tasks under certain conditions, and the driver performs the driving operation in an emergency situation. In the LV 3 of the automated driving, the driver must be able to respond quickly when the system requests to take over the driving operation. This takeover of the driving can also be rephrased as transfer of the monitoring obligation from the system of the vehicle to the driver. The LV 3 corresponds to a conditional driving autonomation. The LV 3 includes an area limit LV 3 limited to a specific area. The specific area described here may be an automobile road or an expressway. The specific area may be, for example, a specific lane. The LV 3 includes a specific situation limit LV 3 limited to the specific peripheral situation. An example of the specific peripheral situation is traffic congestion. Hereinafter, as the specific situation limit LV 3, a traffic congestion limit LV 3 that is limited to the traffic congestion will be described as an example. The traffic congestion limit LV 3 may be limited to traffic congestion in, for example, the automobile road, and the expressway.

The LV 4 of the automated driving is a LV where the system is capable of performing all driving tasks, except under a specific circumstance, such as an unsupported road, an extreme environment, and the like. The LV 4 corresponds to a high driving automation. The LV 5 of the automated driving is a level at which the system can perform all the driving tasks under all environments. The LV 5 corresponds to a full driving automation.

For example, the automated driving at LVs 3 to 5 is an automated driving in which the driver does not have the monitoring obligation. In other words, the automated driving corresponds to automated driving without the monitoring obligation. The automated driving at LVs 3 to 5 is, in other words, automated driving in which the second task is permitted. Among the automated driving at LVs 3 to 5, the automated driving at LV 4 or higher is automated driving in which the driver is permitted to sleep (hereinafter referred to as sleep-permitted automated driving). Among the automated driving at LVs 3 to 5, the automated driving at LV 3 or higher is automated driving in which the driver is permitted to sleep (hereinafter referred to as sleep-unpermitted automated driving).

The automated driving vehicle of the present embodiment is capable of switching the automation level. The automation levels may be configured to be switchable only between a part of the levels among LV 0 to 5. In the present embodiment, an example will be described in which an automated driving vehicle is capable of switching between the automated driving at the LV 3, the automated driving at the LV 2 or lower, or manual driving at the LV 0.

The communication module 11 transmits and receives information to and from a center outside the subject vehicle via wireless communications. That is, wide area communication is performed. The communication module 11 receives traffic congestion information related to the periphery of the subject vehicle from the center via the wide area communication. The communication module 11 may transmit and receive information to and from other vehicles via the wireless communication. In other words, the communication module 11 may perform a vehicle-to-vehicle communication. The communication module 11 may transmit and receive information via the wireless communication with a roadside device installed on a roadside. In other words, the communication module 11 may perform a road-to-vehicle communication. When performing the road-to-vehicle communication, the communication module 11 may receive peripheral vehicle information transmitted from the vehicle positioned in the peripheral of the subject vehicle via the roadside device. Further, the communication module 11 may receive information about a peripheral vehicle transmitted from the vehicle positioned in the periphery of the subject vehicle via the center by the wide area communication.

The locator 12 includes a GNSS (Global Navigation Satellite System) receiver and an inertial sensor. The GNSS receiver receives positioning signals from multiple positioning satellites. The inertial sensor includes, for example, a gyro sensor and an acceleration sensor. The locator 12 combines the positioning signals received by the GNSS receiver with a measurement result of the inertial sensor to sequentially detect the position of the subject vehicle (hereinafter, subject vehicle position) on which the locator 12 is mounted. The subject vehicle position may be represented by, for example, coordinates of latitude and longitude. The subject vehicle position may be measured by using a travel distance acquired from signals sequentially output from a vehicle speed sensor mounted on the vehicle.

The map DB 13 is a non-volatile memory and stores the high-precision map data. The high-precision map data is map data with higher precision than the map data used for route guidance in a navigation function. The map DB 13 may also store map data used for route guidance. The high-precision map data includes information that can be used for the automated driving operation, such as, for example, three-dimensional road shape information, information on the number of lanes, and information indicating the traveling direction allowed for each lane. In addition, the high-precision map data may also include, for example, a node point information indicating the positions of both ends of a road marking such as a lane marking. The locator 12 may be configured without the GNSS receiver by using the three-dimensional shape information of the road. For example, the locator 12 may be configured to identify the subject vehicle position by using the three-dimensional shape information of the road and a detection result of the periphery monitoring sensor 15 such as a LiDAR (Light Detection and Ranging/Laser Imaging Detection and Ranging) that detects feature points of the road shape and the structure or a periphery monitoring camera. The term of "identify" may also mean a term of "determine". The three-dimensional shape information of the road may be generated based on a captured image by REM (Road Experience Management).

The communication module 11 may receive map data distributed from an external server through, for example, wide area communications and may store the data in the map DB 13. In this case, the map DB 13 may be a volatile memory, and the communication module 11 may sequentially acquire the map data of an area corresponding to the subject vehicle position.

The vehicle state sensor 14 is a sensor group for detecting various states of the subject vehicle. The vehicle state sensor 14 includes a vehicle speed sensor for detecting a vehicle speed, a steering sensor for detecting a steering angle, and the like. The vehicle state sensor 14 includes a steering torque sensor, an accelerator sensor, a brake sensor, and the like. The steering torque sensor detects a steering torque applied to the steering wheel. The accelerator sensor detects whether the accelerator pedal is depressed. As the accelerator sensor, an accelerator depression force sensor that detects the depression force applied to the accelerator pedal may be used. As the accelerator sensor, an accelerator stroke sensor that detects the depression amount of the accelerator pedal may be used. As the accelerator sensor, an accelerator switch that outputs a signal corresponding to whether the accelerator pedal is depressed may be used. The brake sensor detects whether the brake pedal is depressed. As the brake sensor, a brake depressing force sensor that detects the depressing force applied to the brake pedal may be used. A brake stroke sensor that detects the amount of depression of the brake pedal may be used as the brake sensor. As the brake sensor, a brake switch that outputs a signal corresponding to whether the brake pedal is depressed may be used. The vehicle state sensor 14 outputs detected sensing information to the vehicle interior LAN. Note that the sensing information detected by the vehicle state sensor 14 may be output to the vehicle interior LAN via an ECU mounted on the subject vehicle.

The periphery monitoring sensor 15 monitors a peripheral environment of the subject vehicle. For example, the periphery monitoring sensor 15 detects an obstacle around the subject vehicle, such as a pedestrian, a moving object like another vehicle, and a stationary object, and an object on the road. The periphery monitoring sensor 15 further detects a road surface marking such as a traffic lane marking around the subject vehicle. The periphery monitoring sensor 15 is, for example, a sensor such as a periphery monitoring camera that captures a predetermined range in the periphery of the subject vehicle, a millimeter wave radar that transmits a search wave in a predetermined range around the subject vehicle, a sonar, or a LiDAR. The periphery monitoring camera sequentially outputs, as sensing information, sequentially captured images to the automated driving ECU 17. A sensor that transmits a probe wave such as a sonar, a millimeter wave radar, a LiDAR or the like sequentially outputs, as the sensing information to the automated driving ECU 17, a scanning result based on a received signal acquired as a wave reflected on an obstacle on the road. The sensing information detected by the periphery monitoring sensor 15 may be outputted to the vehicle interior LAN via the automated driving ECU 17.

The vehicle control ECU 16 is an electronic control unit configured to perform a traveling control of the subject vehicle. The traveling control includes an acceleration and deceleration control and/or a steering control. The vehicle control ECU 16 includes a steering ECU that performs the steering control, a power unit control ECU and a brake ECU that perform the acceleration and deceleration control, and the like. The vehicle control ECU 16 is configured to output a control signal to a traveling control device such as an electronic throttle, a brake actuator, and an EPS (Electric Power Steering) motor mounted on the subject vehicle thereby to perform the traveling control.

The automated driving ECU 17 includes, for example, a processor, a memory, an I/O, and a bus that connects those devices, and executes a control program stored in the memory thereby to execute a process related to the autonomous driving operation. The memory referred to here is a non-transitory tangible storage medium, and stores programs and data that can be read by a computer. The non-transitory tangible storage medium may be provided by a semiconductor memory, a magnetic disk, or the like. The automated driving ECU 17 includes, as functional blocks, a traveling environment recognition unit, a behavior determination unit, and a control execution unit.

The traveling environment recognition unit recognizes a traveling environment in the periphery of the subject vehicle based on the sensing information acquired from the periphery monitoring sensor 15. The traveling environment recognition unit recognizes the traveling environment in the periphery of the subject vehicle based on, in addition to the sensing information, which is acquired from the periphery monitoring sensor 15, the subject vehicle position, which is acquired from the locator 12, the map data, which is acquired from the map DB 13 and the like. As an example, the traveling environment recognition unit uses these pieces of information to generate a virtual space that reproduces an actual driving environment.

The traveling environment recognition unit may determine a manual driving area (hereinafter referred to as an MD area) in a travelling area of the subject vehicle. The traveling environment recognition unit may determine an automated driving area (hereinafter referred to as an AD area) in the travelling area of the subject vehicle. The traveling environment recognition unit may also discriminate between an ST section and a non-ST section, which will be described later, in the AD area.

The MD area is an area where the automated driving is prohibited. In other words, the MD area is an area where the driver performs all of the longitudinal control, the lateral control and the peripheral monitoring of the subject vehicle. The longitudinal direction is a direction that coincides with a front-rear direction of the subject vehicle. The lateral direction is a direction that coincides with a right-left direction of the subject vehicle. The longitudinal direction control corresponds to acceleration-deceleration control of the subject vehicle. The lateral direction control corresponds to steering control of the subject vehicle. For example, the MD area may be a general road.

The AD area is an area where the automated driving is permitted. In other words, the AD area is defined as an area in which the subject vehicle can replace the driver to execute one or more of the longitudinal direction control, the lateral direction control, and the periphery monitoring. For example, the AD area may be the expressway or the automobile road. The automated driving at the traffic congestion limit LV 3 (hereinafter referred to as traffic congestion limit automated driving) may be configured, for example, to be permitted only during the traffic congestion in the AD area.

The AD area is divided into an ST section and a non-ST section. The ST section is a section in which the automated driving at the area limit LV 3 (hereinafter referred to as area limit automated driving) is permitted. The area limit automated driving may be configured to be permitted only in specific lanes in the ST section. The non-ST section is a section in which the automated driving at LV 2 or lower is possible. In the present embodiment, the non-ST section in which the autonomous driving at LV1 is permitted and the non-ST section in which the automated driving at LV 2 is permitted are not divided. The ST section may be, for example, a traveling section in which the high accuracy map data is prepared. The non-ST section may be set to a section that does not correspond to the ST section in the AD area.

The behavior determination unit switches the control subject of driving operation control between the driver and the vehicle system of the subject vehicle. The behavior determination unit determines a traveling plan to travel the subject vehicle based on the recognition result of the traveling environment by the traveling environment recognition unit when the system has a right to control the driving operation. As the traveling plan, it is sufficient to determine the route to the destination and the behavior that enables the subject vehicle to reach the destination. Examples of the behavior include going straight, turning right, turning left, changing lanes, and the like. The control execution unit performs traveling control such as acceleration-deceleration control and steering control of the subject vehicle according to the traveling plan determined by the behavior determination unit in cooperation with the vehicle control ECU 16 when the system has the right to control the driving operation.

In addition, the behavior determination unit switches the automation level of automated driving of the subject vehicle as necessary. The behavior determination unit determines whether the automation level can be increased. For example, the switching from the manual driving to the automated driving at LV 2 or lower may be determined to be possible, when the subject vehicle moves from the MD area to the non-ST section in the AD area. The switching from the manual driving at LV 0 to the automated driving at the area limit LV 3 may be determined to be possible, when the subject vehicle moves from the MD area to the ST section in the AD area. When the subject vehicle moves from the non-ST section to the ST section in the AD area, it may be determined that the automated driving at LV 2 or lower can be switched to the automated driving at LV 3. When the subject vehicle is located in the AD area, the automation level is LV 2 or lower, and all the conditions for the traffic congestion limit LV 3 are satisfied, it may be determined that switching from the automated driving at LV 2 or lower to the traffic congestion limit LV 3 is possible.

The behavior determination unit may increase the automation level when it determines that the automation level can be increased and when the driver approves the increase in the automation level. The approval operation by the driver may be specified based on the approval received by the HCU 10 via the user input device 20. The approval includes advance approval that is performed before it is determined that the automation level can be increased, and normal approval that is performed when it is determined that the automation level can be increased. The advance approval may be performed by receiving setting inputs in advance through the user input device 20. The normal approval may be performed by receiving an input through the user input device 20, for example, when it is determined that the automation level can be raised and advance approval has not been given. The advance approval may be enabled only when the automation level is increased to a predetermined level or higher. For example, it may be possible only when the automation level is LV 3 or higher.

The behavior determination unit may decrease the automation level when determining that the automation level needs to be decreased. Cases where it is determined that the automation level needs to be lowered include the time of override detection, the time of planned driving change, and the time of unplanned driving change. The override is an operation for the driver of the subject vehicle to voluntarily acquire the control right of the subject vehicle. In other words, the override is an operational intervention by the driver of the vehicle. The behavior determination unit may detect the override operation from sensing information obtained from the vehicle state sensor 14. For example, the behavior determination unit may detect the override operation when the steering torque detected by the steering torque sensor exceeds a threshold. Also, the behavior determination unit may detect the override operation when the accelerator sensor detects depression of the accelerator pedal. In addition, the behavior determination unit may detect the override operation when the brake sensor detects depression of the brake pedal.

A scheduled driving change is a scheduled driving change determined by the system. For example, the scheduled driver change is performed when the subject vehicle moves from the ST section of the AD area to the non-ST section or the MD area. In this case, the automation level drops from the area limit LV 3 to LV 2 or lower. The scheduled driver change may be performed when the subject vehicle moves from the non-ST section of the AD area to the MD area. In this case, the automation level drops from the area limit LV 3 to LV 0. The unscheduled driving change is an unscheduled sudden driving change determined by the system. For example, the unscheduled driver change is performed when the conditions of traffic congestion limit LV 3 are no longer satisfied during the automated driving of traffic congestion limit LV 3. In this case, the automation level drops from the traffic congestion limit LV 3 to LV 2 or lower. A plurality of types of conditions may be used as the conditions for the traffic congestion limit LV 3. Example of the conditions may be that the vehicle is within the AD area, that the vehicle speed of the preceding vehicle or the subject vehicle is equal to or less than a threshold for estimating the traffic congestion, and that the vehicle is in the traffic congestion section according to the traffic congestion information. The unscheduled driver change may be performed when the automation level cannot be maintained due to a failure in the recognition of the traveling environment by the traveling environment recognition unit.

When the automation level is lowered by the override, the automated driving ECU 17 lowers the automation level after an auxiliary period in which the system of the subject vehicle performs more driving assistance than that at the lowered automation level. The degree of the traveling assistance during the auxiliary period may be, for example, less than that at the automation level that is not lowered, but greater than that at the lowered automation level. Further, when the automation level is lowered due to the driving change determined by the system of the subject vehicle, the automated driving ECU 17 makes a driving change request to the driver of the subject vehicle and then lowers the automation level. The driving change request is presented to the driver by the vehicle interior presentation device 18, which will be described later. When receiving the driving change request, the driver takes a preparatory action necessary for lowering the automation level, such as gripping the steering wheel. After confirming that this preparation action has been taken, the automated driving ECU 17 lowers the automation level. When the preparatory action is not performed, measures such as evacuating to the road shoulder and stopping the vehicle may be taken.

The vehicle interior presentation device 18 presents information to the interior of the subject vehicle. The vehicle interior presentation device 18 has a display 181 and an audio output device 182. The display 181 presents information by displaying information. The display 181 presents information according to instructions from the HCU 10. As the display 181, for example, a meter MID (Multi Information Display), CID (Center Information Display), HUD (Head-Up Display) can be used.

The meter MID is a display device provided in front of the driver's seat in the vehicle compartment. As an example, the meter MID may be provided in a meter panel. The CID is a display device disposed at a center of an instrument panel of the subject vehicle. The HUD is provided in, for example, the instrument panel in the vehicle cabin. The HUD projects a display image formed by an projector onto a predetermined projection area on a front windshield as a projection member. A light of the display image reflected by the front windshield to an inside of a vehicle compartment is perceived by the driver seated in the driver's seat. As a result, the driver can visually recognize a virtual image of the display image formed in front of the front windshield which is superimposed on a part of the foreground landscape. The HUD may be configured to project the display image onto a combiner provided in front of the driver's seat instead of the front windshield.

The audio output device 182 presents information by outputting audio. As the audio output device 182, a speaker or the like provided in the vehicle interior of the subject vehicle can be used.

The vehicle exterior notification device 19 performs vehicle exterior notification, which is information related to the automated driving, to the outside of the subject vehicle. The vehicle exterior notification device 19 has a vehicle exterior display 191 and an audio output device 192. The vehicle exterior display 191 is installed on the vehicle exterior of the subject vehicle and performs display toward the exterior of the subject vehicle. The vehicle exterior display 191 may be configured to perform display by emitting light from a lamp. Hereinafter, a case where the vehicle exterior display 191 is the lamp will be described as an example. The vehicle exterior display 191 may be a display that shows a text, an image, and the like.

For example, an LED lamp may be used as the vehicle exterior display 191. It is preferable that the vehicle exterior display 191 is capable of changing various notification modes. The mode of notification corresponds to the mode using light emission when the notification is performed by the light emission. For example, it is preferable that the vehicle exterior display 191 is capable of switching lighting color in addition to switching between an on-state and an off-state of the lighting. The switching of the lighting color may be implemented by changing the lighting combination of the LEDs of a plurality of colors. It is preferable that the vehicle exterior display 191 is capable of blinking. It is preferable that the vehicle exterior display 191 is capable of changing a blinking cycle. It is preferable that the vehicle exterior display 191 is capable of changing a ratio between the on-state time and the off-state time of the light.

Figure 2:
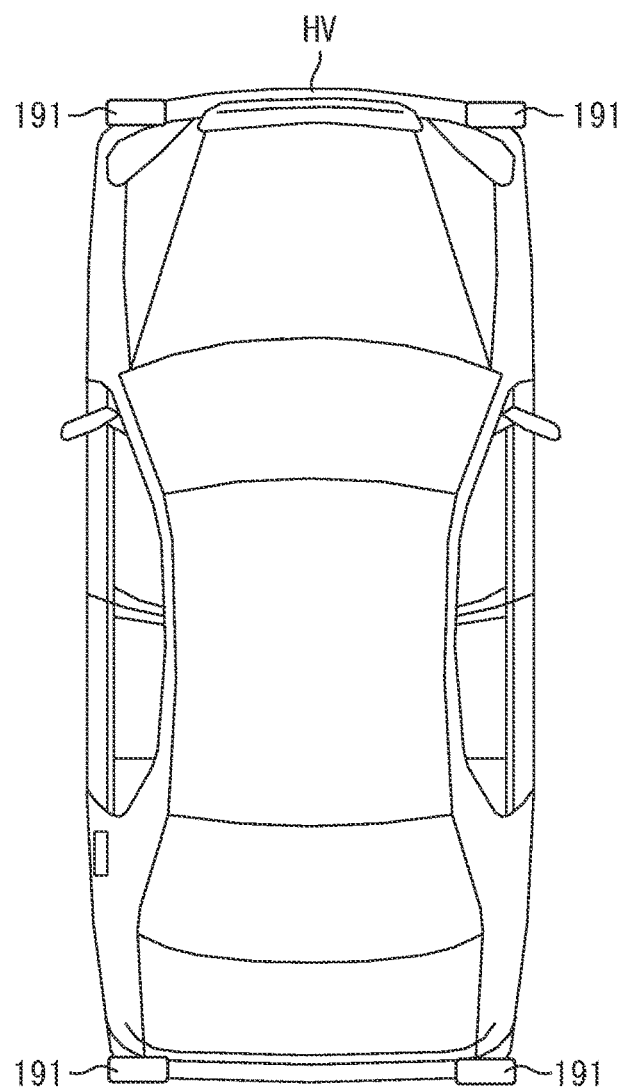
FIG. 2 is a diagram for illustrating an installation example of a vehicle exterior display.

As shown in FIG. 2, it is preferable that the LED lamps as the vehicle exterior displays 191 are provided at four corners of the subject vehicle. This is because the vehicle exterior displays 191 can be easily confirmed from any direction in the periphery of the subject vehicle. For example, the vehicle exterior displays 191 may be provided at the left and right corner portions of a front bumper and the left and right corner portions of a rear bumper, respectively. In FIG. 2, the HV indicates the subject vehicle.

Figure 3:
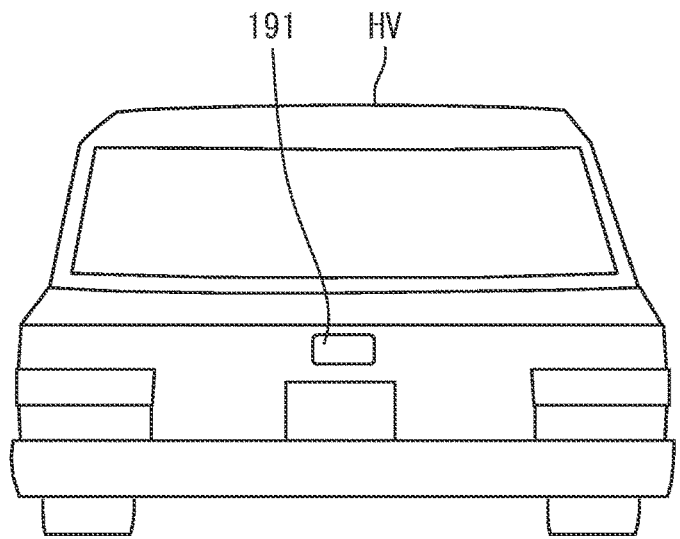
FIG. 3 is a diagram for illustrating an installation example of the vehicle exterior display.

As shown in FIG. 3, one LED lamp serving as the vehicle exterior display 191 may be provided in the vicinity of the central portion in the vehicle width direction of the rear portion of the vehicle. According to this, at least, the vehicle, which follows the subject vehicle and is most affected by the behavior of the subject vehicle, can easily check the vehicle exterior display 191.

The audio output device 192 presents information by outputting audio. As the audio output device 192, a speaker or the like provided on the vehicle exterior of the subject vehicle can be used.

The user input device 20 accepts input from the user. The user input device 20 may be an operation device that receives an operation input from the user. The operation device may be a mechanical switch or a touch switch integrated with the display 181. The user input device 20 is not limited to the operation device that accepts the operation input, as long as the user input device 20 is a device that accepts input from the user. For example, the user input device 20 may be an audio input device that receives command input by an audio such as a voice from the user.

The HCU 10 mainly includes a computer including a processor, a volatile memory, a nonvolatile memory, an I/O, and a bus connecting these devices. The HCU 10 is connected to the vehicle interior presentation device 18 and the vehicle exterior notification device 19. The HCU 10 executes processes related to control of the vehicle interior presentation device 18 and the vehicle exterior notification device 19 by executing a control program stored in the non-volatile memory. This HCU 10 corresponds to a vehicle notification control device. The configuration of the HCU 10 will be described in detail below. Execution of a process of each functional block of the HCU 10 by the computer corresponds to execution of a vehicle notification control method.

<Schematic Configuration of HCU>

Figure 4:
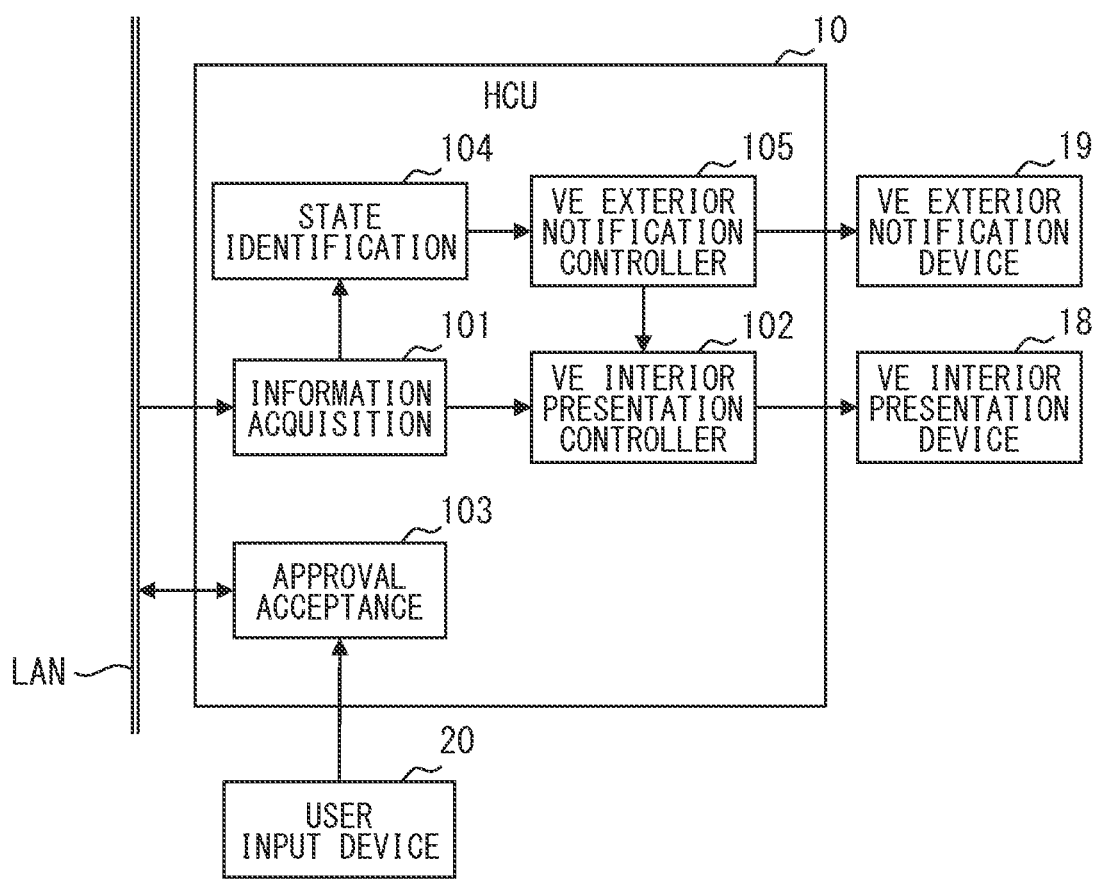
FIG. 4 is a diagram showing an example of a configuration of an HCU.

Next, a schematic configuration of the HCU 10 will be described with reference to FIG. 4. As shown in FIG. 4, the HCU 10 includes an information acquisition unit 101, a vehicle interior presentation controller 102, an approval acceptance unit 103, a state identification unit 104, and a vehicle exterior notification controller 105 as functional blocks regarding the control of the vehicle interior presentation device 18 and the vehicle exterior notification device 19. Some or all of the functions executed by the HCU 10 may be implemented in hardware manner using one or more ICs or the like. Alternatively, some or all of the functions executed by the HCU 10 may be implemented by a combination of execution of software by a processor and a hardware device.

The information acquisition unit 101 acquires information input from the outside of the HCU 10. The information acquisition unit 101 acquires the recognition result of the traveling environment recognition unit of the automated driving ECU 17, for example. The information acquisition unit 101 acquires the determination result of the behavior determination unit of the automated driving ECU 17. The information acquisition unit 101 acquires sensing information detected by the vehicle state sensor 14.

The vehicle interior presentation controller 102 controls the vehicle interior presentation device 18. The vehicle interior presentation controller 102 causes the display 181 to display an image showing a foreground of the subject vehicle (hereinafter referred to as a foreground image). The vehicle interior presentation controller 102 may display the foreground image on the display 181 using the recognition result of the traveling environment recognition unit acquired by the information acquisition unit 101. For example, the foreground image may be a bird's-eye view viewed from a virtual viewpoint above the subject vehicle.

Figure 5:
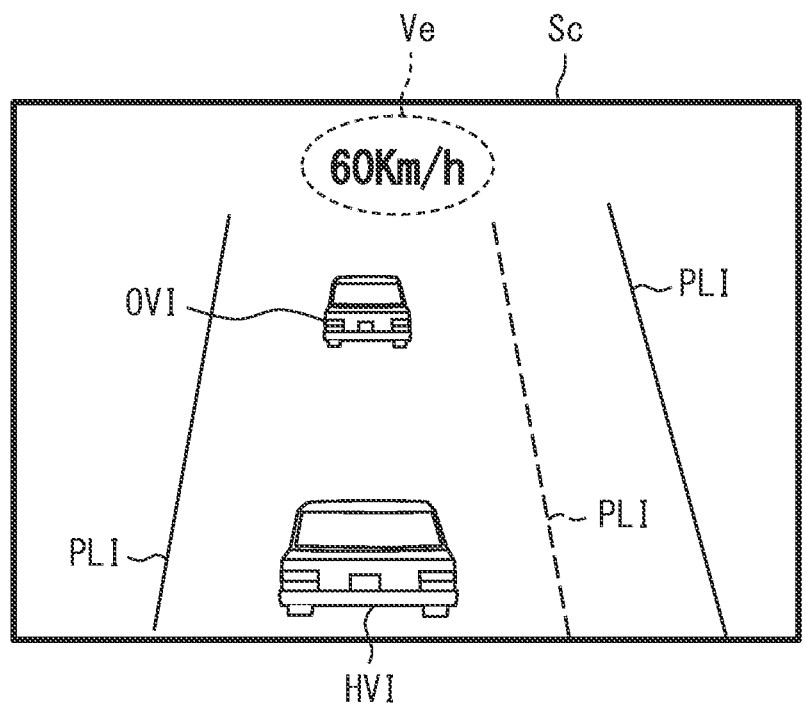
FIG. 5 is a diagram for illustrating an example of a foreground image displayed on a display.

An example of the foreground image will be described with reference to FIG. 5. Sc in FIG. 5 shows a display screen of the display 181. HVI in FIG. 5 shows an image representing the subject vehicle (hereinafter referred to as the subject vehicle image). OVI in FIG. 5 shows an image representing a peripheral vehicle of the subject vehicle (hereinafter referred to as a peripheral vehicle image). PLI in FIG. 5 shows an image representing a lane marking (hereinafter referred to as a lane marking image). VI in FIG. 5 shows an image representing a vehicle speed of the subject vehicle (hereinafter referred to as a subject vehicle speed image). As the foreground image, as shown in FIG. 5, a subject vehicle image, a peripheral vehicle image, the lane marking image, and a subject vehicle speed image may be displayed. In the foreground image, the subject vehicle image and the peripheral vehicle image that simulate an actual positional relationship between the subject vehicle and the peripheral vehicle may be displayed.

The approval acceptance unit 103 accepts approval for increasing the automation level from the driver via the user input device 20. As described above, this approval includes the advance approval and the normal approval. The advance approval may be performed, for example, before the subject vehicle starts traveling. As for the advance approval, it may be possible to approve only the increase between specific automation levels. As for the normal approval, when the automation level can be increased, for example, the vehicle interior presentation device 18 may inquire whether the approval is possible, and prompt the driver to input whether the approval is possible. Then, when the input indicating that the approval is possible is made, it may be determined that the normal approval has been accepted. When the approval is accepted, the approval acceptance unit 103 may notify the automated driving ECU 17 that the approval has been accepted. The automated driving ECU 17 increases the automation level based on acceptance of approval.

The state identification unit 104 identifies a state (hereinafter referred to as automated driving-related state) of the subject vehicle related to automated driving. The process of the state identification unit 104 corresponds to a state identification process. The state identification unit 104 may identify the automated driving-related state based on the information obtained by the information acquisition unit 101, such as the result of recognition by the traveling environment recognition unit and the result of determination by the behavior determination unit.

The state identification unit 104 may identify, as the automated driving-related state, the situation in which the automation level can increase. For example, it is sufficient to identify a situation in which the vehicle enters the AD area from outside the AD area. This situation may be identified from the recognition result of the traveling environment recognition unit. In addition, a situation in which the vehicle enters the ST section from outside the ST section may be identified. This situation may be identified from the recognition result of the traveling environment recognition unit. Further, the state identification unit 104 may identify, as the automated driving-related state, the degree of the satisfied conditions of the traffic congestion limit LV 3. In an example, a situation in which some of the plurality of conditions for the traffic congestion limit LV 3 are satisfied may be used as the situation in which the automation level can increase. This situation may be identified from the determination result of the behavior determination unit. The state identification unit 104 may also identify the current automation level as the automated driving-related state. The state identification unit 104 may identify the current automation level by monitoring the automated driving ECU 17.

The state identification unit 104 may identify, as the automated driving-related state, whether an advance approval has been given for the increase in the automation level. The state identification unit 104 may identify whether the increase in the automation level has been approved in advance based on the determination result of the behavior determination unit. When adopting a configuration that allows the advance approval for each increased automation level, the state identification unit 104 may identify whether the advance approval has been given for each increased automation level. The state identification unit 104 may identify whether the automation level decreases as the automated driving-related state. Regarding the decrease in the automation level, the state identification unit 104 may also identify the factors that cause the decrease.

The vehicle exterior notification controller 105 controls the vehicle exterior notification device 19 to perform the vehicle exterior notification. The process by the vehicle exterior notification controller 105 corresponds to a vehicle exterior notification control process. The vehicle interior presentation controller 102 controls the vehicle interior presentation device 18 to perform a notification (hereinafter referred to as vehicle interior notification) toward the interior of the subject vehicle. The vehicle interior notification indicates that the vehicle exterior notification is being performed. Therefore, the vehicle interior presentation device 18 corresponds to a vehicle interior notification device, and the vehicle interior presentation controller 102 corresponds to a vehicle interior notification controller.

Figure 6:
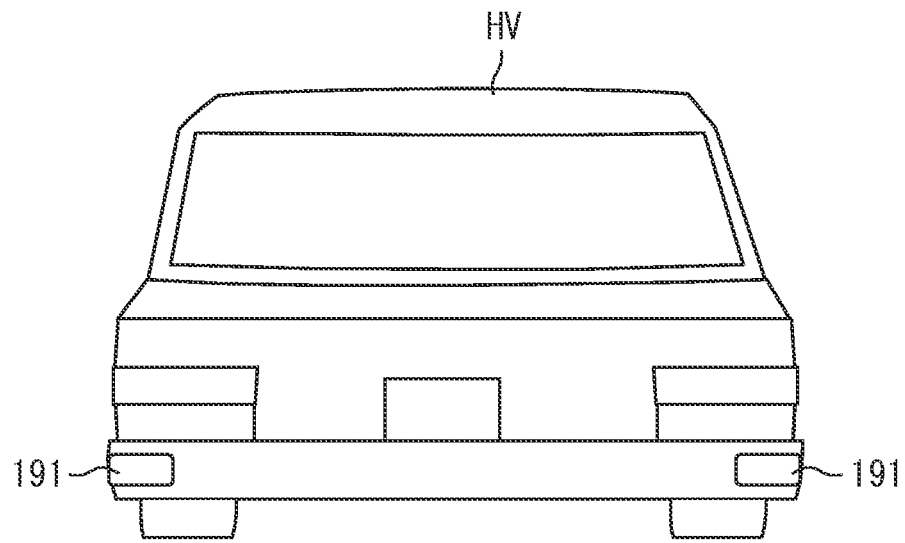
FIG. 6 is a diagram showing an example of an appearance of a subject vehicle.
Figure 7:
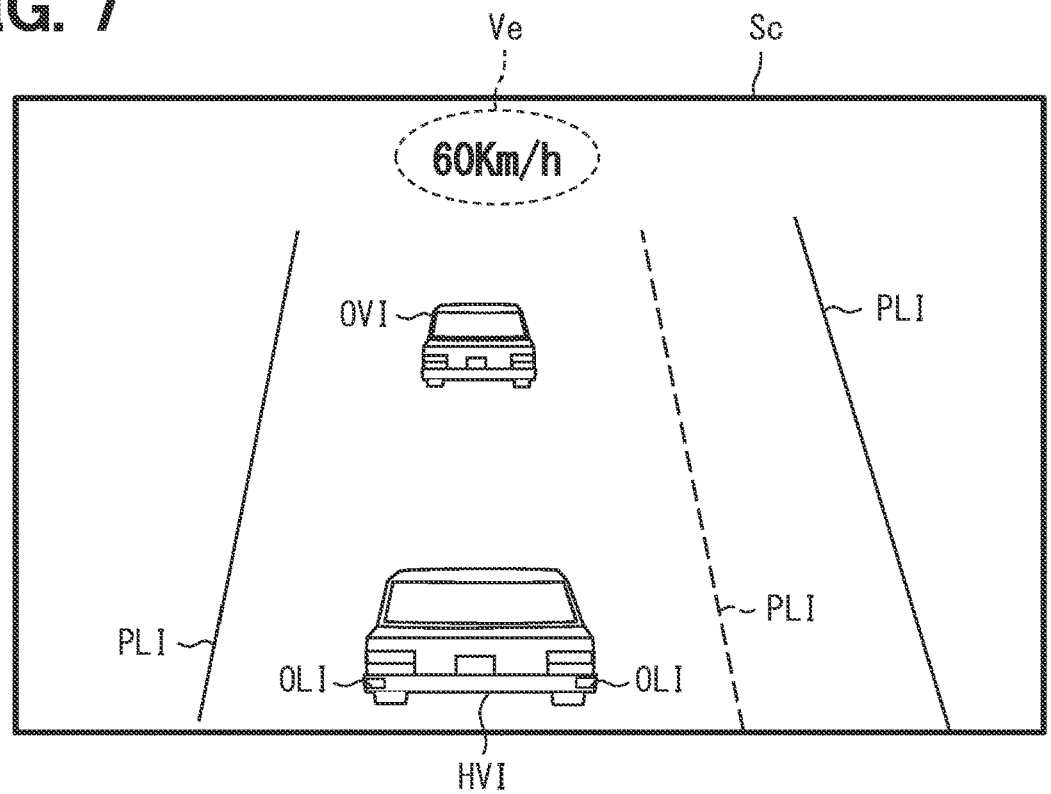
FIG. 7 is a diagram showing an example of vehicle interior notification in the foreground image.

As shown in FIG. 7, the vehicle interior presentation controller 102 can perform the vehicle interior notification by displaying, in the subject vehicle image displayed by the display 181, the similar information as the vehicle exterior notification in an area (see FIG. 6) where the vehicle exterior notification is performed using the vehicle exterior display 191. FIG. 6 is a diagram showing an appearance of the actual subject vehicle. FIG. 7 is a diagram showing an example of the vehicle interior notification in the foreground image described with reference to FIG. 5. FIG. 6 shows the appearance of the subject vehicle when viewed from behind. FIG. 6 shows an example in which the vehicle exterior displays 191 are provided at the four corner portions of the subject vehicle. The example of FIG. 6 shows the vehicle exterior displays 191 provided at the left and right corners of the rear part of the subject vehicle. OLI in FIG. 7 indicates an image (hereinafter referred to as an vehicle exterior notification lamp image) showing the vehicle exterior display 191 in the subject vehicle image.

Figure 8:
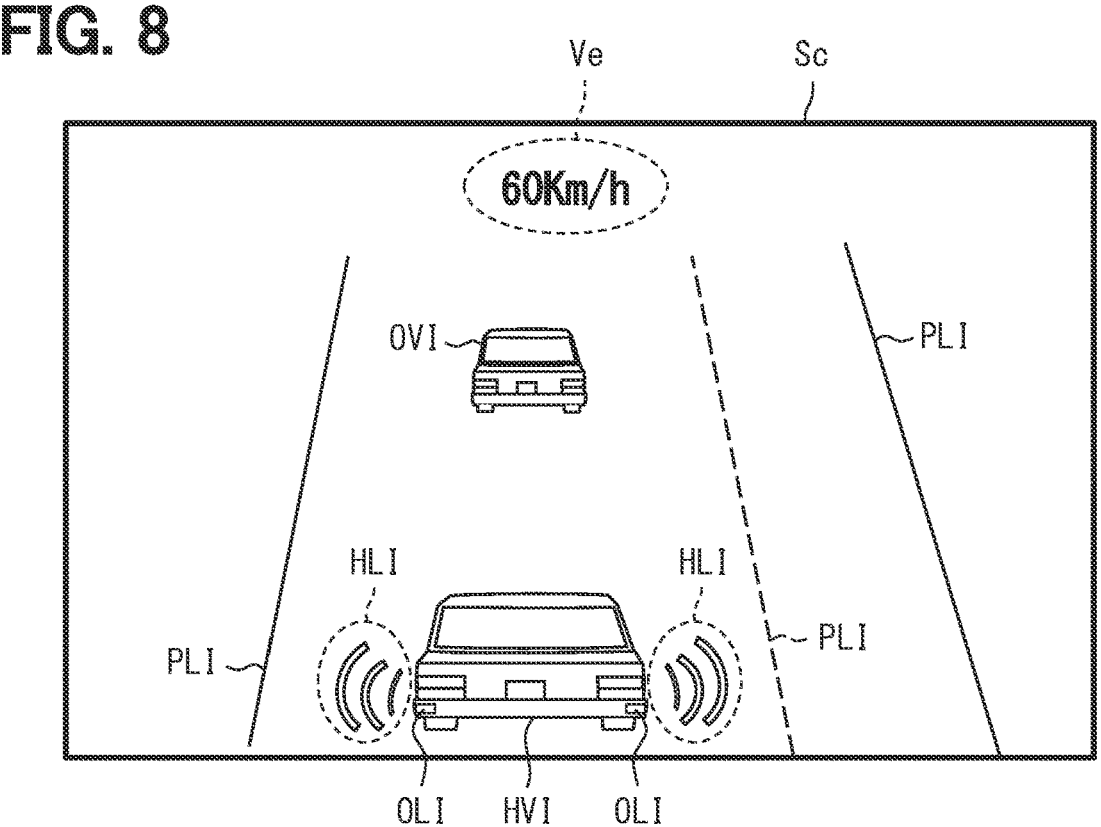
FIG. 8 is a diagram showing an example of the vehicle interior notification in the foreground image.

In addition, when the vehicle interior notification indicating that the vehicle exterior notification is being performed is performed using the subject vehicle image, as shown in FIG. 8, an image (see HLI in FIG. 8) for highlighting the vehicle exterior notification lamp image may be displayed in the periphery of the subject vehicle. According to this, even when it is difficult for the driver to understand that the vehicle exterior notification is being performed only with the vehicle exterior notification lamp image, it becomes easy for the driver to understand that the vehicle exterior notification is being performed.

The vehicle interior presentation controller 102 may cause the vehicle interior notification in cooperation with the vehicle exterior notification controller 105 performing the vehicle exterior notification. For example, the vehicle interior presentation controller 102 may cause the vehicle interior notification at the same timing when the vehicle exterior notification controller 105 performs the vehicle exterior notification. In an example of a case where an LED lamp is used as the vehicle exterior display 191, the vehicle exterior notification lamp image in the foreground image may be turned on at the same timing as the lighting of the LED lamp. For example, the vehicle exterior notification indicating that the automation level has changed and the vehicle interior notification indicating that the automation level has changed may be performed at the same timing. According to this, it becomes possible for the driver to know the timing at which the vehicle exterior notification is performed.

Further, the vehicle interior presentation controller 102 may cause the vehicle interior notification at an earlier timing than the vehicle exterior notification controller 105 causes the vehicle exterior notification. In an example of using an LED lamp as the vehicle exterior display 191, the vehicle exterior notification lamp image in the foreground image may be turned on at a timing earlier than the lighting of the LED lamp. For example, the vehicle interior notification indicating that the automation level has changed may be performed at an earlier timing than the vehicle exterior notification indicating that the automation level has changed. According to this, it becomes possible for the driver to know that the vehicle exterior notification will be performed earlier than the timing at which the vehicle exterior notification is performed. Hereinafter, an example is described in which the vehicle exterior notification indicating that the automation level has changed and the vehicle interior notification indicating that the automation level has changed are performed at the same timing.

Here, an example in which the vehicle interior notification is performed in the foreground image has been shown. However, the present disclosure is not limited to this. For example, in the case of using the subject vehicle simulation image, when the vehicle exterior notification is performed in the image area, a display similar to the vehicle exterior notification is performed in the area, the foreground image may be not used. Further, the configuration is not limited to the one in which the vehicle interior notification is performed by an image. For example, the vehicle interior notification may be performed by a meter lamp or indicator. In this case, the lamps and indicators of the meter may be light up in conjunction with the execution of the vehicle exterior notification. In addition, here, the example in which the vehicle interior notification may be performed by the display has been described. However, the present disclosure is not limited to the example. For example, the vehicle interior notification by audio may be similarly performed in conjunction with the execution of the vehicle exterior notification.

The vehicle exterior notification controller 105 changes the timing of performing the vehicle exterior notification according to the automated driving-related state identified by the state identification unit 104. The vehicle exterior notification controller 105 changes the timing of performing the vehicle exterior notification using the automated driving-related state identified by the state identification unit 104. In other words, the vehicle exterior notification controller 105 changes the timing of performing the vehicle exterior notification based on the automated driving-related state identified by the state identification unit 104. It is preferable that, when the automation level can increase, the vehicle exterior notification controller 105 changes the timing at which the vehicle exterior notification is performed depending on whether the advance approval has been given. In this case, as the automated driving-related state, an identification result of a situation in which the automation level can increase or an identification result of whether the advance approval has been given for the increase in the automation level may be used.

In the following, an example will be described in which, when the automation level can increase, the timing at which vehicle exterior notification is performed is changed depending on whether the advance approval has been given. In a case where the advance approval has been given, when the subject vehicle enters the ST section from outside the ST section, it is preferable that the vehicle exterior notification controller 105 performs the vehicle exterior notification indicating the possibility of starting the automated driving without the monitoring obligation before the subject vehicle enters the ST section. Since the area limit automated driving is possible within the ST section, when the advance approval is given, it is possible to accurately predict a timing when the automation level increases. Therefore, it is possible to notify the periphery of the subject vehicle of the possibility of starting automated driving without the monitoring obligation before it becomes possible to increase to the area limit LV 3. As a result, it becomes possible to notify the periphery of the subject vehicle that the automation level will rise as early as possible, if possible, to know that the automation level will rise.

Here, with reference to FIG. 9, an example of the vehicle exterior notification and the vehicle interior notification will be described. The example shows a timing of the vehicle exterior notification and the vehicle interior notification when the increase to the area limit LV 3 is possible and when the advance approval has been given. Co in FIG. 9 indicates the situation of the subject vehicle. ADLV in FIG. 9 indicates the automation level of the subject vehicle. II in FIG. 9 indicates the vehicle interior notification. AP in FIG. 9 indicates the timing of approval. OI in FIG. 9 indicates the vehicle exterior notification. The same applies to subsequent figures. The example of FIG. 9 shows an example of a case where the automation level increases from LV 2 or lower to the area limit LV 3.

Figure 9:
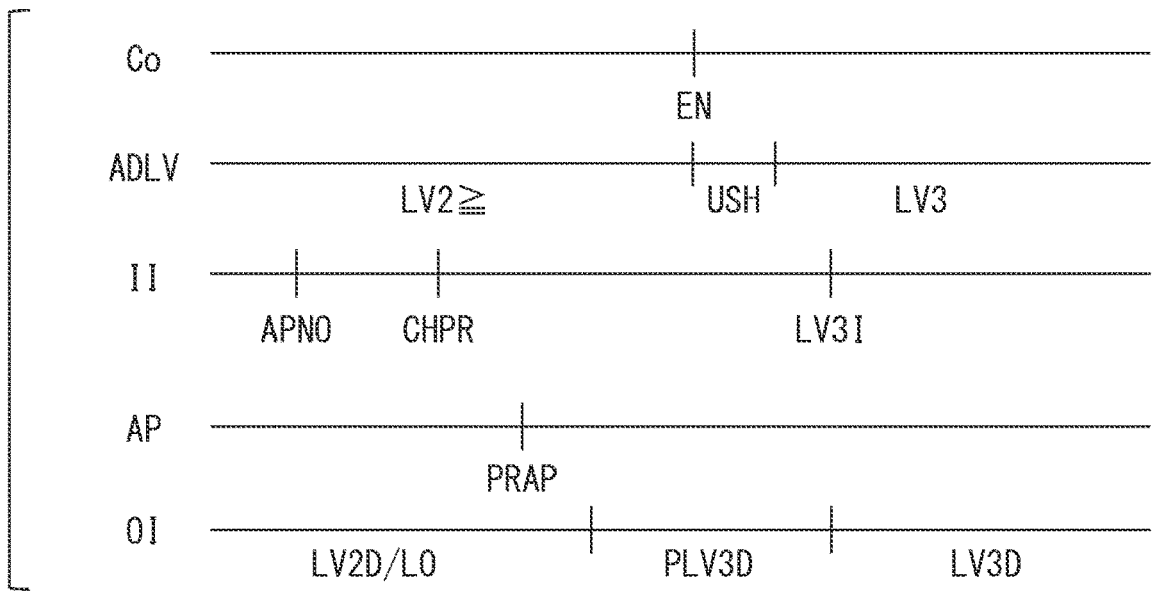
FIG. 9 is a diagram illustrating an example of the vehicle exterior notification and the vehicle interior notification when an increase to an area limit LV 3 is possible and also when an advance approval is obtained.

As shown in FIG. 9, the automation level is LV 2 or lower until the subject vehicle enters the ST section (see EN in FIG. 9). As for the vehicle interior notification, before entering the ST section, the vehicle interior presentation controller 102 causes the vehicle interior notification (see APNO in FIG. 9) indicating that the vehicle is approaching the ST section. This notification may be performed, for example, when the distance between the subject vehicle and the ST section becomes less than or equal to a threshold value. After this notification, and before entering the ST section, the vehicle interior presentation controller 102 causes vehicle interior notification (see CHPR in FIG. 9) that proposes switching to automated driving without monitoring obligation. In response to this notification, the advance approval (see PRAP in FIG. 9) is performed by the driver approving the increase in the automation level before the subject vehicle enters the ST section.

As for the external notification, after the advance approval and before entering the ST section, the vehicle exterior notification controller 105 issues the vehicle exterior notification (see PLV3D in FIG. 9) to notify in advance of the possibility that the automated driving without the monitoring obligation will start. The vehicle exterior notification that gives advance notice of the possibility that the automated driving without the monitoring obligation will start may be referred to as increase advance notification. The vehicle exterior notification (see LV2D in FIG. 9) indicating that the automated driving is being performed at LV 2 or lower may be performed or the vehicle exterior notification may not be performed (see LO in FIG. 9) until the increase advance notification starts. Hereinafter, the vehicle exterior notification indicating that the automated driving at LV 2 or lower is being performed may be also referred to as LV 2 notification.

Since the advance approval has been given, when the subject vehicle enters the ST section, a period in which the automation level shifts from LV 2 or lower to LV 3 occurs (see USH in FIG. 9), and the automation level becomes LV 3. The increase advance notification continues until the subject vehicle enters the ST section and the shift of the automation level to LV 3 is completed. Then, after the automation level has completely shifted to LV 3, the vehicle exterior notification controller 105 starts the vehicle exterior notification (see LV3D in FIG. 9) indicating that the vehicle is performing the automated driving without the monitoring obligation. That is, when the subject vehicle enters the ST section and the area limit automated driving starts, the vehicle exterior notification controller 105 performs switching to the vehicle exterior notification indicating that the automated driving without the monitoring obligation is being performed. Hereinafter, the vehicle exterior notification indicating the automated driving without the monitoring obligation is being performed may be also referred to as LV 3 notification. At the same timing as a timing when the LV 3 notification starts, the vehicle interior presentation controller 102 causes the vehicle interior notification (see LV3I in FIG. 9) indicating that the shift to the automated driving without the monitoring obligation is completed.

When the vehicle exterior notification is implemented by turning on or off the lamp, the distinction among the LV 2 notification, the increase advance notification, and the LV 3 notification may be expressed by the difference in the manner in which the lamp is turned on or off. For example, the distinction may be expressed by distinguishing them by lighting color. For example, the LV 2 notification and the LV 3 notification may be expressed in different lighting colors, and the increase advance notification may be expressed in an intermediate color between the LV 2 notification and the LV 3 notification. In addition, the distinction may be expressed by a difference in the cycle of blinking, a difference in the ratio between the turn-on time and the turn-off time of lighting, and the like. When adopting a configuration in which the vehicle exterior notification is not performed during the automated driving at LV 2 or lower, the increase advance notification may be expressed by the blink, while the LV 3 notification may be expressed by lighting.

Here, the case where the subject vehicle enters the ST section from outside the ST section is described as the example of the case where the automation level can increase by entering the specific area. However, the present disclosure is not necessarily the case. For example, the present disclosure may be applied when the subject vehicle enters the AD section from outside the AD section. In this case, for example, the ST section may be replaced with the AD section, LV 2 or lower may be replaced with LV 0, and LV 3 may be replaced with LV 1 or above.

In a case where the advance approval has been given, when some of conditions of the traffic congestion limit LV 3 are satisfied, it is preferable that the vehicle exterior notification controller 105 causes the vehicle exterior notification indicating the possibility of starting the automated driving without the monitoring obligation. The traffic congestion limit automated driving is possible when all of conditions of the traffic congestion limit LV 3 are satisfied. In the case where the advance approval has been given, when some of conditions of the traffic congestion limit LV 3 are satisfied, it is possible to predict, to some extent, the timing when the automation level increases. Therefore, it is possible to notify the periphery of the subject vehicle of the possibility of starting automated driving without the monitoring obligation before it becomes possible to increase to the traffic congestion limit LV 3. As a result, it becomes possible to notify the periphery of the subject vehicle that the automation level will rise as early as possible, if possible, to know that the automation level will rise.

Here, with reference to FIG. 10, an example of the vehicle exterior notification and the vehicle interior notification will be described. The example shows a timing of the vehicle exterior notification and the vehicle interior notification when the increase to the traffic congestion limit LV 3 is possible and when the advance approval has been given. The example of FIG. 10 shows an example of a case where the automation level increases from LV 2 or lower to the traffic congestion limit LV 3.

Figure 10:
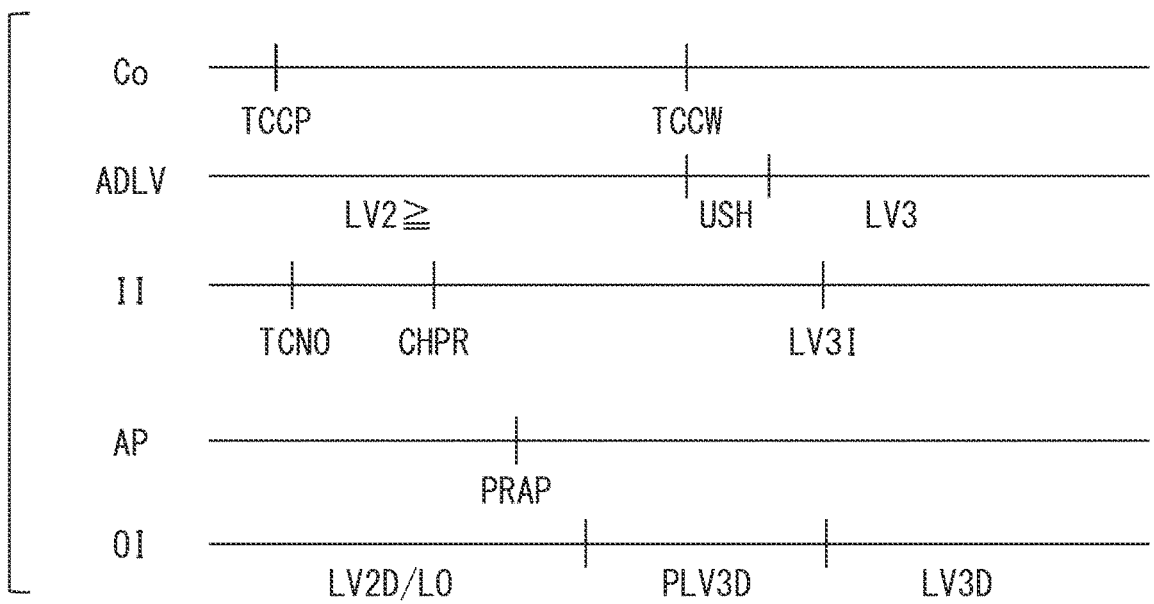
FIG. 10 is a diagram illustrating an example of the vehicle exterior notification and the vehicle interior notification when an increase to a traffic congestion limit LV 3 is possible and also when the advance approval is obtained.

As shown in FIG. 10, until all of the conditions of the traffic congestion limit LV 3 are satisfied (see TCCW in FIG. 10), the automation level is LV 2 or lower. The vehicle interior presentation controller 102 causes the vehicle interior notification (TCNO in FIG. 10) indicating a possibility that the traffic congestion limit LV 3 is possible when some of conditions of the traffic congestion limit LV 3 are satisfied. After this notification, the vehicle interior presentation controller 102 causes the vehicle interior notification (see CHPR in FIG. 10) that proposes switching to the automated driving without the monitoring obligation before all of the conditions of the traffic congestion limit LV 3 are satisfied. In response to this notification, the advance approval (see PRAP in FIG. 10) is performed by the driver approving the increase in the automation level before the subject vehicle satisfies some of conditions of the traffic congestion limit LV 3.

The vehicle exterior notification controller 105 starts the increase advance notification (see PLV3D in FIG. 10) after the advance approval and also before all of conditions of the traffic congestion limit LV 3 are satisfied. The LV 2 notification (see LV2D in FIG. 10) may be performed or the vehicle exterior notification may not be performed (see LO in FIG. 10) until the increase advance notification starts. Since the advance approval has been given, when the subject vehicle satisfies all of conditions of the traffic congestion limit LV 3, a period in which the automation level shifts from LV 2 or lower to LV 3 occurs (see USH in FIG. 10), and the automation level becomes LV 3. The increase advance notification continues until the subject vehicle satisfies all of conditions of the traffic congestion limit LV 3 and the shift of the automation level to LV 3 is completed. Then, after the automation level has completely shifted to LV 3, the vehicle exterior notification controller 105 starts the LV 3 notification (see LV3D in FIG. 10). That is, when all of the conditions of the traffic congestion limit LV3 are satisfied and the LV 3 limit automated driving started, the vehicle exterior notification controller 105 performs the switching to the LV 3 notification. At the same timing as a timing when the LV 3 notification starts, the vehicle interior presentation controller 102 causes the vehicle interior notification (see LV3I in FIG. 10) indicating that the shift to the automated driving without the monitoring obligation is completed.

Here, as the example of a specific situation, the situation in which the traffic congestion limit LV 3 is possible is described. However, the present disclosure is not necessarily limited to this. When the LV 3 automated driving is possible in a situation different from the traffic congestion, the situation may be set to the specific situation.

In a case where the advance approval has not been given, when, in a state where the automated driving without the monitoring obligation is possible, the approval was given from the driver of the subject vehicle and the automated driving without the monitoring obligation started, it is preferable that the vehicle exterior notification controller 105 causes the vehicle exterior notification indicating that the automated driving without the monitoring obligation is being performed. When the advance approval has not been given, in the state where the automated driving without the monitoring obligation is possible, a timing when the approval is given from the driver of the subject vehicle is the earliest timing when the automation level increase. Therefore, according to the above configuration, it becomes possible to inform those in the periphery of the subject vehicle that the vehicle is performing the automated driving without the monitoring obligation at an earlier timing than when the advance approval has not been given. As a result, it becomes possible to notify the periphery of the subject vehicle that the automation level will rise as early as possible, if possible, to know that the automation level will rise.

Figure 11:
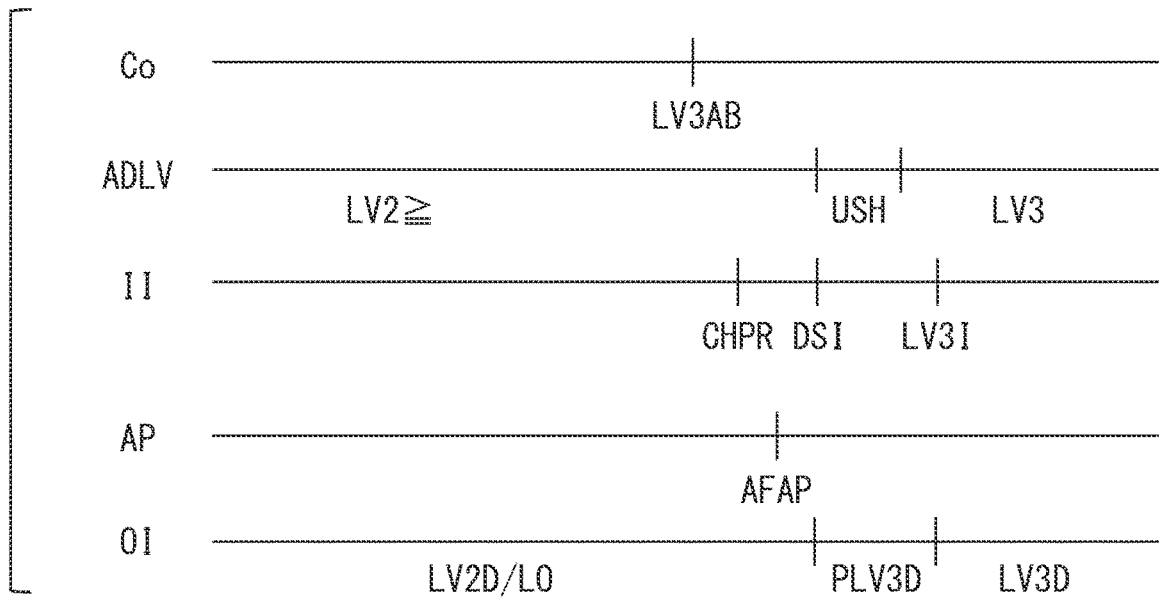
FIG. 11 is a diagram illustrating an example of the vehicle exterior notification and the vehicle interior notification when an increase of an automation level to LV 3 is possible and also when the advance approval is not obtained.

Here, with reference to FIG. 11, an example of the vehicle exterior notification and the vehicle interior notification will be described. The example shows a timing of the vehicle exterior notification and the vehicle interior notification when the increase in the automation level to the traffic congestion limit LV 3 is possible and when the advance approval has not been given. The example of FIG. 11 shows an example of a case where the automation level increases from LV 2 or lower to LV 3. This LV 3 does not matter whether it is the area limit LV 3 or the traffic congestion limit LV 3.

As shown in FIG. 11, the automation level is LV 2 or lower until the LV 3 automated driving becomes possible (see LV3AB in FIG. 11). The vehicle interior presentation controller 102 causes the vehicle interior notification (CHPR in FIG. 11) for proposing the switching to the automated driving without the monitoring obligation after the LV 3 automated driving becomes possible. In response to this notification, the normal approval (see AFAP in FIG. 11) is performed by the driver approving the increase in the automation level.

After the normal approval, a period (see USH in FIG. 11) in which the automation level shifts from LV 2 or lower to LV 3 occurs. At the timing of the shift to this period, the vehicle interior presentation controller 102 starts the vehicle interior notification (see DSI in FIG. 11) indicating that the shift to the automated driving without the monitoring obligation is in progress. Further, at the timing of the shift to this period, the vehicle exterior notification controller 105 starts the increase advance notification (see PLV3D in FIG. 11). The LV 2 notification (see LV2D in FIG. 11) may be performed or the vehicle exterior notification may not be performed (see LO in FIG. 11) until the increase advance notification starts.

After that, the period in which the automation level shifts from LV 2 or lower to LV 3 occurs (see USH in FIG. 11), and the automation level of the subject vehicle becomes LV 3. The increase advance notification continues until the shift of the automation level to LV 3 is completed. Then, after the automation level has completely shifted to LV 3, the vehicle exterior notification controller 105 starts the LV 3 notification (see LV3D in FIG. 11). That is, in a case where the advance approval has not been given for the automated driving without the monitoring obligation, when, in a state where the automated driving without the monitoring obligation is possible, the approval was given from the driver of the subject vehicle and the automated driving without the monitoring obligation started, the vehicle exterior notification controller 105 causes the LV 3 notification that is the vehicle exterior notification indicating that the automated driving without the monitoring obligation is being performed. Further, at the same timing as a timing when the LV 3 notification starts, the vehicle interior presentation controller 102 starts the vehicle interior notification (see LV3I in FIG. 11) indicating that the shift to the automated driving without the monitoring obligation is completed.

Although the example in FIG. 11 shows a configuration in which the vehicle exterior notification controller 105 causes the increase advance notification and then causes the LV 3 notification, the present disclosure is not necessarily limited to this configuration. For example, the vehicle exterior notification controller 105 may cause the LV 3 notification without causing the increase advance notification.

Further, in a case where the advance approval has not been given for the automated driving without the monitoring obligation, after, in a state where the automated driving without the monitoring obligation is possible, the approval was given from the driver of the subject vehicle and before the automated driving without the monitoring obligation starts, the vehicle exterior notification controller 105 may cause the vehicle exterior notification indicating that the automated driving without the monitoring obligation is being performed. According to this, when it has been determined that the automated driving without the monitoring obligation will start, it is necessary to inform those in the periphery that the automated driving without the monitoring obligation will be performed before the automated driving without the monitoring obligation starts. Therefore, according to the above configuration, it becomes possible to inform those in the periphery of the subject vehicle that the vehicle will perform the automated driving without the monitoring obligation at an earlier timing than when the advance approval has not been given. As a result, it becomes possible to notify those in the periphery of the subject vehicle that the automation level will increase at the earlier timing since those in the periphery would like to know the increase as early as possible.

Figure 12:
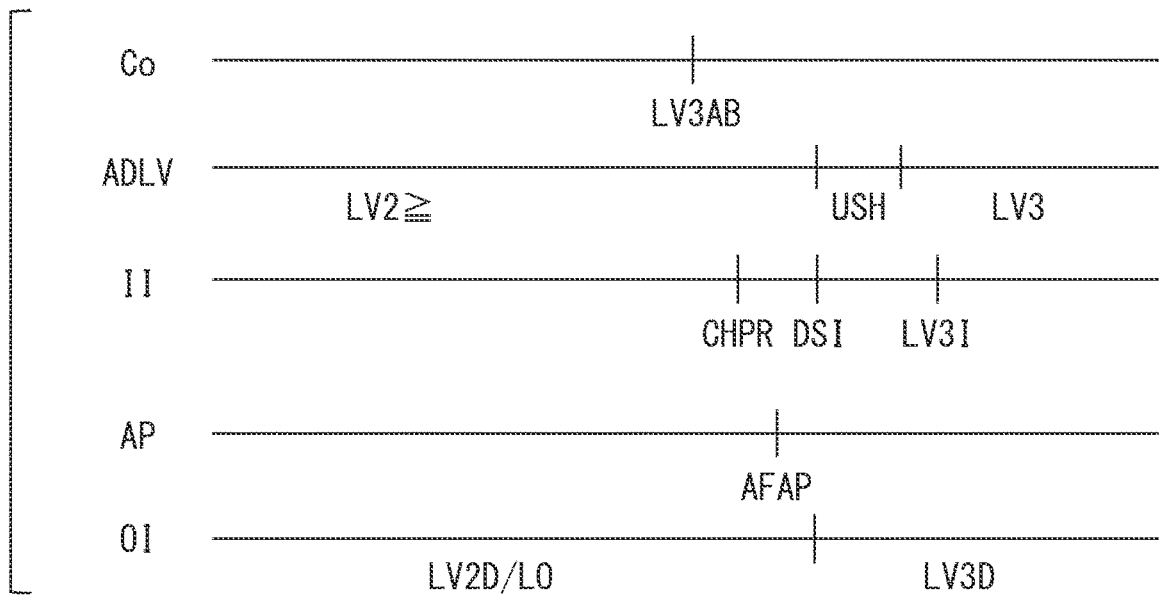
FIG. 12 is a diagram illustrating an example of the vehicle exterior notification and the vehicle interior notification when the increase of the automation level to LV 3 is possible and also when the advance approval is not obtained.

Here, with reference to FIG. 12, an example of the vehicle exterior notification and the vehicle interior notification will be described. The example shows a timing of the vehicle exterior notification and the vehicle interior notification when the increase in the automation level to the traffic congestion limit LV 3 is possible and when the advance approval has not been given. The example of FIG. 12 shows an example of a case where the automation level increases from LV 2 or lower to LV 3. This LV 3 does not matter whether it is the area limit LV 3 or the traffic congestion limit LV 3.

As shown in FIG. 12, the automation level is LV 2 or lower until the LV 3 automated driving becomes possible (see LV3AB in FIG. 12). The vehicle interior presentation controller 102 causes the vehicle interior notification (CHPR in FIG. 12) for proposing the switching to the automated driving without the monitoring obligation after the LV 3 automated driving becomes possible. In response to this notification, the normal approval (see AFAP in FIG. 12) is performed by the driver approving the increase in the automation level.

After the normal approval, a period (see USH in FIG. 12) in which the automation level shifts from LV 2 or lower to LV 3 occurs. At the timing of the shift to this period, the vehicle interior presentation controller 102 starts the vehicle interior notification (see DSI in FIG. 12) indicating that the shift to the automated driving without the monitoring obligation is in progress. Further, at the timing of shift to this period, although the vehicle is not performing the automated driving without the monitoring obligation, the vehicle exterior notification controller 105 starts the LV 3 notification (see LV3D in FIG. 12) without the increase advance notification. The LV 2 notification (see LV2D in FIG. 12) may be performed or the vehicle exterior notification may not be performed (see LO in FIG. 12) until the LV 3 notification starts.

After that, the period in which the automation level shifts from LV 2 or lower to LV 3 occurs (see USH in FIG. 12), and the automation level of the subject vehicle becomes LV 3. Then, after the automation level has completely shifted to LV 3, the vehicle interior presentation controller 102 starts the vehicle interior notification (see LV3I in FIG. 12) indicating that the shift to the automated driving without the monitoring obligation has been completed.

Here, the example has been described in which the automation level increases from LV 2 or lower to LV 3. However, the present disclosure is not necessarily the example. For example, it may be applied when the automation level increases between other automation levels. In this case, for example, when the advance approval has been given, the vehicle exterior notification for notifying, in advance, the periphery of the possibility that the automation level will increase may be performed before the automation level becomes possible. On the other hand, when the advance approval is not given, after the increase in the automation level becomes possible, vehicle exterior notification indicating the increased automation level may be performed.

Further, it is preferable that, when the automation level decreases, the vehicle exterior notification controller 105 changes the timing at which the vehicle exterior notification is performed, depending on the factor causing the decrease. In this case, as the automated driving-related state, a result of identifying the decrease in the automation level and a result of identifying the factor causing the decrease in the automation level may be used.

Hereinafter, an example will be described in which the execution timing of the vehicle exterior notification is changed depending on the factor causing the decrease when the automation level decreases. In the case where the automation level decreases, when the factor causing the decrease is the override, it is preferable that, after the auxiliary period described above and the automation level decreases, the vehicle exterior notification controller 105 causes vehicle exterior notification in a different manner from the vehicle exterior notification prior to the decrease. When the factor causing the decrease in the automation level is the override, the decrease in the automation level is not confirmed until the system of the subject vehicle determines that the driving change is possible. Therefore, by switching the vehicle exterior notification after the automation level has decreased after the auxiliary period, it becomes possible to switch the vehicle exterior notification after the decrease in the automation level is confirmed. Thereby, it is possible to notify the periphery of the subject vehicle of the decrease in the automation level at the earlier timing while preventing the erroneous vehicle exterior notification.

Figure 13:
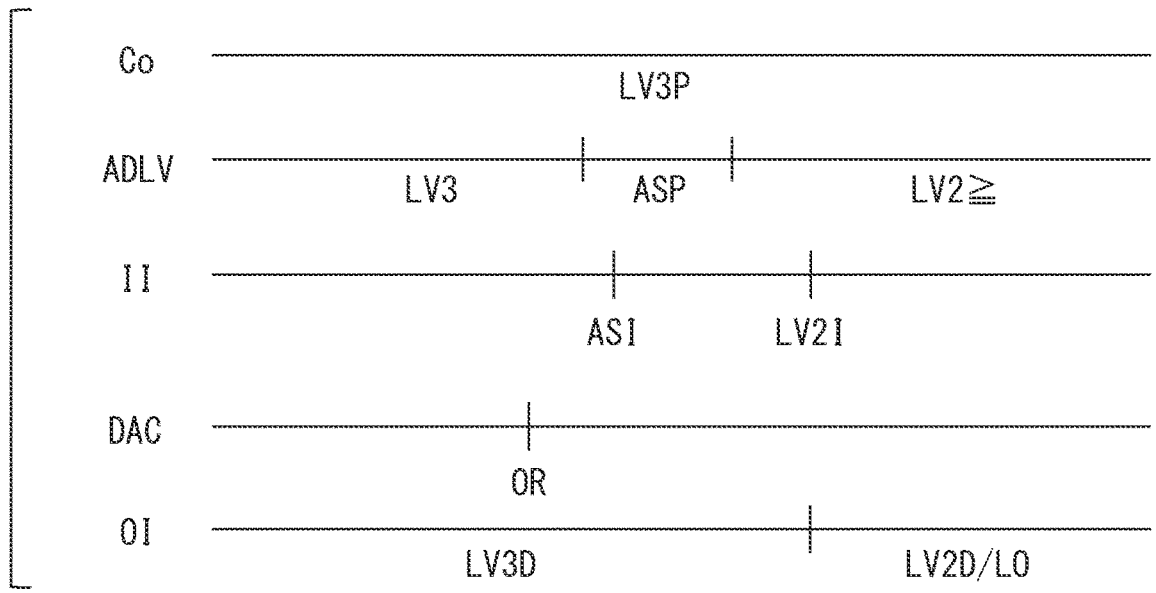
FIG. 13 is a diagram illustrating an example of a timing of the vehicle exterior notification and the vehicle interior notification when an override causes the automation level of a subject vehicle to decrease.

Here, with reference to FIG. 13, an example of a timing of the vehicle exterior notification and the vehicle interior notification when an override causes the automation level of a subject vehicle to decrease will be described. DAC in FIG. 13 indicates the driver action. The same applies to subsequent figures. The example of FIG. 13 shows an example of a case where the automation level decreases from LV 3 to LV 2 or lower. This LV 3 does not matter whether it is the area limit LV 3 or the traffic congestion limit LV 3.

In the example of FIG. 13, it is assumed that the state of the subject vehicle is such that it is possible to continue to maintain the automation level of LV 3 (see LV3P in FIG. 13). When the driver executes the override (see OR in FIG. 13), the automation level shifts from LV 3 to an automation level below LV 2 with assistance (see ASP in FIG. 13). The term of "assistance" described here refers to assistance that provides driving assistance less than that at LV 3 but more than that at LV 2.

After the assistance period has passed and the automation level has transitioned from LV 2 or lower with assistance to LV 2 or lower without assistance, the LV 2 notification (see LV2D in FIG. 13) may start, or the vehicle exterior notification may not be performed (see LO in FIG. 13). Here, when adopting a configuration in which the LV 2 notification is performed, the notification will be switched from the LV 3 notification to the LV 2 notification. When a configuration is adopted in which the vehicle exterior notification is not performed, the notification will be switched from the LV 3 notification to no vehicle exterior notification. The vehicle interior presentation controller 102 causes, at the switching timing of the LV 3 notification, the vehicle interior notification (see LV2I in FIG. 13) indicating that the driving shifts to driving at the automation level LV 2 or lower.

In the case where the automation level decreases, when the factor causing the decrease is the scheduled driving change by the system, it is preferable that the vehicle exterior notification controller 105 causes vehicle exterior notification in a different manner from the vehicle exterior notification prior to the decrease before the driving change request is made. It is possible to more accurately predict a timing when the automation level will decrease due to the scheduled driver change. Therefore, it becomes possible to notify the periphery of the subject vehicle that the automation level of the automated driving will decrease by switching the vehicle exterior notification before the automation level actually decreases. As a result, it becomes possible to notify those in the periphery of the subject vehicle that the automation level will decrease at the earlier timing since those in the periphery would like to know the decrease as early as possible.

Further, in the case where the automation level decreases, when the factor causing the decrease is the scheduled driving change by the system, before the driving change request is made, it is more preferable that the vehicle exterior notification controller 105 causes the vehicle exterior notification indicating that the automation level will decrease in advance. Further, it is more preferable that, after the decrease, the vehicle exterior notification controller 105 causes the vehicle exterior notification in a different manner from the vehicle exterior notification caused when the automation level does not decrease. According to this, it becomes possible to notify the periphery of the subject vehicle that the automation level of the automated driving will decrease by performing the notification in advance before the automation level actually decreases. On the other hand, when the automation level actually decreases, the vehicle exterior notification is switched to vehicle exterior notification with a mode corresponding to the decrease, so that the vehicle exterior notification that the automation level has actually decreased can be performed when the automation level actually decreases.

Figure 14:
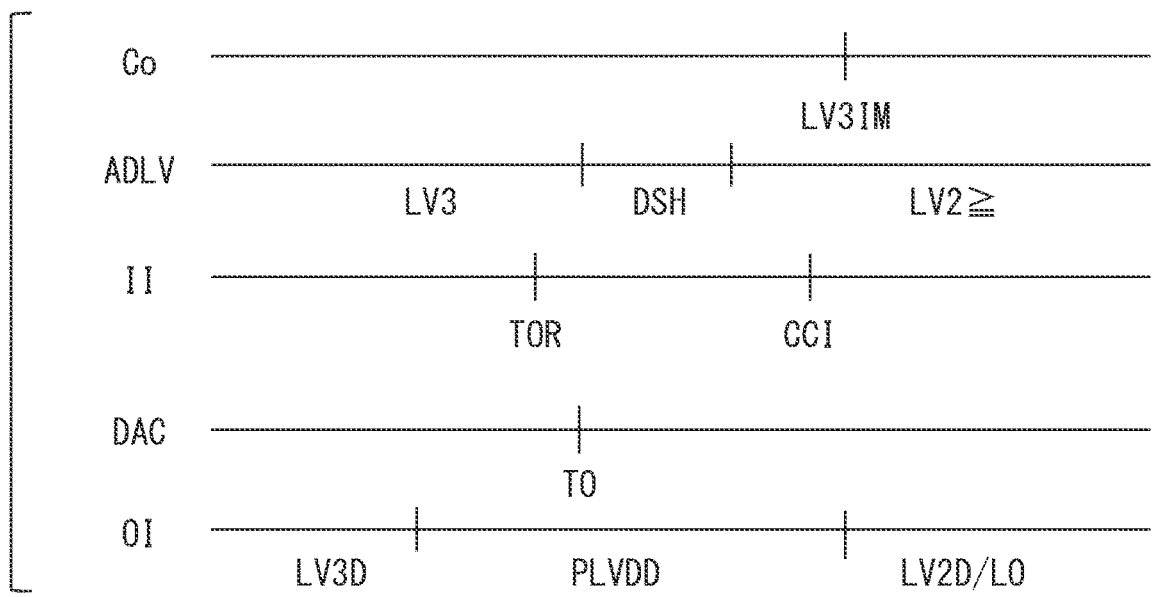
FIG. 14 is a diagram illustrating an example of a timing of the vehicle exterior notification and the vehicle interior notification when a scheduled driving change causes the automation level of a subject vehicle to decrease.

Here, with reference to FIG. 14, an example of a timing of the vehicle exterior notification and the vehicle interior notification when the scheduled driving change causes the automation level of a subject vehicle to decrease will be described. The example of FIG. 14 shows an example of a case where the automation level decreases from LV 3 to LV 2 or lower. Although this LV 3 does not matter whether it is the area limit LV 3 or the traffic congestion limit LV 3, the LV 3 may be limited to the area limit LV 3. This is because in the area limit LV 3, it is easier to predict the driving change necessary timing than in the traffic congestion limit LV 3.

In the example of FIG. 14, it is assumed that there is a time (see LV3IM in FIG. 14) when it becomes impossible to continue to maintain the automation level of LV 3 as the situation of the subject vehicle. This time is hereinafter referred to as a maintenance limit point. As an example, the timing of moving from the ST section to outside the ST section during the automated driving of the area limit LV 3 corresponds to the maintenance limit point. When the scheduled driving change is to be performed, the vehicle interior presentation controller 102 makes a driving change request (see TOR in FIG. 14), and upon receiving this driving change request, the driver performs the driving change (see TO in FIG. 14). When the scheduled driving change is performed, the system can recognize that the driving change is necessary before making the driving change request. Therefore, the vehicle exterior notification controller 105 starts the vehicle exterior notification (see PLVDD in FIG. 14) that gives advance notice of the possibility that the automation level will decrease before the driving change request is made. Hereinafter, the vehicle exterior notification that gives advance notice of the possibility that the automation level may decrease is referred to as a decrease advance notification.

When the driver performs the driving change, the automation level becomes LV 2 or lower after a period in which the automation level shifts from LV 3 to LV 2 or lower (see DSH in FIG. 14). In the scheduled driving change, the decrease in automation level is completed before the maintenance limit point. After the driving change is completed, the vehicle interior presentation controller 102 causes the vehicle interior notification (see CCI in FIG. 14) indicating that the driving change has been completed before the maintenance limit point is reached. The vehicle exterior notification controller 105 may start the LV 2 notification (see LV2D in FIG. 14) when the subject vehicle reaches the maintenance limit point, or may not cause the vehicle exterior notification (see LO in FIG. 14). These vehicle exterior notifications may be caused, for example, after the vehicle interior notification indicating that the driving change has been completed.

When the vehicle exterior notification is implemented by turning on or off the lamp, the distinction among the LV 2 notification, the decrease advance notification, and the LV 3 notification may be expressed by the difference in the manner in which the lamp is turned on or off. For example, the decrease advance notification may be expressed in an intermediate color between the LV 2 notification and the LV 3 notification. In addition, the distinction may be expressed by a difference in the cycle of blinking, a difference in the ratio between the turn-on time and the turn-off time of lighting, and the like. When adopting a configuration in which the vehicle exterior notification is not performed during the automated driving at LV 2 or lower, the decrease advance notification may be expressed by the blink, while the LV 3 notification may be expressed by lighting.

In the case where the automation level decreases, when the factor causing the decrease is the unscheduled driving change by the system, it is preferable that the vehicle exterior notification controller 105 causes vehicle exterior notification in a different manner from the vehicle exterior notification caused prior to the decrease before or after the driving change request is made. It is difficult to predict a timing when the automation level will decrease due to the unscheduled driving change. Therefore, it is not certain whether the automation level will actually decrease until the driving change request is made. On the other hand, when the driving change request is made, or after the driving change request is made, the vehicle exterior notification is switched to vehicle exterior notification in the different manner from that prior to the decrease. Therefore, it is possible to switch the vehicle exterior notification after the automation level has been determined to decrease. Thereby, it is possible to notify the periphery of the subject vehicle of the decrease in the automation level at the earlier timing while preventing the erroneous vehicle exterior notification.

Figure 15:
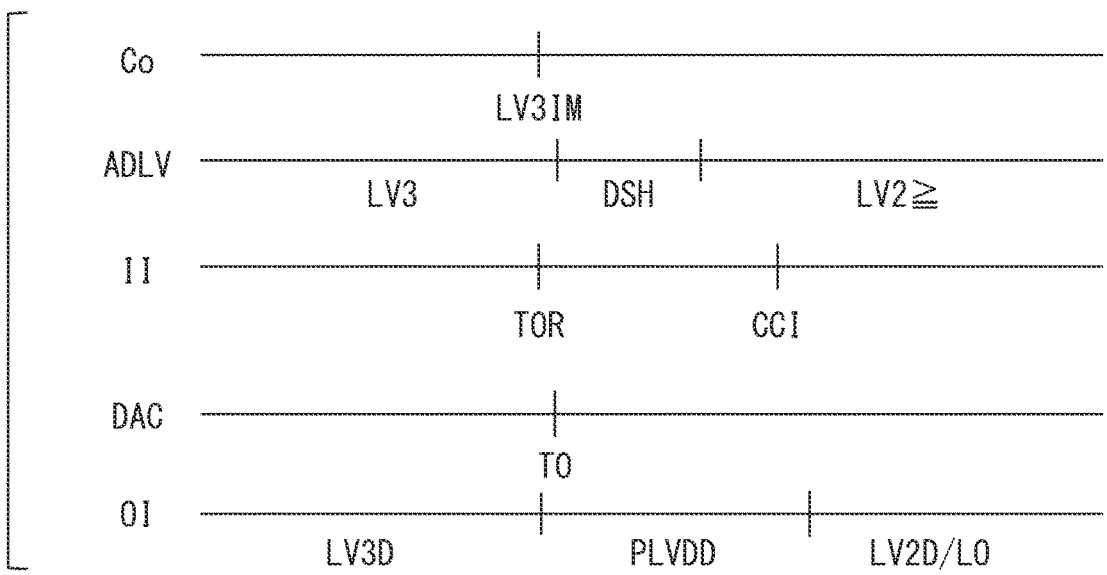
FIG. 15 is a diagram illustrating an example of a timing of the vehicle exterior notification and the vehicle interior notification when a unscheduled driving change causes the automation level of the subject vehicle to decrease.

Here, with reference to FIG. 15, an example of a timing of the vehicle exterior notification and the vehicle interior notification when the unscheduled driving change causes the automation level of the subject vehicle to decrease will be described. The example of FIG. 15 shows an example of a case where the automation level decreases from LV 3 to LV 2 or lower. Although this LV 3 does not matter whether it is the area limit LV 3 or the traffic congestion limit LV 3, the LV 3 may be limited to the traffic congestion limit LV 3. This is because the unscheduled driving change is more likely to occur in the traffic congestion limit LV 3 than in the area limit LV 3.

Also in the example of FIG. 15, it is assumed that there is the maintenance limit point (see LV3IM in FIG. 15) when it becomes impossible to continue to maintain the automation level of LV 3 as the situation of the subject vehicle. As an example, the timing at which the conditions for the traffic congestion limit LV 3 are no longer satisfied during the automated driving of the traffic congestion limit LV 3 corresponds to the maintenance limit point. Even when the unscheduled driving change is to be performed, the vehicle interior presentation controller 102 makes the driving change request (see TOR in FIG. 15), and upon receiving this driving change request, the driver performs the driving change (see TO in FIG. 15). When the unscheduled driving change is performed, the system is difficult to recognize that the driving change is necessary before making the driving change request. Therefore, the vehicle exterior notification controller 105 starts the decrease advance notification (see PLVDD in FIG. 15) that gives advance notice of the possibility that the automation level will decrease when the driving change request is made. In other words, the decrease advance notification is started at the same timing as the execution timing of the driving change request. Incidentally, the decrease advance notification may be started after the driving change request is made.

When the driver performs the driving change, the automation level becomes LV 2 or lower after a period in which the automation level shifts from LV 3 to LV 2 or lower (see DSH in FIG. 15). In the unscheduled driving change, the decrease in automation level starts from the maintenance limit point. After the driving change is completed, the vehicle interior presentation controller 102 causes the vehicle interior notification (see CCI in FIG. 15) indicating that the driving change has been completed. The vehicle exterior notification controller 105 may start the LV 2 notification (see LV2D in FIG. 15) after the driving change is completed, or may not cause the vehicle exterior notification (see LO in FIG. 15). These vehicle exterior notifications may be caused, for example, after the vehicle interior notification indicating that the driving change has been completed.

In the case where the automation level decreases, when the factor causing the decrease is a factor (hereinafter, sudden cancellation factor) having a type instantly decreasing the automation level, it is preferable that the vehicle exterior notification controller 105 causes the vehicle exterior notification at the timing when the sudden cancellation factor occurs, and causes the vehicle exterior notification to continue for a predetermined time or more. The predetermined time here may be any time that can be set suitably. The sudden cancellation factors include brake operation, significant steering operation exceeding a threshold value, sudden driving change due to sensor loss, and the like. In a case where the sudden cancellation factor occurs and the automation level of the subject vehicle decreases, when the vehicle exterior notification is also instantaneous, it is easy for those in the periphery of the vehicle to miss the vehicle exterior notification. On the other hand, according to the above configuration, when the sudden cancellation factor occurs and the automation level of the subject vehicle decreases, the vehicle exterior notification is continued for the predetermined time or more. Therefore, it becomes difficult for those in the periphery to miss the vehicle exterior notification. As the vehicle exterior notification, a vehicle exterior notification indicating the decrease in the automation level may be performed. For example, the expression may be similar to the above-described decrease advance notification. Note that "instant decrease in the automation level" can also be rephrased as "automation level decrease without driving change request."

Figure 16:
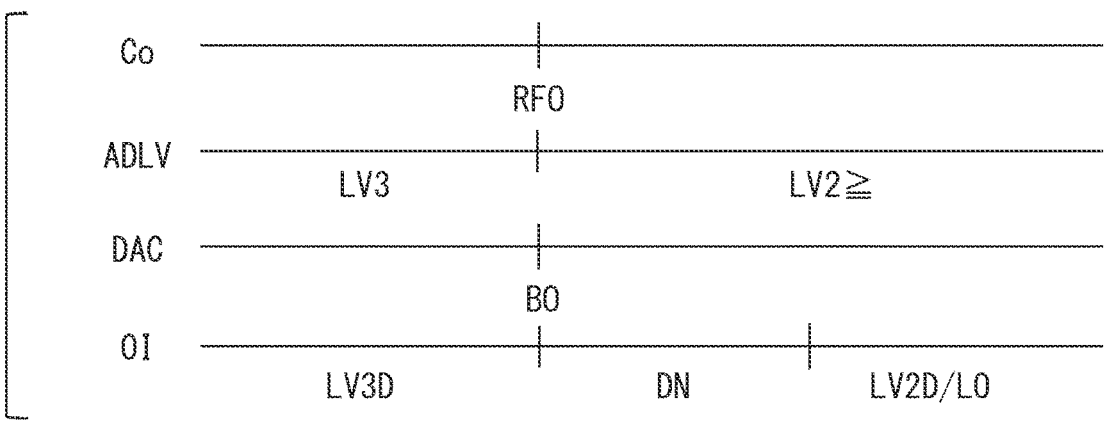
FIG. 16 is a diagram illustrating an example of a timing of the vehicle exterior notification when a sudden cancellation factor causes the automation level of the subject vehicle to decrease.

Here, with reference to FIG. 16, an example of a timing of the vehicle exterior notification when a sudden cancellation factor causes the automation level of the subject vehicle to decrease will be described. FIG. 16 shows an example where the sudden cancellation factor is the brake operation. The example of FIG. 16 shows an example of a case where the automation level decreases from LV 3 to LV 2 or lower. Co in FIG. 16 indicates the situation of the subject vehicle. DAC in FIG. 16 indicates the driver action. OI in FIG. 16 indicates the vehicle exterior notification. When the driver performs the brake operation (see BO in FIG. 13), this means that the sudden cancellation factor has occurred (see RFO in FIG. 16). That is, when the driver performs the brake operation (see BO in FIG. 13), the automation level shifts from LV 3 to the automation level below LV 2. The vehicle exterior notification controller 105 starts decrease notification (see DN in FIG. 15) to provide notification indicating that the automation level has decreased at the timing when the brake operation occurs. The decrease notification may be expressed in the same way as the decrease advance notification, for example. Then, the vehicle exterior notification controller 105 continues this decrease notification for a predetermined time or more. The vehicle exterior notification controller 105 may start the LV 2 notification (see LV2D in FIG. 16) after ending the decrease notification, or may not cause the vehicle exterior notification (see LO in FIG. 16).

Figure 17:
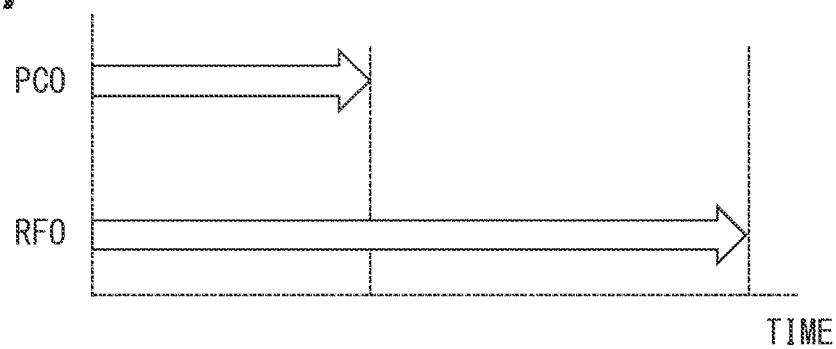
FIG. 17 is a diagram illustrating an example in which a continuation time of the vehicle exterior notification is changed according to a factor causing the automation level to decrease.

When the factor causing the decrease is the sudden cancellation factor, as shown in FIG. 17, it is preferable that the vehicle exterior notification controller 105 continues the vehicle exterior notification for a longer period than that when the factor causing the decrease in the automation level is the scheduled driving change. FIG. 17 is a diagram showing an example in which a continuation time of the vehicle exterior notification is changed according to a factor causing the automation level to decrease. PCO in FIG. 17 shows a case where the factor that causes the decrease in the automation level is the scheduled driving change. RFO in FIG. 17 shows a case where the factor that causes the decrease in the automation level is the sudden cancellation factor. The arrows in FIG. 17 indicate the continuation time of the vehicle exterior notification.

Here, an example has been described in which the automation level decreases from LV 3 to LV 2 or lower. However, the present disclosure is not necessarily the example. For example, it may be applied when the automation level decreases between other automation levels. In this case, when the automation level decrease factor is a factor that can be predicted not immediately before the decrease but before the decrease, the vehicle exterior notification may be performed for notifying the periphery of the possibility that the automation level decreases. On the other hand, when the automation level decrease factor is a factor that cannot be predicted until immediately before the decrease, and when the automation level decreases, the vehicle exterior notification may be performed for notifying the periphery of the decreased automation level.

According to the configuration of the first embodiment, it is possible to change the timing of performing the vehicle exterior notification, which is the notification of information regarding the automated driving and provided to the outside of the subject vehicle, according to the vehicle state regarding the automated driving. Therefore, as described above, it becomes possible to execute the vehicle exterior notification at a timing that is more preferable for the periphery of the subject vehicle, according to the state of the vehicle related to the automated driving. As the result, it is possible to perform the notification related to automated driving towards an outside of a vehicle according to a vehicle state related to the automated driving in a manner that is more preferable for the periphery of the vehicle, when the vehicle performs the automated driving.

Second Embodiment

The present disclosure is not limited to the configuration described in the first embodiment, but can also adopt the following configuration as a second embodiment. The following will describe an example of a configuration of a second embodiment with reference to the accompanying drawings. The vehicle system 1 according to the second embodiment is similar to the vehicle system 1 according to the first embodiment except that an HCU 10a is included instead of the HCU 10. In the second embodiment, it is assumed that the subject vehicle at least performs automated driving without the monitoring obligation as the automated driving.

<Schematic Configuration of HCU>

Figure 18:
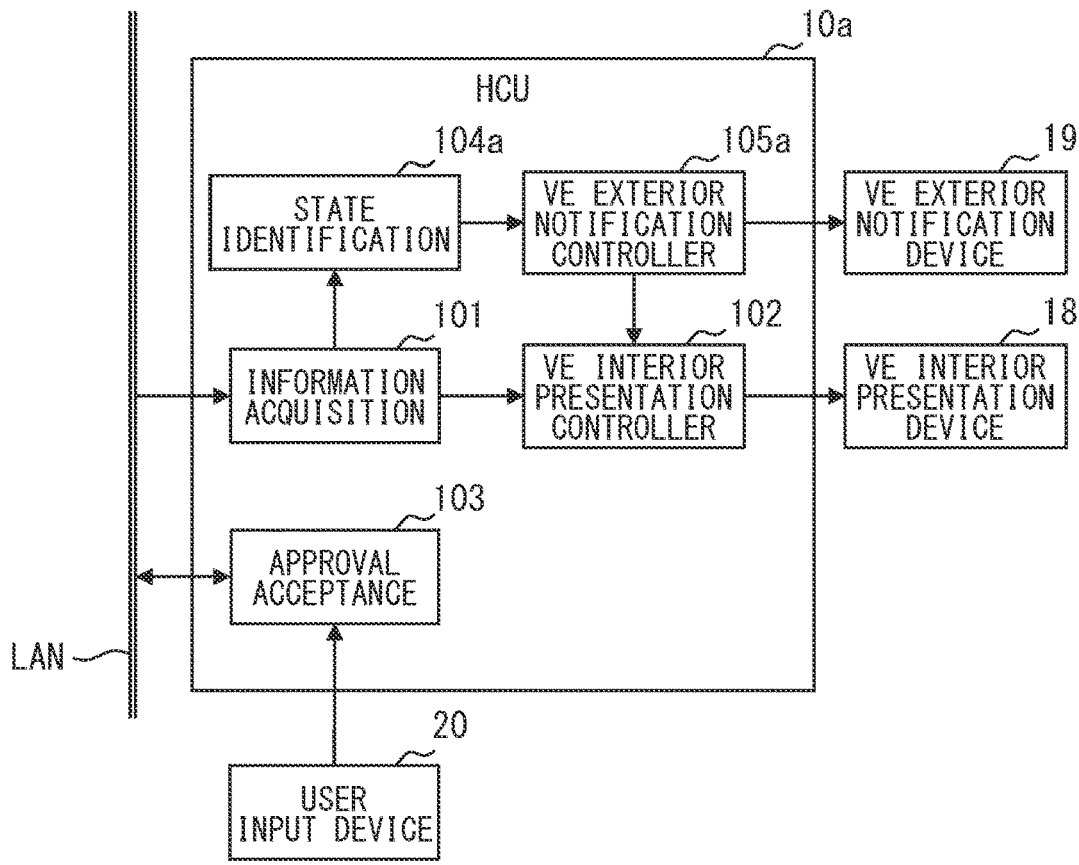
FIG. 18 is a diagram showing an example of a configuration of the HCU.

As shown in FIG. 18, the HCU 10a includes the information acquisition unit 101, the vehicle interior presentation controller 102, the approval acceptance unit 103, a state identification unit 104a, and a vehicle exterior notification controller 105a as functional blocks regarding the control of the vehicle interior presentation device 18 and the vehicle exterior notification device 19. The HCU 10a is similar to the HCU 10 of the first embodiment, except that the state identification unit 104a and the vehicle exterior notification controller 105a are provided instead of the state identification unit 104 and the vehicle exterior notification controller 105, respectively. This HCU 10a also corresponds to the vehicle notification control device. Execution of a process of each functional block of the HCU 10a by the computer also corresponds to execution of the vehicle notification control method.

The state identification unit 104a is similar to the state identification unit 104 of the first embodiment, except that the automated driving-related state to be identified is partially different. Hereinafter, differences from the state identification unit 104 of the first embodiment will be described. The state identification unit 104 identifies at least the start of automated driving without the monitoring obligation and the traveling continuation time of the automated driving without monitoring obligation as the automated driving-related state. The state identification unit 104b may identify the start of automated driving without the monitoring obligation and the traveling continuation time of the automated driving without the monitoring obligation by monitoring the automated driving ECU 17.

Figure 19:
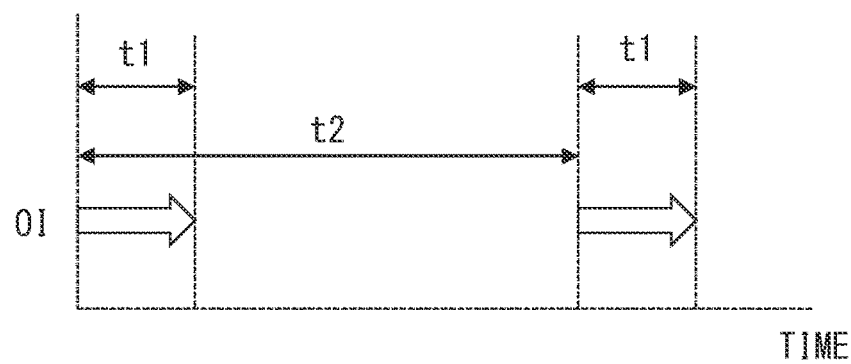
FIG. 19 is a diagram illustrating an example of the timing of re-notification of the vehicle exterior notification.

The vehicle exterior notification controller 105a is similar to the exterior notification controller 105 of the first embodiment, except that some processes are different. Hereinafter, differences from the vehicle exterior notification controller 105 of the first embodiment will be described. When the state identification unit 104a identifies the start of automated driving without the monitoring obligation, the vehicle exterior notification controller 105a continues the vehicle exterior notification (see O1 in FIG. 19) for a first predetermined time, and then ends the vehicle exterior notification (see OI in FIG. 19), as shown in FIG. 19. The first predetermined time may be arbitrarily set. In FIG. 19, the first predetermined time is expressed as t1. The vehicle exterior notification here may be, for example, vehicle exterior notification indicating that the vehicle is performing the automated driving without the monitoring obligation. As an example, the vehicle exterior notification may be provided by lighting a lamp. The lighting color of the lamp may be a color depending on the automation level. On the other hand, the vehicle exterior notification controller 105a performs this vehicle exterior notification again when the traveling continuation time of the automated driving without the monitoring obligation is identified by the state identification unit 104a and exceeds the second predetermined time, as shown in FIG. 19. The second predetermined time is longer than the first predetermined time. In FIG. 19, the second predetermined time is expressed as t2. According to this, even when the vehicle exterior notification ends after starting the automated driving without the monitoring obligation, it becomes possible to cause the vehicle exterior notification to be performed again depending on the continuation time of the automated driving without the monitoring obligation. Therefore, even when the vehicle exterior notification ends after starting the automated driving without the monitoring obligation, it is possible to make it easier for those in the periphery to recognize that the subject vehicle is performing the automated driving without the monitoring obligation.

It is preferable that the vehicle exterior notification controller 105a periodically performs the vehicle exterior notification again when the automated driving without the monitoring obligation continues even after the vehicle exterior notification ends. Thereby, even when the vehicle exterior notification ends after continuing the vehicle exterior notification for the first predetermined time, the vehicle exterior notification is performed periodically. This periodical vehicle exterior notification can make it easier for the periphery to recognize that the subject vehicle is performing the automated driving without the monitoring obligation. The interval at which the vehicle exterior notification is periodically performed may be set arbitrarily.

Third Embodiment

The present disclosure is not limited to the configuration described in the first embodiment, but can also adopt the following configuration as a third embodiment. The following will describe an example of a configuration of the third embodiment with reference to the accompanying drawings.

<Schematic Configuration of Vehicle System>

Figure 20:
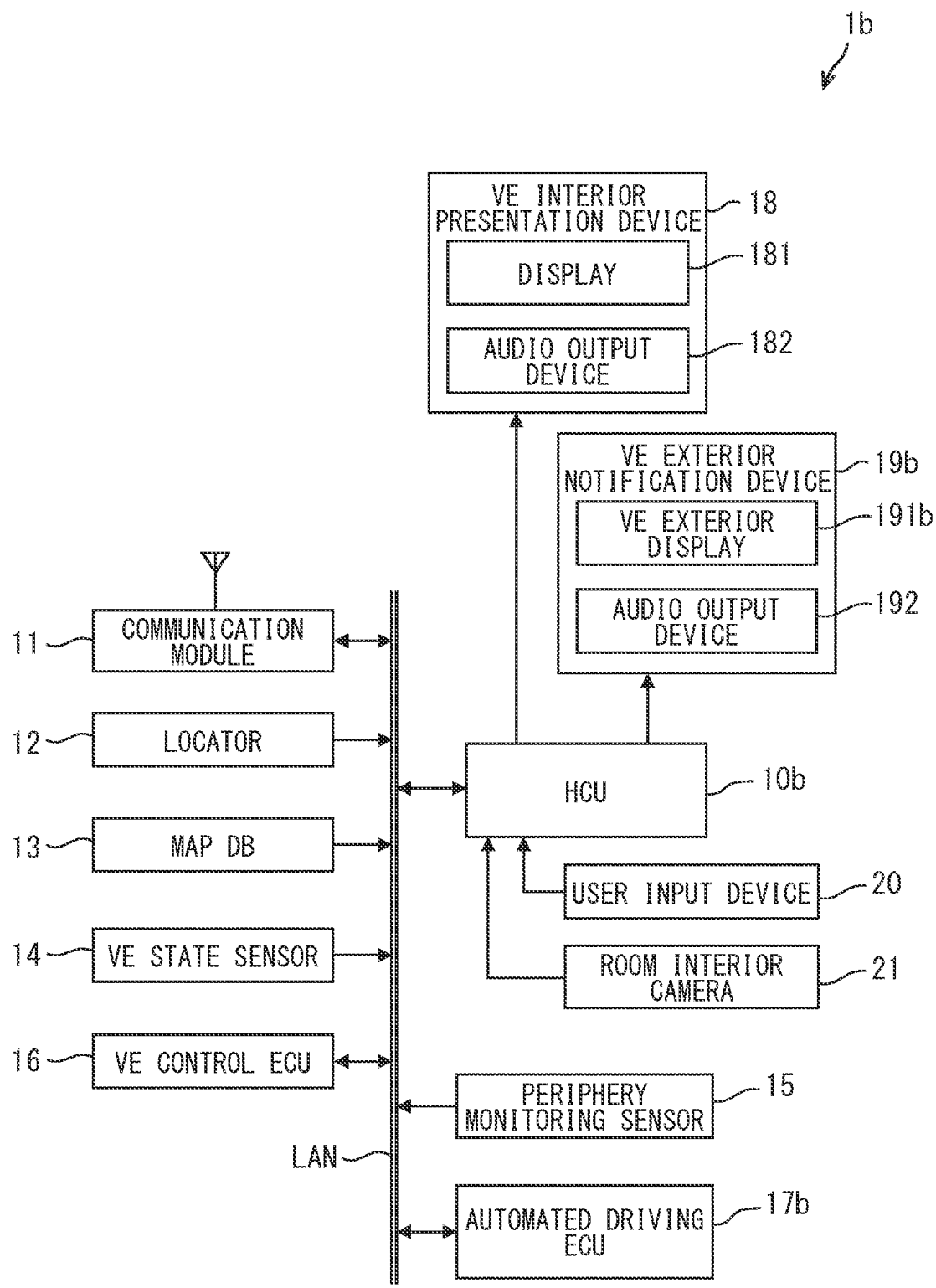
FIG. 20 is a diagram showing an example of a schematic configuration of a vehicle system.

A vehicle system 1b illustrated in FIG. 20 can be used in an automobile. The vehicle system 1b is assumed to be used in an automated driving vehicle that at least performs the automated driving without the monitoring obligation. As shown in FIG. 20, the vehicle system 1b includes an HCU 10b, the communication module 11, the locator 12, the map DB 13, the vehicle state sensor 14, the periphery monitoring sensor 15, the vehicle control ECU 16, an automated driving ECU 17b, the vehicle interior presentation device 18, a vehicle exterior notification device 19b, the user input device 20, and the room interior camera 21. The vehicle system 1b is similar to the vehicle system 1 of the first embodiment, except that the vehicle system 1b includes the HCU 10b, the automated driving ECU 17b, and the vehicle exterior notification device 19b instead of the HCU 10, the automated driving ECU 17, and the vehicle exterior notification device 19 and that it includes the room interior camera 21. Although the vehicle using the vehicle system 1b is not necessarily limited to an automobile, hereinafter, an example using the automobile will be described.

The automated driving ECU 17b is similar to the automated driving ECU 17 of the first embodiment, except that at least LCA (Lane Change Assist) control is executed by a control execution unit. The LCA control is control for automatically moving the subject vehicle from the subject vehicle lane to the adjacent lane. The LCA control generates, based on the recognition result of the traveling environment by the traveling environment recognition unit, and the like, a planned traveling trajectory having a shape that smoothly connects the target position of the subject vehicle lane and the center of the adjacent lane. Then, by automatically controlling the steering angle of the steering wheel of the subject vehicle according to the planned traveling trajectory, the lane may be changed from the subject vehicle lane to the adjacent lane. In the LCA control, when a situation occurs in which lane change is not possible after the lane change is started but before the lane change is completed, the lane change may be interrupted and waited. The automated driving ECU 17b may cause the control execution unit to execute LTC (Lane Tracing control) control. The LTC control is a control to keep the vehicle in the subject vehicle lane. In the LTC control, the steering control is performed so as to keep the subject vehicle traveling within the lane. When starting the lane change under the LCA control, the LTC control should be temporarily interrupted to enable the vehicle to exit from the subject vehicle lane. Then, the LTC control may be restarted after the lane change is completed.

The vehicle exterior notification device 19b has a vehicle exterior display 191b and the audio output device 192. The vehicle exterior display 191b is similar to the vehicle exterior notification device 19 of the first embodiment except that the vehicle exterior display 191b is provided instead of the vehicle exterior display 191. The vehicle exterior display 191b is similar to the vehicle exterior display 191 of the first embodiment, except that the vehicle exterior display 191b is preferably provided at least on the side and rear portion of the subject vehicle. For example, the vehicle exterior display 191b on the side portion of the subject vehicle may be provided at the left and right corners of the front bumper and/or the rear bumper. The vehicle exterior display 191b on the side portion of the subject vehicle may be provided on the left and right side surfaces of the subject vehicle. The vehicle exterior display 191b at the rear of the subject vehicle may be provided, for example, near the center of the rear of the subject vehicle in the vehicle width direction. As the vehicle exterior display 191b at the rear of the subject vehicle, the vehicle exterior display 191b provided at the left and right corners of the rear bumper may be used as the vehicle exterior display 191b on the rear portion of the subject vehicle instead of the side portion of the subject vehicle.

The room interior camera 21 captures an image of a predetermined range in the passenger compartment of the subject vehicle. The room interior camera 21 should just capture the range including the driver's seat of the subject vehicle at least. That is, the room interior camera 21 captures the driver of the subject vehicle. The room interior camera 21 includes, for example, a near-infrared light source and a near-infrared camera, and a control unit that controls these. The room interior camera 21 uses the near-infrared camera to capture the occupant of the subject vehicle to which the near-infrared light is emitted from the near-infrared light source. An image captured by the near-infrared camera is subjected to image analysis by the control unit. The control unit analyzes the captured image to detect the feature amount of the occupant's face. The control unit may detect the occupant's face orientation, the occupant's line-of-sight direction, and the like, based on the detected upper body feature amount including the occupant's face.

<Schematic Configuration of HCU>

Figures 21, 22:
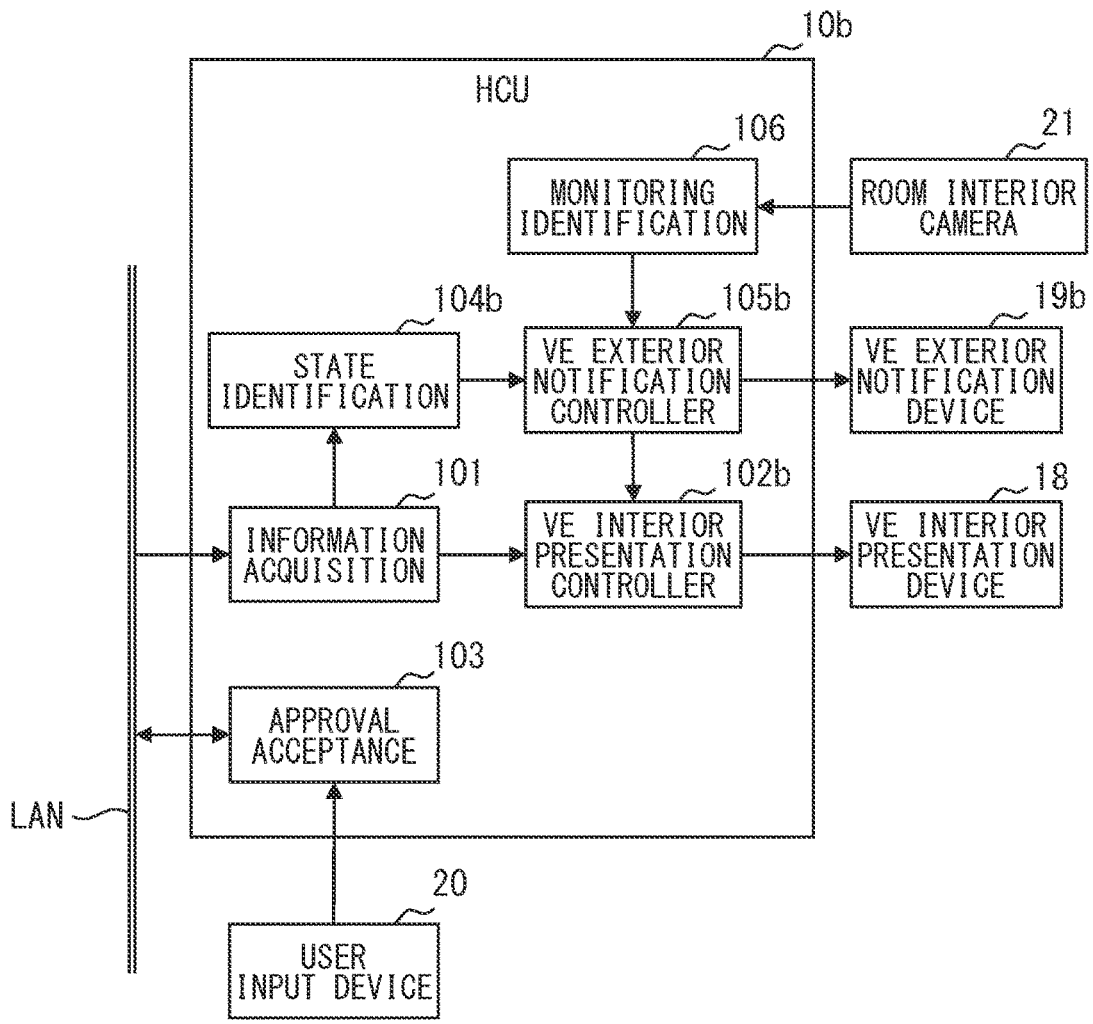
FIG. 21 is a diagram showing an example of a schematic configuration of an HCU.
FIG. 22 is a diagram illustrating an example of the vehicle exterior notification according to a peripheral situation of the subject vehicle after lane change during the automated driving without a monitoring obligation.

Next, a schematic configuration of the HCU 10b will be described with reference to FIG. 21. As shown in FIG. 21, the HCU 10b includes the information acquisition unit 101, a vehicle interior presentation controller 102b, the approval acceptance unit 103, a state identification unit 104b, a vehicle exterior notification controller 105b, and a monitoring identification unit 106 as functional blocks regarding the control of the vehicle interior presentation device 18 and the vehicle exterior notification device 19b. The HCU 10b is similar to the HCU 10 of the first embodiment, except that the HCU 10b includes the state identification unit 104, the vehicle interior presentation controller 102b, and the vehicle exterior notification controller 105b instead of the state identification unit 104, the vehicle interior presentation controller 102, and the vehicle exterior notification controller 105, and that the HCU 10b includes the monitoring identification unit 106. This HCU 10b also corresponds to the vehicle notification control device. Execution of a process of each functional block of the HCU 10b by the computer also corresponds to execution of the vehicle notification control method.

The vehicle interior presentation controller 102b is similar to the vehicle interior presentation controller 102 of the first embodiment, except that some processes are different. The differences from the vehicle interior presentation controller 102 of the first embodiment will be described later.

The state identification unit 104b is similar to the state identification unit 104 of the first embodiment, except that the automated driving-related state to be identified is partially different. Hereinafter, differences from the state identification unit 104 of the first embodiment will be described. The state identification unit 104 identifies at least the start of automated driving without the monitoring obligation and the execution status of the lane change during the automated driving without the monitoring obligation as the automated driving-related state. It is preferable that the state identification unit 104 identifies, as the automated driving-related state, the peripheral situation of the subject vehicle after the lane change during the automated driving without the monitoring obligation. By monitoring the automated driving ECU 17, the state identification unit 104b may identify the start of automated driving without monitoring obligation, the execution status of the lane change during the automated driving without the monitoring obligation, and the peripheral situation of the subject vehicle after the lane change.

The monitoring identification unit 106 identifies whether the driver of the subject vehicle is monitoring the periphery. The monitoring identification unit 106 may identify whether the driver is monitoring the periphery from the driver's face direction, line-of-sight direction, and the like detected by the room interior camera 21.

The vehicle exterior notification controller 105b is similar to the vehicle exterior notification controller 105 of the first embodiment, except that some processes are different. Hereinafter, differences from the vehicle exterior notification controller 105 of the first embodiment will be described. When the state identification unit 104b identifies the start of automated driving without the monitoring obligation, the vehicle exterior notification controller 105b continues the vehicle exterior notification for the first predetermined time, and then ends the vehicle exterior notification similarly to the vehicle exterior notification controller 105a of the second embodiment. On the other hand, the vehicle exterior notification controller 105b causes the vehicle exterior notification again, based on the identification by the state identification unit 104b. The identification is that the lane change is to be executed during the automated driving without the monitoring obligation, or that the lane change has been executed during the automated driving without the monitoring obligation. According to this, even in the case where the vehicle exterior notification ends after starting the automated driving without the monitoring obligation, when the lane change is executed, it becomes possible to cause the vehicle exterior notification to be performed again. Therefore, even when the vehicle exterior notification ends after starting the automated driving without the monitoring obligation, it is possible to make it easier for those in the periphery to recognize that the subject vehicle is performing the automated driving without the monitoring obligation at a time when those in the periphery should pay more attention to the vehicle behavior. Also the vehicle exterior notification here may be, for example, vehicle exterior notification indicating that the vehicle is performing the automated driving without the monitoring obligation. As an example, the vehicle exterior notification may be provided by lighting a lamp. The lane change during the automated driving without the monitoring obligation may be performed by implementing the above-mentioned LCA control.

It is preferable that the vehicle exterior notification controller 105 causes the vehicle exterior notification again when the state identification unit 104 has identified a state where the lane change has been executed during the automated driving without the monitoring obligation or that the different vehicle exists within a predetermined distance in front or rear of the subject vehicle after the completion of the lane change. On the other hand, it is preferable that the vehicle exterior notification controller 105 does not cause the vehicle exterior notification that is to be performed again when the state identification unit 104 has identified a state where the lane change has been executed during the automated driving without the monitoring obligation and has not identified a state where the different vehicle exists within the predetermined distance in front or rear of the subject vehicle after the completion of the lane change. The predetermined distance referred to here may be arbitrarily set. For example, the area within the predetermined distance may be an area within a sensing range of the periphery monitoring sensor 15. According to this, only when there is the different vehicle whose behavior is highly likely to be affected by the lane change of the subject vehicle, it becomes possible to cause the vehicle exterior notification to be performed again. Therefore, it becomes possible to prevent the vehicle exterior notification of which necessity is low.

Here, with reference to FIG. 22, an example of the vehicle exterior notification according to the peripheral situation of the subject vehicle after lane change during the automated driving without the monitoring obligation will be described. In FIG. 22, a case where the different vehicle exists within the predetermined distance in front or rear of the subject vehicle is indicated as a case where a front-rear vehicle exists. In FIG. 22, the case is expressed as "VE EXIST". On the other hand, a case where the different vehicle does not exist within the predetermined distance in front and rear of the subject vehicle is indicated as a case where no front-rear vehicle exists. In FIG. 22, the case is expressed as "NO VE EXIST". As shown in FIG. 22, the vehicle exterior notification controller 105*b* causes the vehicle exterior notification again when the front-rear vehicle exists. On the other hand, the vehicle exterior notification controller 105 does not cause the vehicle exterior notification to be executed again when the front-rear vehicle does not exist.

When the state identification unit 104*b* identifies a state where the lane change is to be executed during the automated driving without the monitoring obligation, the vehicle exterior notification controller 105*b* may start the vehicle exterior notification again while the lane change is in progress. Then, the vehicle exterior notification controller 105*b* may end the vehicle exterior notification when the lane change is completed, or end the vehicle exterior notification after a certain time has elapsed from the completion of the lane change. According to this, the periphery can more easily recognize that the subject vehicle is performing the automated driving without the monitoring obligation before the subject vehicle completes the lane change. The certain time herein may be any time that can be set suitably. The implementation of the lane change may be the implementation of steering for the lane change, or the implementation of LCA control. The completion of lane change may be completion of the steering for the lane change, or the completion of the LCA control.

Figure 23:
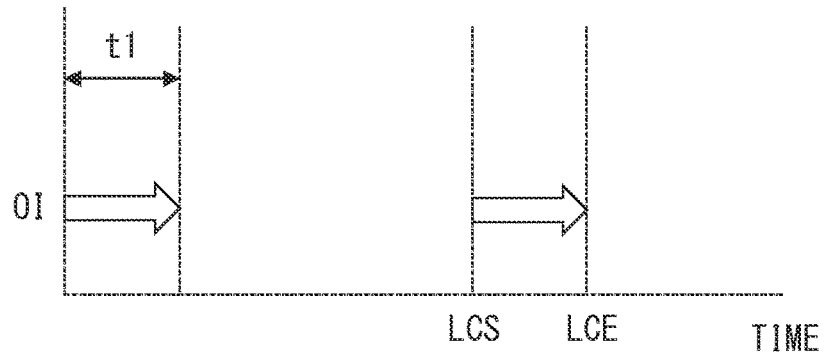
FIG. 23 is a diagram showing an example of a timing of the vehicle exterior notification at a time of the lane change during the automated driving without the monitoring obligation.
Figure 24:
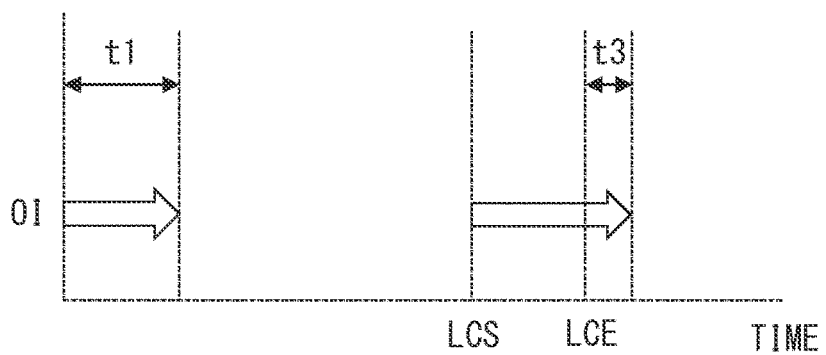
FIG. 24 is a diagram showing an example of a timing of the vehicle exterior notification at the time of the lane change during the automated driving without the monitoring obligation.

Here, with reference to FIGS. 23 and 24, an example of a timing of the vehicle exterior notification at the time of the lane change during the automated driving without the monitoring obligation will be described. The examples in FIGS. 23 and 24 show an example of the flow after the automated driving without the monitoring obligation starts. The arrows in FIGS. 23 and 24 indicate the continuation time of the vehicle exterior notification. The t1 in FIGS. 23 and 24 indicates the first predetermined time. LCS in FIGS. 23 and 24 indicates the lane change start timing. LCE in FIGS. 23 and 24 indicates the timing at which the lane change ends. The t3 in FIG. 24 indicates the above-mentioned constant time. In the following drawings, the same symbols indicate the same contents, and the description will be omitted. As shown in FIGS. 23 and 24, when the automated driving without the monitoring obligation starts, the vehicle exterior notification is performed for the first predetermined time.

After that, when the lane change starts, the vehicle exterior notification starts again. In other words, the second vehicle exterior notification starts This second vehicle exterior notification may end when the lane change is completed, as shown in FIG. 23. Further, as shown in FIG. 24, the second vehicle exterior notification may end after the certain time has elapsed from the completion of the lane change.

When the state identification unit 104*b* identifies a state where the lane change is to be executed during the automated driving without the monitoring obligation, the vehicle exterior notification controller 105*b* may start the vehicle exterior notification again before the start of the lane change. According to this, the periphery can more easily recognize that the subject vehicle is performing the automated driving without the monitoring obligation before the lane change starts when the subject vehicle performs the lane change. The start of the lane change may be the start of steering for the lane change, or the start of LCA control. It is assumed that the LCA control starts before the start of steering for the lane change. The state identification unit 104*b* may identify a state where the lane change is to be executed before the lane change is performed based on the determination result by the behavior determination unit of the automated driving ECU 17*b*.

Figure 25:
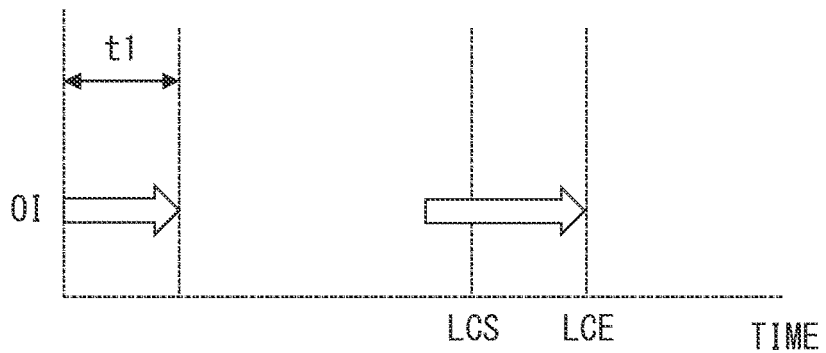
FIG. 25 is a diagram showing an example of a timing of the vehicle exterior notification at the time of the lane change during the automated driving without the monitoring obligation.

Here, with reference to FIG. 25, an example of a timing of the vehicle exterior notification at the time of the lane change during the automated driving without the monitoring obligation will be described. Also the examples in FIG. 25 shows an example of the flow after the automated driving without the monitoring obligation starts. Also the arrows in FIG. 25 indicate the continuation time of the vehicle exterior notification. As shown in FIG. 25, when the automated driving without the monitoring obligation starts, the vehicle exterior notification is performed for the first predetermined time. After that, before the lane change starts, the vehicle exterior notification starts again. This second vehicle exterior notification may end when the lane change is completed, for example As shown in FIG. 24, the second vehicle exterior notification may end after the certain time has elapsed from the completion of the lane change.

In addition, when the state identification unit 104*b* identifies a state where the lane change has been executed during the automated driving without the monitoring obligation, the vehicle exterior notification controller 105*b* may start the vehicle exterior notification again. In this case, the vehicle exterior notification may end after the above-mentioned certain time has elapsed since the vehicle exterior notification starts again.

It is preferable that, when the state identification unit 104*a* identifies a state where the automated lane change has been executed during the automated driving without the monitoring obligation, the vehicle exterior notification controller 105*b* changes the mode of the vehicle exterior notification according to whether the monitoring identification unit 106 identifies whether the driver monitors the periphery. According to this, it is possible to notify the periphery of the subject vehicle whether the driver is monitoring the periphery in the easy-to-understand manner during the execution of the lane change and during the automated driving without the monitoring obligation.

It is preferable that, in the case where the state identification unit 104*a* identifies a state where the automated lane change has been executed during the automated driving without the monitoring obligation, when the monitoring identification unit 106 identifies a state where the driver is monitoring the periphery, the vehicle exterior notification controller 105*b* does not cause the vehicle exterior notification. On the other hand, it is preferable that, when the monitoring identification unit 106 identifies a state where the driver is not monitoring the periphery, the vehicle exterior notification controller 105*b* causes the vehicle exterior notification. According to this, when the driver is monitoring the periphery and there is less need for the periphery to pay attention to the behavior of the subject vehicle, it is possible to omit the vehicle exterior notification again. Therefore, it becomes possible to prevent the vehicle exterior notification of which necessity is low. It is assumed that the subject vehicle turn lamp, which is a direction indicator, blinks during the lane change.

Here, with reference to FIG. 26, an example of changing the vehicle exterior notification will be described. The change is performed according to whether the driver monitors the periphery when the lane change is performed during execution of the automated lane change and the automated driving without the monitoring obligation. As shown in FIG. 26, the vehicle exterior notification controller 105*b* does not turn on the lamp for the vehicle exterior notification when the driver is monitoring the periphery during the lane change. On the other hand, as shown in FIG. 26, the vehicle exterior notification controller 105*b* turns on the lamp for the vehicle exterior notification when the driver is not monitoring the periphery during the lane change. Also, as shown in FIG. 26, it is assumed that the turn lamp blinks during execution of the lane change regardless of whether the driver is monitoring the periphery.

In the description so far, the example of lighting the lamp has been given as an example of the vehicle exterior notification when changing lanes. However, the present disclosure is not necessarily limited to this. For example, the vehicle exterior notification when changing the lane may be blink of the lamp.

It is preferable that the vehicle exterior notification controller 105*b* causes the vehicle exterior display 191*b* placed on the side portion of the subject vehicle to perform the vehicle exterior notification indicating a waiting state, when the state identification unit 104 identifies the waiting state. The waiting state is a state where, when the lane change is being performed during the automated driving without the monitoring obligation, the lane change is interrupted and the operation is waited. When the lane change of the subject vehicle is in the waiting state, it is more necessary for a different vehicle positioned on the left or right of the subject vehicle to pay attention to the behavior of the subject vehicle. On the other hand, according to the above configuration, it is possible to make it easier for the different vehicles, which need to pay more attention to the behavior of the subject vehicle, to recognize that the subject vehicle is in the waiting state. The vehicle exterior notification indicating that the vehicle is in the waiting state (hereinafter referred to as "waiting notification") may be different from the above-mentioned vehicle exterior notification (hereinafter referred to as "basic notification") which is notified again when the lane change is performed. For example, when the basic notification is the lighting of a lamp, the waiting notification may be the blink of the lamp. When the basic notification is the blink of the lamp, the waiting notification may be the blink in a different color from the basic notification.

The vehicle exterior notification controller 105*b* may not change, according to whether the state identification unit 104*b* identifies a state where the subject vehicle is in the above waiting state, the vehicle exterior notification of the vehicle exterior display 191*b* placed at positions other than the side portion of the subject vehicle. For example, the vehicle exterior notification controller 105*b* may not change, according to whether the state identification unit 104*b* identifies a state where the subject vehicle is in the above waiting state, the vehicle exterior notification of the vehicle exterior display 191*b* placed at the rear of the subject vehicle. According to this, only for the different vehicles, which need to pay more attention to the behavior of the subject vehicle, can easily recognize that the subject vehicle is in the waiting state.

It is preferable that the vehicle exterior notification controller 105*b* causes, among the vehicle exterior displays 191*b* placed on the left and the right side portions of the subject vehicle, only the vehicle exterior display 191*b* according to a lane change direction of the subject vehicle to perform the vehicle exterior notification indicating the waiting state, when the state identification unit 104 identifies a state where the subject vehicle is in the waiting state described above. When the lane change of the subject vehicle is in the waiting state, it is particularly necessary for a different vehicle positioned close to the side portion according to the lane change among the side portions of the subject vehicle to pay attention to the behavior of the subject vehicle. On the other hand, according to the above configuration, the different vehicles, which particularly need to pay more attention to the behavior of the subject vehicle, can easily recognize that the subject vehicle is in the waiting state.

Here, with reference to FIG. 27, an example of changing the vehicle exterior notification according to the situation of the lane change will be described. When, although the subject vehicle is performing the lane change during the automated driving without the monitoring obligation, the subject vehicle is not in the above waiting state (hereinafter, in a non-waiting state), the vehicle exterior notification controller 105 may not perform the waiting notification as shown in FIG. 27. In the above-described waiting state, when the subject vehicle performs the lane change to the right, the vehicle exterior notification controller 105*b* causes the vehicle exterior display 191*b* to issue the waiting notification provided on the right side portion of the subject vehicle, as shown in FIG. 27. In the above-described waiting state, when the subject vehicle performs the lane change to the left, the vehicle exterior notification controller 105*b* causes the vehicle exterior display 191*b* to issue the waiting notification provided on the left side portion of the subject vehicle, as shown in FIG. 27.

It is preferable that the vehicle interior presentation controller 102*b* causes the vehicle interior notification indicating the execution status of the lane change without causing the vehicle interior notification indicating the automation level of the subject vehicle, based on the identification by the state identification unit 104*b*. The identification is that the lane change is to be executed during the automated driving without the monitoring obligation, or that the lane change has been executed during the automated driving without the monitoring obligation. According to this, when the subject vehicle performs the lane change during the automated driving without the monitoring obligation, it becomes possible to inform the driver of the execution status of the lane change in the emphasized manner. An example of the vehicle interior notification indicating the automation level of the subject vehicle is a vehicle exterior notification lamp image shown by OLI in FIG. 7

Figure 28:
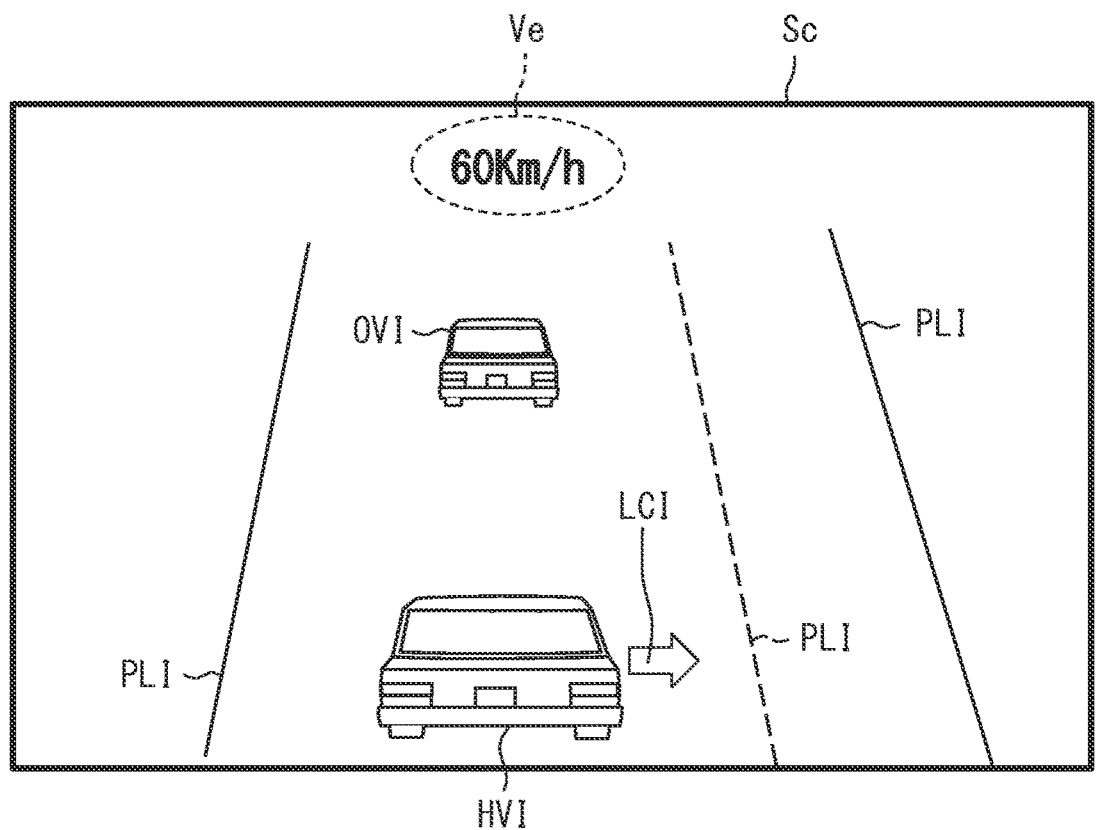
FIG. 28 is a diagram for illustrating an example of vehicle interior notification indicating an execution status of the lane change.

Here, with reference to FIG. 28, an example of the vehicle interior notification indicating the execution status of the lane change will be described. FIG. 28 is a diagram showing an example in which the vehicle interior notification indicating the execution status of the lane change is performed in the foreground image described with reference to FIG. 5. LCI in FIG. 28 shows an image (hereinafter referred to as an LC image) representing the execution status of the lane change of the subject vehicle. In FIG. 28, an arrow icon indicating the direction in which the subject vehicle changes lanes is shown as an example of the LC image. For example, when the subject vehicle is in the above-described waiting state, an icon representing cancellation may be displayed as the LC image.

Fourth Embodiment

Figure 29:
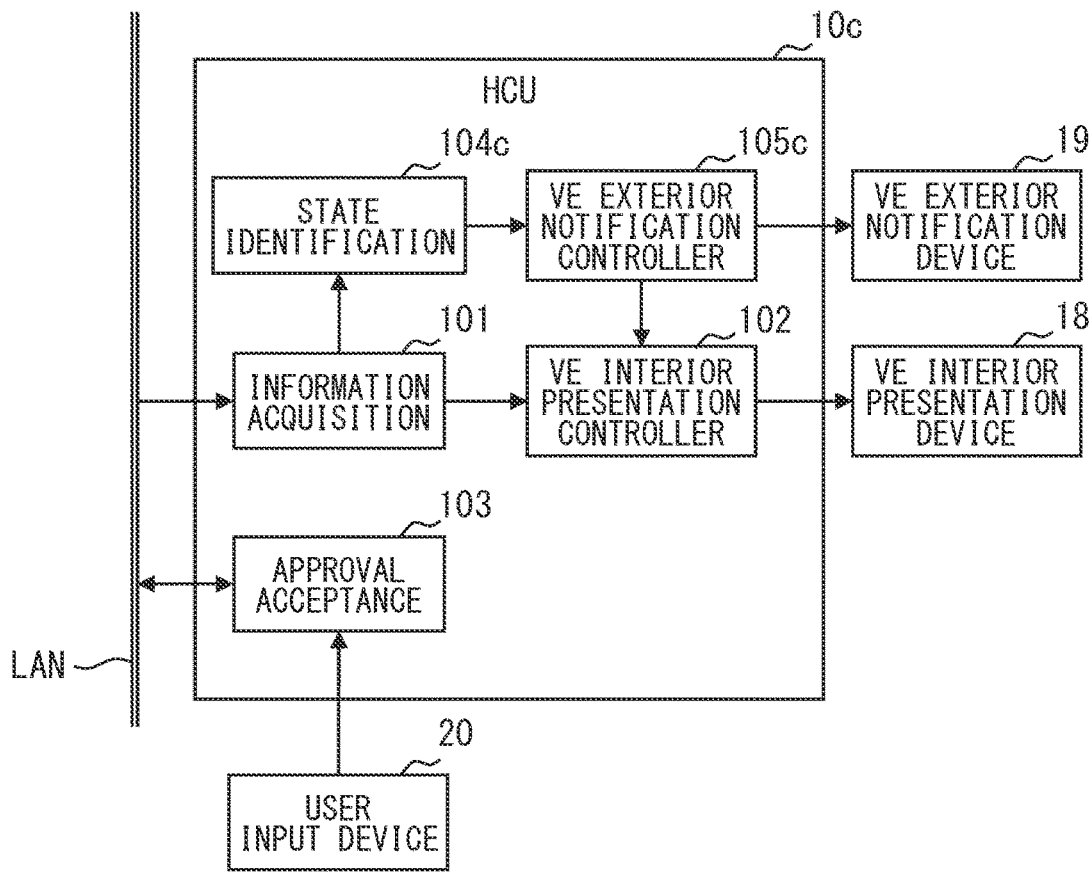
FIG. 29 is a diagram showing an example of a configuration of an HCU.

The present disclosure is not limited to the configuration described in the first embodiment, but can also adopt the following configuration as a fourth embodiment. The following will describe a detailed example of the fourth embodiment with reference to the accompanying drawings. The vehicle system 1 according to the fourth embodiment is similar to the vehicle system 1 according to the first embodiment except that an HCU 10*a* is included instead of the HCU 10.
<Schematic Configuration of HCU>
As shown in FIG. 29, the HCU 10*c* includes the information acquisition unit 101, the vehicle interior presentation controller 102, the approval acceptance unit 103, a state identification unit 104*c*, and a vehicle exterior notification controller 105*c* as functional blocks regarding the control of the vehicle interior presentation device 18 and the vehicle exterior notification device 19. The HCU 10*c* is similar to the HCU 10 of the first embodiment, except that the state identification unit 104*c* and the vehicle exterior notification controller 105*c* are provided instead of the state identification unit 104 and the vehicle exterior notification controller 105, respectively. This HCU 10*c* also corresponds to the vehicle notification control device. Execution of a process of each functional block of the HCU 10*c* by the computer also corresponds to execution of the vehicle notification control method.

The state identification unit 104*c* is similar to the state identification unit 104 of the first embodiment, except that the automated driving-related state to be identified is partially different. Hereinafter, differences from the state identification unit 104 of the first embodiment will be described. The state identification unit 104*c* identifies at least the peripheral situation of the subject vehicle during the automated driving as the automated driving-related state. The state identification unit 104*c* may identify the peripheral situation of the subject vehicle during the automated driving by monitoring the automated driving ECU 17.

The vehicle exterior notification controller 105*c* is similar to the exterior notification controller 105 of the first embodiment, except that some processes are different. Hereinafter, differences from the vehicle exterior notification controller 105 of the first embodiment will be described. The vehicle exterior notification controller 105*c* causes the vehicle exterior notification when the state identification unit 104 has identified a situation where the vehicle-to-vehicle distance between the subject vehicle during the automated driving and the rear vehicle with respect to the subject vehicle is less than a threshold continues for a designated time or more. The vehicle exterior notification here may be, for example, vehicle exterior notification indicating that the vehicle is performing the automated driving. As an example, the vehicle exterior notification may be provided by lighting a lamp. The lighting color of the lamp may be a color depending on the automation level. The rear vehicle referred to here is the vehicle immediately behind the subject vehicle. The threshold may be arbitrarily set. For example, the threshold value may be a distance less than the recommended vehicle-to-vehicle distance for following traveling. The designated time may be arbitrarily set. The designated time may be, for example, about several tens of seconds. When the subject vehicle is performing the automated driving, the system of the subject vehicle complies with the speed limit. On the other hand, when the rear vehicle behind the subject vehicle is not performing the automated driving, the driver of the rear vehicle may not comply with the speed limit. Therefore, the vehicle-to-vehicle distance between the subject vehicle and the rear vehicle becomes shorter. According to the above configuration, by causing the vehicle exterior notification in such a case, it is possible to cause the driver of the rear vehicle to aware that the speed limit cannot be increased because the automated driving complies with the speed limit.

Figure 30:
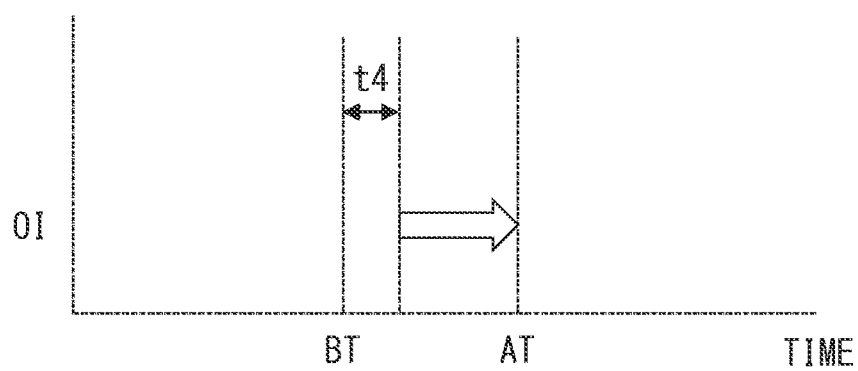
FIG. 30 is a diagram illustrating an example of a timing of the vehicle exterior notification according to the peripheral situation of the subject vehicle.

Here, with reference to FIG. 30, an example of a timing of the vehicle exterior notification will be described according to the peripheral situation of the subject vehicle. The example in FIG. 30 shows an example of the flow after the automated driving starts. An arrow in FIG. 30 indicates the continuation time of the vehicle exterior notification. The t4 in FIG. 30 indicates the above-described designated time. BT in FIG. 30 indicates the timing when the vehicle-to-vehicle distance between the subject vehicle and the rear vehicle behind the subject vehicle becomes less than the threshold. AT in FIG. 30 indicates the timing when the vehicle-to-vehicle distance between the subject vehicle and the rear vehicle behind the subject vehicle becomes equal to or more than the threshold. As shown in FIG. 30, the vehicle exterior notification starts at the timing when a state where the vehicle-to-vehicle distance between the subject vehicle and the rear vehicle behind the subject vehicle is less than the threshold continues for a designated time or more. The vehicle exterior notification may end at the timing when the vehicle-to-vehicle distance between the subject vehicle and the rear vehicle behind the subject vehicle becomes the threshold or more. The vehicle exterior notification controller 105*c* may end the vehicle exterior notification by using the elapsed time from the start of the vehicle exterior notification as a trigger.

Fifth Embodiment

Figure 31:
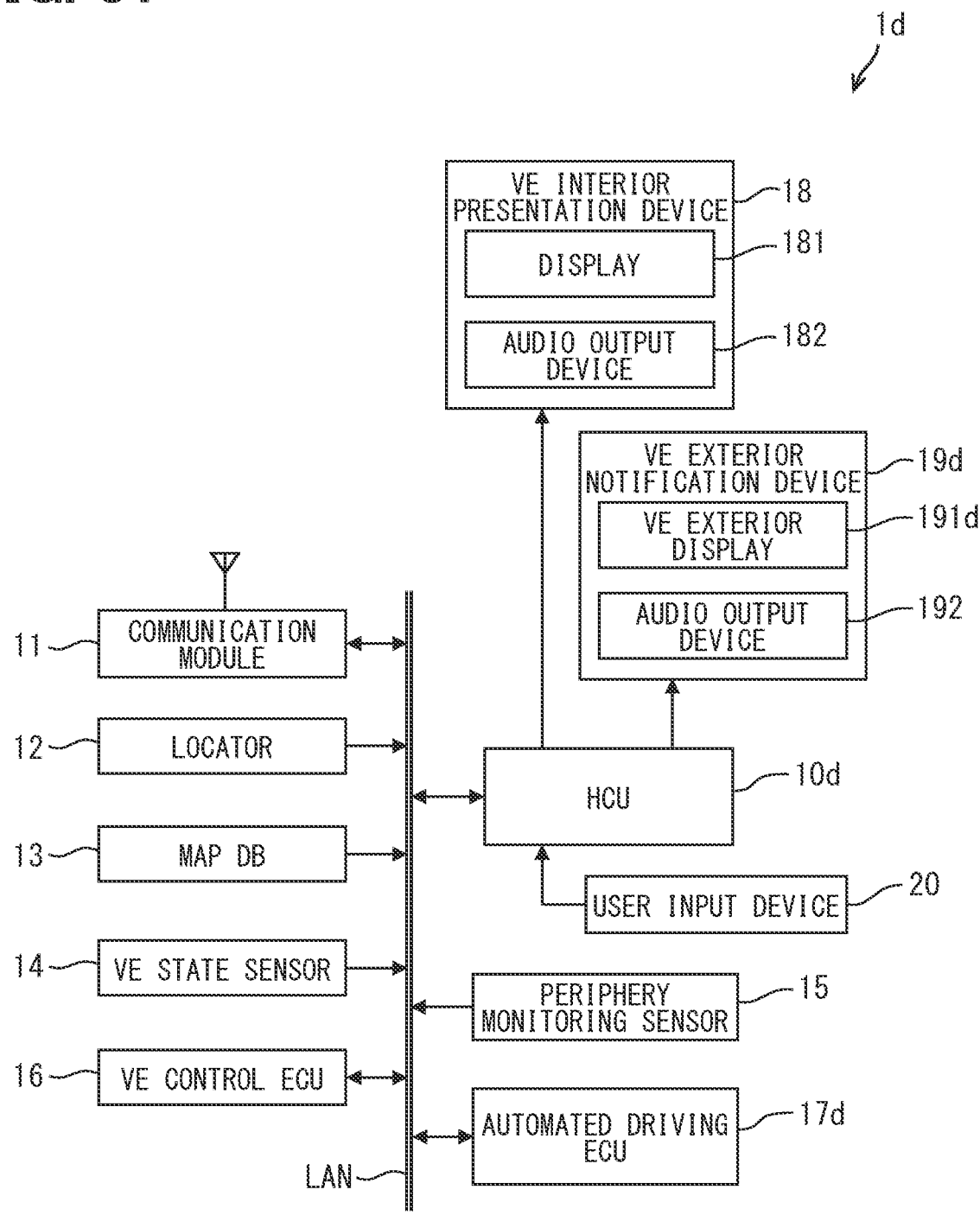
FIG. 31 is a diagram showing an example of a schematic configuration of a vehicle system.

The present disclosure is not limited to the configuration described in the first embodiment, but can also adopt the following configuration as a fifth embodiment. The following will describe a detailed example of the fifth embodiment with reference to the accompanying drawings.
<Schematic Configuration of Vehicle System>
A vehicle system 1*d* shown in FIG. 31 can be used in an automobile. As shown in FIG. 31, the vehicle system 1*d* includes an HCU 10*d*, the communication module 11, the locator 12, the map DB 13, the vehicle state sensor 14, the periphery monitoring sensor 15, the vehicle control ECU 16, an automated driving ECU 17*d*, the vehicle interior presentation device 18, a vehicle exterior notification device 19*d*, and the user input device 20. The vehicle system 1*d* is similar to the vehicle system 1 of the first embodiment, except that the vehicle system 1*b* includes the HCU 10*d*, the automated driving ECU 17*d*, and the vehicle exterior notification device 19*d* instead of the HCU 10, the automated driving ECU 17, and the vehicle exterior notification device 19. Although the vehicle using the vehicle system 1*d* is not necessarily limited to an automobile, hereinafter, an example using the automobile will be described.

The automated driving ECU 17*d* is the same as the automated driving ECU 17 of the first embodiment, except that at least the ACC (Adaptive Cruise Control) control is executed by a control execution unit. The ACC control is control that allows the subject vehicle to travel at a constant speed that is a set vehicle speed or to implement the following traveling for following a preceding vehicle. In the following traveling, an acceleration-deacceleration control is performed for maintaining the vehicle-to-vehicle distance between the subject vehicle and the nearest preceding vehicle at a target vehicle-to-vehicle distance. The target vehicle-to-vehicle distance may be set depending on the speed of the subject vehicle.

The vehicle exterior notification device 19*d* has a vehicle exterior display 191*d* and the audio output device 192. The vehicle exterior display 191*d* is similar to the vehicle exterior notification device 19 of the first embodiment except that the vehicle exterior display 191*d* is provided instead of the vehicle exterior display 191. The vehicle exterior display 191*d* is similar to the vehicle exterior display 191 of the first embodiment, except that the vehicle exterior display 191*d* is provided on the front portion of the subject vehicle. For example, the vehicle exterior display 191*d* at the front of the subject vehicle may be provided at the left and right corners of a front bumper. The vehicle exterior display 191*d* at the front of the subject vehicle may be provided in the vicinity of the central portion in the vehicle width direction of the front portion of the subject vehicle, for example.

<Schematic Configuration of HCU>

Next, a schematic configuration of the HCU 10*d* will be described with reference to FIG. 32. As shown in FIG. 32, the HCU 10*d* includes the information acquisition unit 101, the vehicle interior presentation controller 102, the approval acceptance unit 103, a state identification unit 104*d*, and a vehicle exterior notification controller 105*d* as functional blocks regarding the control of the vehicle interior presentation device 18 and a vehicle exterior notification device 19*d*. The HCU 10*d* is similar to the HCU 10 of the first embodiment, except that the state identification unit 104*d* and the vehicle exterior notification controller 105*d* are provided instead of the state identification unit 104 and the vehicle exterior notification controller 105, respectively. This HCU 10*d* also corresponds to the vehicle notification control device. Execution of a process of each functional block of the HCU 10*d* by the computer also corresponds to execution of the vehicle notification control method.

The state identification unit 104*d* is similar to the state identification unit 104 of the first embodiment, except that the automated driving-related state to be identified is partially different. Hereinafter, differences from the state identification unit 104 of the first embodiment will be described. The state identification unit 104*d* identifies at least the following situation of the subject vehicle during the automated driving as the automated driving-related state. The state identification unit 104*d* may identify the following situation of the subject vehicle during the automated driving by monitoring the automated driving ECU 17. The following situation is the situation of the subject vehicle following the preceding vehicle. The subject vehicle may follow the preceding vehicle during the automated driving by executing the above-mentioned ACC control.

The vehicle exterior notification controller 105*d* is similar to the vehicle exterior notification controller 105 of the first embodiment, except that some processes are different. Hereinafter, differences from the vehicle exterior notification controller 105 of the first embodiment will be described. When the state identification unit 104*d* identifies a situation in which the subject vehicle starts following the preceding vehicle during the automated driving, the vehicle exterior notification controller 105*d* issues the vehicle exterior notification from the vehicle exterior display 191*d* provided at the front portion of the subject vehicle. According to this, at the timing when the subject vehicle starts following the preceding vehicle, it becomes possible to cause the driver of the preceding vehicle to recognize that the subject vehicle has started following the preceding vehicle. Since the vehicle exterior display 191*d* provided at the front portion of the subject vehicle provides the vehicle exterior notification, the driver of the preceding vehicle can recognize this vehicle exterior notification through a rearview mirror.

Here, with reference to FIG. 33, an example of a timing of the vehicle exterior notification will be described according to the following situation of the subject vehicle. The example in FIG. 33 shows an example of the flow after the automated driving starts. An arrow in FIG. 33 indicates the continuation time of the vehicle exterior notification. SF in FIG. 33 indicates the timing at which the subject vehicle starts following the preceding vehicle. EF in FIG. 33 indicates the timing at which the subject vehicle ends following the preceding vehicle. As shown in FIG. 33, the vehicle exterior notification starts at the timing when the subject vehicle starts following the preceding vehicle. The vehicle exterior notification may end at the timing when the subject vehicle ends following the preceding vehicle. The vehicle exterior notification controller 105*d* may end the vehicle exterior notification by using the elapsed time from the start of the vehicle exterior notification as a trigger.

It is preferable that the vehicle exterior notification controller 105*d* causes the vehicle exterior notification by blink during adjustment of the vehicle speed of the subject vehicle. On the other hand, it is preferable that the vehicle exterior notification controller 105*d* causes the vehicle exterior notification by lighting while the subject vehicle travels at a constant speed. According to this, it becomes easier for the driver of the preceding vehicle to distinguish and recognize whether the subject vehicle that is following the preceding vehicle is adjusting its vehicle speed or is traveling at a constant speed.

Here, with reference to FIG. 34, an example of changing the vehicle exterior notification will be described. In the example, the vehicle exterior notification is changed when the vehicle exterior notification is performed in the case where the vehicle follows the preceding vehicle. As shown in FIG. 34, the vehicle exterior notification controller 105*d* blinks a lamp as the vehicle exterior notification while adjusting the vehicle speed of the subject vehicle. On the other hand, as shown in FIG. 34, the vehicle exterior notification controller 105*d* turns on the lamp as the vehicle exterior notification while the subject vehicle travels at the constant speed.

Sixth Embodiment

The present disclosure is not limited to the configuration described in the first embodiment, but can also adopt the following configuration as a sixth embodiment. The following will describe a detailed example of the sixth embodiment with reference to the accompanying drawings. The vehicle system 1 according to the sixth embodiment is similar to the vehicle system 1 according to the first embodiment except that an HCU 10*e* is included instead of the HCU 10.

<Schematic Configuration of HCU>

Figure 35:
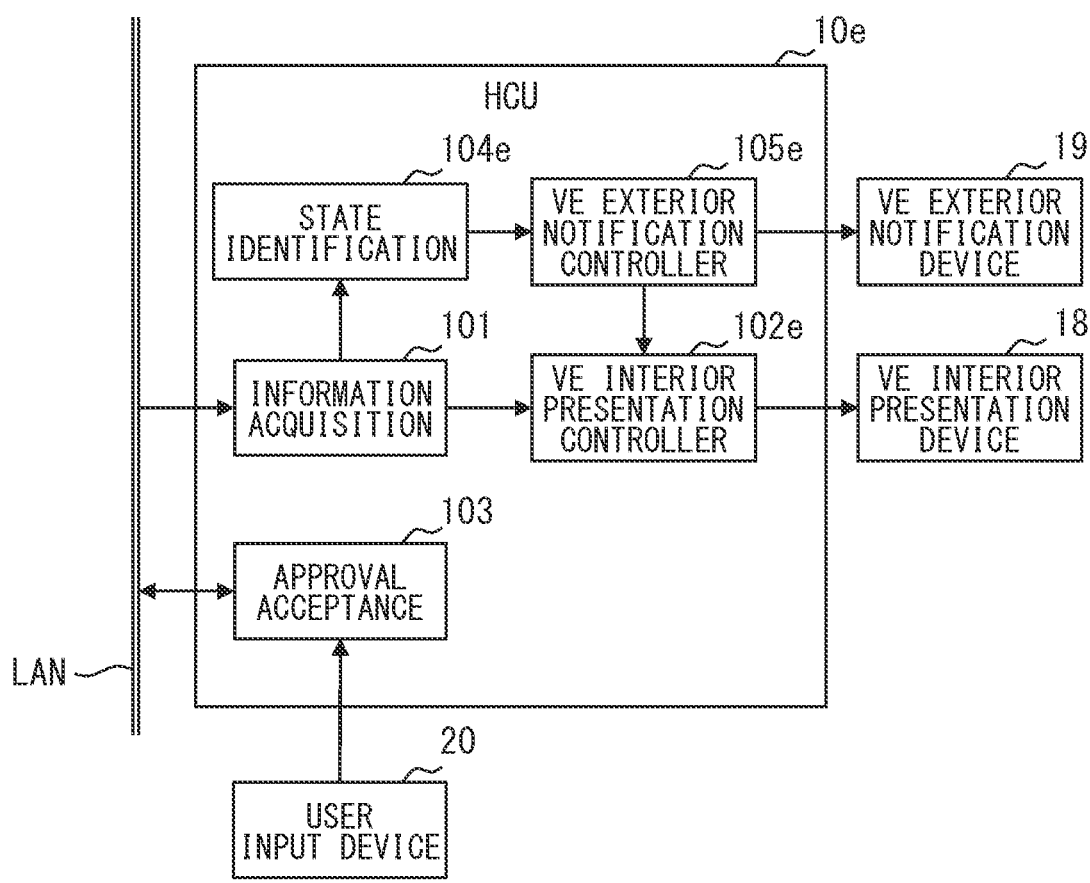
FIG. 35 is a diagram showing an example of a configuration of an HCU.

As shown in FIG. 35, the HCU 10c includes the information acquisition unit 101, a vehicle interior presentation controller 102e, the approval acceptance unit 103, a state identification unit 104e, and a vehicle exterior notification controller 105e as functional blocks regarding the control of the vehicle interior presentation device 18 and the vehicle exterior notification device 19. The HCU 10e is similar to the HCU 10 of the first embodiment, except that the HCU 10e includes the vehicle interior presentation controller 102e, the state identification unit 104e, and the vehicle exterior notification controller 105e instead of the vehicle interior presentation controller 102, the state identification unit 104, and the vehicle exterior notification controller 105. This HCU 10e also corresponds to the vehicle notification control device. Execution of a process of each functional block of the HCU 10e by the computer also corresponds to execution of the vehicle notification control method.

The vehicle interior presentation controller 102e is similar to the vehicle interior presentation controller 102 of the first embodiment, except that some processes are different. The differences from the vehicle interior presentation controller 102 of the first embodiment will be described later.

The state identification unit 104e is similar to the state identification unit 104 of the first embodiment, except that the automated driving-related state to be identified is partially different. Hereinafter, differences from the state identification unit 104 of the first embodiment will be described. The state identification unit 104e identifies at least a passing situation of the subject vehicle at an intersection during the automated driving as the automated driving-related state. The state identification unit 104e may identify the passing situation of the subject vehicle at the intersection during the automated driving by monitoring the automated driving ECU 17.

The vehicle exterior notification controller 105e is similar to the exterior notification controller 105 of the first embodiment, except that some processes are different. Hereinafter, differences from the vehicle exterior notification controller 105 of the first embodiment will be described. When the state identification unit 104e identifies a state where a temporary stop is required before a crosswalk when the vehicle turns right or left at the intersection during automated driving, the vehicle exterior notification controller 105e causes the vehicle exterior notification (hereinafter, scheduled temporary stop vehicle exterior notification) indicating that the temporary stop is scheduled. The situation in which the temporary stop is necessary before the crosswalk when the vehicle turns left or right at the intersection is a situation in which there are passerby at the crosswalk, or a situation in which there are passersby who are estimated to be entering the crosswalk. It is assumed that the scheduled temporary stop vehicle exterior notification starts before the temporary stop is actually performed. The scheduled temporary stop vehicle exterior notification may be vehicle exterior notification different from the vehicle exterior notification indicating that the automated driving is being performed. For example, the configuration may be such that the audio output device 192 outputs audio informing that the temporary stop is scheduled. Alternatively, information indicating that the temporary stop is scheduled may be displayed on the vehicle exterior display 191.

In a case where the state identification unit 104e identifies a state where a temporary stop is required before a crosswalk when the vehicle turns right or left at the intersection during automated driving, the vehicle interior presentation controller 102e causes the vehicle interior notification (hereinafter, scheduled temporary stop vehicle interior notification) indicating that the temporary stop is scheduled. It is assumed that the scheduled temporary stop vehicle interior notification starts before the temporary stop is actually performed. The scheduled temporary stop vehicle interior notification may be performed, for example, by displaying on the display 181. For example, an icon, text, or the like indicating that the temporary stop is scheduled may be displayed in the foreground image.

It is preferable that, when the state identification unit 104e has identified a state where the temporary stop is necessary before the crosswalk at the time of turning left or right at the intersection during the automated driving, the vehicle exterior notification controller 105e starts the scheduled temporary stop vehicle exterior notification after the vehicle interior presentation controller 102e causes the scheduled temporary stop vehicle interior notification. This is because, compared to the scheduled temporary stop vehicle interior notification, the scheduled temporary stop vehicle exterior notification tends to confuse the target of the notification if it is provided earlier. On the other hand, the end of the scheduled temporary stop vehicle exterior notification and the end of the scheduled temporary stop vehicle interior notification may be set at the same timing.

Figure 36:
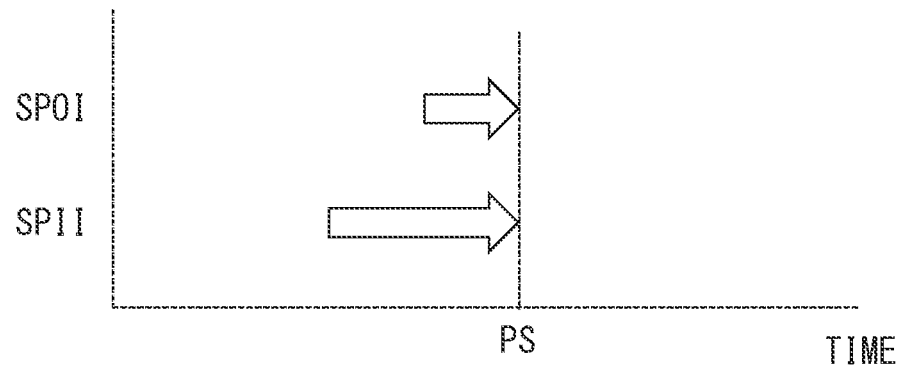
FIG. 36 is a diagram illustrating an example of the timing of a scheduled temporary stop vehicle exterior notification and a scheduled temporary stop vehicle interior notification when a temporary stop is required before a crosswalk when making a right or left turn at an intersection during the automated driving.

Here, with reference to FIG. 36, an example of the timing of the scheduled temporary stop vehicle exterior notification and the scheduled temporary stop vehicle interior notification will be described. In the example, the timing are timings when the temporary stop is required before the crosswalk when the vehicle turns right or left at the intersection during the automated driving. In FIG. 36, SPOT indicates the scheduled temporary stop vehicle exterior notification, and SPIT indicates the scheduled temporary stop vehicle interior notification. A SPOT arrow in FIG. 36 indicates the continuation time of the scheduled temporary stop vehicle exterior notification. A SPIT arrow in FIG. 36 indicates the continuation time of the scheduled temporary stop vehicle interior notification. PS in FIG. 36 indicates the start timing of the temporary stop before the crosswalk. As shown in FIG. 36, the scheduled temporary stop vehicle exterior notification is performed after the scheduled temporary stop vehicle interior notification, when the temporary stop is necessary before the crosswalk when making the right or left turn at the intersection during the automated driving. On the other hand, the end of the scheduled temporary stop vehicle exterior notification and the end of the scheduled temporary stop vehicle interior notification may be set at the same timing. The example in FIG. 36 shows an example in which the scheduled temporary stop vehicle exterior notification and the scheduled temporary stop vehicle interior notification end at the start timing of the temporary stop of the subject vehicle before the crosswalk. However, the present disclosure is not necessarily limited to the example. The end timing of the scheduled temporary stop vehicle exterior notification and the end timing of the scheduled temporary stop vehicle interior notification may be different from each other.

When the state identification unit 104e identifies a state where the temporary stop has been performed before the crosswalk when the vehicle turns right or left at the intersection during automated driving, the vehicle exterior notification controller 105e causes the vehicle exterior notification (hereinafter, temporary stop vehicle exterior notification) indicating that the temporary stop has been performed. The temporary stop vehicle exterior notification may be vehicle exterior notification different from the vehicle exterior notification indicating that the automated driving is being performed. The temporary stop vehicle exterior notification may be vehicle exterior notification different from the scheduled temporary stop vehicle exterior notification. For example, the configuration may be such that the audio output device 192 outputs audio informing that the temporary stop has been performed. Alternatively, information indicating that the temporary stop has been performed may be displayed on the vehicle exterior display 191.

When the state identification unit 104e identifies a state where the temporary stop has been performed before the crosswalk when the vehicle turns right or left at the intersection during automated driving, the vehicle interior presentation controller 102e causes the vehicle interior notification (hereinafter, temporary stop vehicle interior notification) indicating that the temporary stop has been performed. The temporary stop vehicle interior notification may be vehicle interior notification different from the scheduled temporary stop vehicle interior notification. The temporary stop vehicle interior notification may be performed, for example, by displaying on the display 181. For example, an icon, text, or the like indicating that the temporary stop has been performed may be displayed in the foreground image.

The vehicle exterior notification controller 105e and the vehicle interior presentation controller 102e may start the temporary stop vehicle exterior notification and the temporary stop vehicle interior notification at the same timing. This is because the temporary stop vehicle exterior notification and the temporary stop vehicle interior notification, which inform the vehicle that the vehicle is temporarily stopped, are unlikely to confuse the target of the notification even when they start at the same timing. For example, the temporary stop vehicle exterior notification and the temporary stop vehicle interior notification may end when the subject vehicle completes its temporary stop before the crosswalk.

Figure 37:
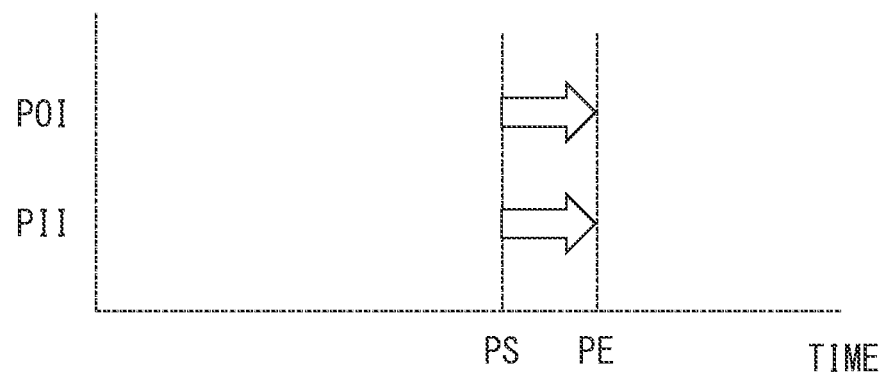
FIG. 37 is a diagram illustrating an example of the timing of a temporary stop vehicle exterior notification and a temporary stop vehicle interior notification when a temporary stop is performed before the crosswalk when making the right or left turn at the intersection during the automated driving.

Here, with reference to FIG. 37, an example of the timing of the temporary stop vehicle exterior notification and the temporary stop vehicle interior notification will be described. In the example, the timings are timings when the temporary stop is performed before the crosswalk when the vehicle turns right or left at the intersection during the automated driving. POI in FIG. 37 indicates the temporary stop vehicle exterior notification, and Pll indicates the temporary stop vehicle interior notification. A POI arrow in FIG. 37 indicates the continuation time of the temporary stop vehicle exterior notification. A P 11 arrow in FIG. 37 indicates the continuation time of the temporary stop vehicle interior notification. PS in FIG. 37 indicates the start timing of the temporary stop before the crosswalk. PE in FIG. 37 indicates the end timing of the temporary stop before the crosswalk. As shown in FIG. 37, the scheduled temporary stop vehicle exterior notification and the scheduled temporary stop vehicle interior notification start at the same timing, when the temporary stop is performed before the crosswalk when making the right or left turn at the intersection during the automated driving. Further, at the timing when this temporary stop ends, the temporary stop vehicle exterior notification and the temporary stop vehicle interior notification also end.

Seventh Embodiment

The configuration of the following seventh embodiment may be applied. In the configuration of the seventh embodiment, the vehicle exterior notification devices 19, 19b, and 19d that provide vehicle exterior notification are at least the vehicle exterior displays 191, 191b, and 191d. In the configuration of the seventh embodiment, when the high beam of the high beam and low beam is used as the headlight of the subject vehicle, the vehicle exterior notification controllers 105, 105a, 105b, 105c, 105d, and 105e increase the brightness of the vehicle exterior notification as compared with a case of using the low beam. According to this, it is possible to prevent the vehicle exterior notification from being too bright while the low beam is in use, and to make it easy to see the vehicle exterior notification while the high beam is in use. The high beams may be called traveling headlights. The low beams may be also called passing headlights. The optical axis of high beams is tilted upwards of the subject vehicle compared to low beams.

Eighth Embodiment

The configuration of the following eighth embodiment may be applied. Also in the configuration of the eighth embodiment, the vehicle exterior notification devices 19, 19b, and 19d that provide vehicle exterior notification are at least the vehicle exterior displays 191, 191b, and 191d. In the configuration of the eighth embodiment, the vehicle exterior notification controllers 105, 105a, 105b, 105c, 105d, and 105e increase the brightness of the vehicle exterior notification when the lane in which the subject vehicle is traveling is the passing lane, compared to when it is not the passing lane. The traveling lane of the subject vehicle may be identified by the state identification units 104, 104a, 104b, 104c, 104d, and 104e by monitoring the automated driving ECUs 17, 17b, and 17d. When the subject vehicle is performing the automated driving, the system of the subject vehicle complies with the speed limit even in the passing lane. Therefore, the traveling speed of the subject vehicle may seem slow to the driver of the following vehicle. On the other hand, according to the configuration of the eighth embodiment, when the traveling lane of the subject vehicle is the passing lane, the vehicle exterior notification is made easier to be seen. Thereby, it is possible to prevent the misunderstanding.

Ninth Embodiment

Further, as the vehicle exterior displays 191, 191b, and 191d are used, and the lamp lights toward the outside of the subject vehicle for purposes other than vehicle exterior notification, which is notification of information related to the automated driving. In other words, the existing lamp may be configured to be used also for the vehicle exterior notification. Examples of the existing lamp include a side lamp, a turn lamp, a tail lamp, a brake lamp, a backlight, a number lights, a back fog light, and the like. The tail lamp may also be used as a brake lamp. As the existing lamp that is also used for the vehicle exterior notification, it is preferable to use a lamp that is not frequently flashed for purposes other than the vehicle exterior notification. This is to prevent a situation where the vehicle exterior notification cannot be performed at the timing at which the vehicle exterior notification should be performed. Examples of the existing lamp that is also used for the vehicle exterior notification include the backlight, the side light, a license plate light, the back fog light, and the like. For the existing lamp that is also used for the vehicle exterior notification, confusion can be avoided by, for example, using different hues of lamp colors between the vehicle exterior notification and purposes other than the vehicle exterior notification.

Tenth Embodiment

In the above embodiments, the configuration has been described in which the vehicle exterior notification can be performed by both the vehicle exterior display 191, 191b, and 191d and the audio output device 192. However, the present disclosure is not necessarily limited to this configuration. For example, among the vehicle exterior display 191 and the voice output device 192, only the vehicle exterior display 191 may perform the vehicle exterior notification. Alternatively, among the vehicle exterior display 191 and the audio output device 192, only the audio output device 192 may perform the vehicle exterior notification.

Eleventh Embodiment

In the above embodiments, the configuration has been described in which the vehicle interior notification can be performed by both the display 181 and the audio output device 182. However, the present disclosure is not necessarily limited to this configuration. For example, among the vehicle exterior display 181 and the audio output device 182, only the display 181 may perform the vehicle interior notification. Alternatively, among the display 181 and the audio output device 182, only the audio output device 182 may perform the vehicle interior notification.

Twelfth Embodiment

The embodiments described above show the configuration in which, when the automation level increases, the timing of vehicle exterior notification is changed depending on whether the advance approval has been given. However, the present disclosure is not necessarily limited to the configuration. For example, in the case where the automation level increases, when the increase in the automation level can be predicted in advance, vehicle exterior notification indicating that the automation level will increase or vehicle exterior notification indicating that the automation level has increased may be performed before the automation level increases. On the other hand, in the case where the automation level increases, when the increase in the automation level cannot be predicted in advance and the automation level has increased, the vehicle exterior notification may be performed to indicate that the automation level has increased.

Thirteenth Embodiment

In the above-described embodiments, the configurations have been described in which the HCUs 10, 10a, 10b, 10c, 10d, and 10e perform the functions of the state identification units 104, 104a, 104b, 104c, 104d and 104e, and the vehicle exterior notification controllers 105, 105a, 105b, 105c, 105d, and 105e. However, the present disclosure is not necessarily limited to these configurations. For example, the functions of the state identification units 104, 104a, 104b, 104c, 104d, and 104e, and the vehicle exterior notification controllers 105, 105a, 105b, 105c, 105d, and 105e may be performed by an ECU other than the HCUs 10, 10a, 10b, 10c, 10d, and 10e. As an example, the functions of the state identification units 104, 104a, 104b, 104c, 104d, and 104e and the vehicle exterior notification controllers 105, 105a, 105b, 105c, 105d, and 105e may be performed by the automated driving ECUs 17, 17b, and 17d.

Note that the present disclosure is not limited to the above-described embodiments, and various modifications can be made within the scope indicated in the claims, and embodiments obtained by appropriately combining technical means disclosed in different embodiments are also included in the technical scope of the present disclosure. Further, the controller and the method thereof described in the present disclosure may be implemented by a dedicated computer which includes a processor programmed to perform one or more functions executed by a computer program. Alternatively, the device and the method thereof described in the present disclosure may also be implemented by a dedicated hardware logic circuit. Alternatively, the device and the method thereof described in the present disclosure may also be implemented by one or more dedicated computers configured as a combination of a processor executing a computer program and one or more hardware logic circuits. Furthermore, the computer program may be stored in a computer-readable non-transition tangible recording medium as an instruction executed by a computer.

The invention claimed is:

1. A vehicle notification control device for a vehicle capable of: performing automated driving at a plurality of automation levels; and switching the plurality of automation levels each indicating a degree of the automated driving, the vehicle notification control device comprising:
a state identification unit configured to identify an automated driving-related state that is a state of the vehicle, the state being related to the automated driving; and
a vehicle exterior notification controller configured to control a vehicle exterior notification device that performs vehicle exterior notification that is notification of information related to the automated driving toward an outside of the vehicle,
wherein
the vehicle exterior notification controller changes an execution timing of the vehicle exterior notification according to the automated driving-related state identified by the state identification unit,
the state identification unit is configured to identify, as the automated driving-related state, at least a factor causing a decrease in the automation level, and
the vehicle notification control device changes the execution timing of the vehicle exterior notification according to the factor causing the decrease using the automated driving-related state identified by the state identification unit, when the automation level decreases.

2. The vehicle notification control device according to claim 1, wherein
the state identification unit is configured to identify, as the automated driving-related state, at least whether an advance approval has been given,
the advance approval is an approval for an increase in the automation level from a driver of the vehicle before the increase becomes possible,
the vehicle notification control device changes the execution timing of the vehicle exterior notification according to whether the advance approval has been given, when the increase in the automation level becomes possible using the automated driving-related state identified by the state identification unit.

3. The vehicle notification control device according to claim 2, wherein
the automated driving includes area limit automated driving that permits automated driving without a monitoring obligation of the driver and is performed in a limited area, and the vehicle notification control device causes the vehicle exterior notification indicating, in advance, a possibility that the automated driving without the monitoring obligation of the driver starts, before the vehicle enters the limited area when the vehicle enters the limited area from an outside of the limited area in a case where the advance approval has been given using the automated driving-related state identified by the state identification unit.

4. The vehicle notification control device according to claim 3, wherein
when the vehicle enters the limited area and the area limit automated driving starts, the vehicle exterior notification controller performs switching to the vehicle exterior notification indicating that the automated driving without the monitoring obligation is being performed.

5. The vehicle notification control device according to claim 2, wherein
the automated driving includes specific situation limit automated driving that permits automated driving without a monitoring obligation of the driver and is performed in a specific situation that is a specific peripheral situation, and
the vehicle notification control device causes the vehicle exterior notification indicating, in advance, a possibility that the automated driving without the monitoring obligation of the driver starts, when a part of condition of the specific situation is satisfied in a case where the advance approval has been given using the automated driving-related state identified by the state identification unit.

6. The vehicle notification control device according to claim 5, wherein
when all of the condition is satisfied and the specific situation limit automated driving starts, the vehicle exterior notification controller performs switching to the vehicle exterior notification indicating that the automated driving without the monitoring obligation is being performed.

7. The vehicle notification control device according to claim 2, wherein
the automated driving includes automated driving without a monitoring obligation of the driver,
the vehicle notification control device is capable of performing the automated driving without the monitoring obligation,
in a case where the advance approval has not been given for the automated driving without the monitoring obligation using the automated driving-related state identified by the state identification unit, when, in a state where the automated driving without the monitoring obligation is possible, the approval has been given from the driver of the vehicle and the automated driving without the monitoring obligation has started, the vehicle exterior notification controller causes the vehicle exterior notification indicating that the automated driving without the monitoring obligation is being performed.

8. The vehicle notification control device according to claim 2, wherein
the automated driving includes automated driving without a monitoring obligation of the driver,
in the automated driving without the monitoring obligation, the driver is permitted not to perform monitoring,
the vehicle notification control device is capable of performing the automated driving without the monitoring obligation,
in a case where the advance approval has not been given for the automated driving without the monitoring obligation using the automated driving-related state identified by the state identification unit, after, in a state where the automated driving without the monitoring obligation is possible, the approval is given from the driver of the vehicle and before the automated driving without the monitoring obligation starts, the vehicle exterior notification controller causes the vehicle exterior notification indicating that the automated driving without the monitoring obligation is being performed.

9. The vehicle notification control device according to claim 1, wherein
the vehicle notification control device is usable for a vehicle in which the automation level decreases after an assistance period in which a system of the vehicle performs a more traveling assistance than a traveling assistance of the decreased automation level, when an override that is an operation intervention by a driver of the vehicle causes the automation level to decrease, and
in a case where the automation level decreases, when the factor causing the decrease in the automation level is the override, the vehicle exterior notification controller performs switching from the vehicle exterior notification at a time of the decrease to a different vehicle exterior notification, using the automated driving-related state identified by the state identification unit after the assistance period has elapsed and the automation level has decreased.

10. The vehicle notification control device according to claim 1, wherein
the vehicle notification control device is usable for a vehicle in which the automation level deceases after providing a driving change request that requests a driving change to a driver of the vehicle, when the automation level decreases due to the driving change caused by determination of a system of the vehicle, and
in a case where the automation level decreases, when the factor causing the decrease in the automation level is the driving change that is scheduled, the vehicle exterior notification controller performs switching from the vehicle exterior notification at a time of the decrease to a different vehicle exterior notification, using the automated driving-related state identified by the state identification unit, before the driving change request is provided.

11. The vehicle notification control device according to claim 10, wherein
in the case where the automation level decreases, when the factor causing the decrease is the scheduled driving change, before the driving change request is provided, using the automated driving-related state identified by the state identification unit, the vehicle exterior notification controller causes the vehicle exterior notification indicating that the automation level is going to decrease in advance, and
when the automation level has decreased, the vehicle exterior notification controller causes a vehicle exterior notification in a different manner from the vehicle exterior notification caused when the vehicle exterior notification does not decrease.

12. The vehicle notification control device according to claim 1, wherein
the vehicle notification control device is usable for a vehicle in which the automation level deceases after providing a driving change request that requests a driving change to a driver of the vehicle, when the automation level decreases due to the driving change caused by determination of a system of the vehicle, and in a case where the automation level decreases and the factor causing the decrease in the automation level is the driving change that is not scheduled, when the driving change request is provided or after the driving change request is provided, the vehicle exterior notification controller performs switching from the vehicle exterior notification at a time of the decrease to a different vehicle exterior notification, using the automated driving-related state identified by the state identification unit.

13. The vehicle notification control device according to claim 1, wherein
the vehicle notification control device is usable for a vehicle in which the automation level decreases due to a brake operation by a driver of the vehicle, and
in a case where the automation level decreases, when the factor causing the decrease is a factor having a type instantly decreasing the automation level, using the automated driving-related state identified by the state identification unit, the vehicle exterior notification controller causes the vehicle exterior notification at an occurrence timing of the factor, and causes the vehicle exterior notification to continue for a predetermined time or more.

14. The vehicle notification control device according to claim 13, wherein
when the factor causing the decrease in the automation level is the factor having the type instantly decreasing the automation level, the vehicle exterior notification controller continues the vehicle exterior notification for a longer time than when the factor causing the decrease in the automation level is a factor caused by a scheduled driving change to the driver of the vehicle.

15. The vehicle notification control device according to claim 1, wherein
the automated driving includes automated driving without a monitoring obligation of a driver of the vehicle,
the vehicle notification control device is capable of performing the automated driving without the monitoring obligation,
the state identification unit identifies at least a start of automated driving without the monitoring obligation and a traveling continuation time of the automated driving without monitoring obligation as the automated driving-related state,
when the state identification unit identifies the start of automated driving without the monitoring obligation, the vehicle exterior notification controller continues the vehicle exterior notification for a first predetermined time, and ends the vehicle exterior notification, and
when the traveling continuation time of the automated driving without the monitoring obligation is identified by the state identification unit and exceeds a second predetermined time longer than the first predetermined time, the vehicle exterior notification controller performs this vehicle exterior notification again.

16. The vehicle notification control device according to claim 1, wherein
the automated driving includes automated driving without a monitoring obligation of a driver of the vehicle,
the vehicle notification control device is capable of performing the automated driving without the monitoring obligation,
the state identification unit identifies at least a start of automated driving without the monitoring obligation and an execution status of a lane change during the automated driving without monitoring obligation as the automated driving-related state,
when the state identification unit identifies the start of automated driving without the monitoring obligation, the vehicle exterior notification controller continues the vehicle exterior notification for a first predetermined time, and ends the vehicle exterior notification,
the vehicle exterior notification controller causes the vehicle exterior notification again, based on identification by the state identification unit, and
the identification is identification of a state where the lane change is to be executed during the automated driving without the monitoring obligation, or a state where the lane change has been executed during the automated driving without the monitoring obligation.

17. The vehicle notification control device according to claim 16, wherein
the state identification unit identifies, as the automated driving-related state, a peripheral situation of the vehicle after the lane change during the automated driving without the monitoring obligation,
the vehicle exterior notification controller causes the vehicle exterior notification again when the state identification unit has identified a state where the lane change has been executed during the automated driving without the monitoring obligation or a state where a different vehicle exists within a predetermined distance in front or rear of the vehicle after completion of the lane change, and
the vehicle exterior notification controller does not cause the vehicle exterior notification again when the state identification unit has identified the state where the lane change has been executed during the automated driving without the monitoring obligation and has not identified the state where the different vehicle exists within the predetermined distance in front or rear of the vehicle after the completion of the lane change.

18. The vehicle notification control device according to claim 16, wherein
when the state identification unit has identified the state where the lane change is to be executed during the automated driving without the monitoring obligation, the vehicle exterior notification controller starts the vehicle exterior notification performed again during the execution of the lane change, and ends the vehicle exterior notification when the lane change is completed, or ends the vehicle exterior notification after a certain time has elapsed from a time when the lane change is completed.

19. The vehicle notification control device according to claim 16, wherein
when the state identification unit identifies the state where the lane change is to be executed during the automated driving without the monitoring obligation, the vehicle exterior notification controller starts the vehicle exterior notification again before a start of the lane change.

20. The vehicle notification control device according to claim 16, further comprising
a monitoring identification unit configured to identify whether a driver of the vehicle is monitoring a periphery of the vehicle,
wherein
when the state identification unit identifies a state where the lane change has been executed during the automated driving without the monitoring obligation, the vehicle exterior notification controller changes a mode of the vehicle exterior notification according to whether the monitoring identification unit has identified whether the driver is monitoring the periphery.

21. The vehicle notification control device according to claim 20, wherein
in a case where the state identification unit identifies the state where the automated lane change has been executed during the automated driving without the monitoring obligation,
when the monitoring identification unit identifies a state where the driver is monitoring the periphery, the vehicle exterior notification controller does not cause the vehicle exterior notification, and
when the monitoring identification unit identifies a state where the driver is not monitoring the periphery, the vehicle exterior notification controller causes the vehicle exterior notification.

22. The vehicle notification control device according to claim 16, wherein
the vehicle exterior notification device is placed at least on a side portion of the vehicle, and performs the vehicle exterior notification by at least one of display or light emission, and
the vehicle exterior notification controller causes the vehicle exterior notification device placed at the side portion of the vehicle to perform the vehicle exterior notification indicating a waiting state, when the state identification unit identifies the waiting state, and
the waiting state is a state where, when the lane change is being executed during the automated driving without the monitoring obligation, the lane change is interrupted and the vehicle is waited.

23. The vehicle notification control device according to claim 22, wherein
the vehicle exterior notification is provided at least on both of a left side portion and a right side portion of the vehicle,
the vehicle exterior notification controller causes only the vehicle exterior notification device placed at a side portion according to the lane change among the left side portion and the right side portion of the vehicle to perform the vehicle exterior notification indicating a waiting state, when the state identification unit identifies the waiting state, and
the waiting state is a state where, when the lane change is being executed during the automated driving without the monitoring obligation, the lane change is interrupted and the vehicle is waited.

24. The vehicle notification control device according to claim 1, further comprising
a vehicle interior notification controller configured to cause a vehicle interior notification device to perform vehicle interior notification that is notification indicating that the vehicle exterior notification has been performed toward an inside of the vehicle.

25. The vehicle notification control device according to claim 24, wherein
the automated driving includes automated driving without a monitoring obligation of a driver of the vehicle,
the vehicle notification control device is capable of performing the automated driving without the monitoring obligation,
the state identification unit identifies at least a start of automated driving without the monitoring obligation and an execution status of a lane change during the automated driving without monitoring obligation as the automated driving-related state,
when the state identification unit identifies the start of automated driving without the monitoring obligation, the vehicle exterior notification controller continues the vehicle exterior notification for a first predetermined time, and ends the vehicle exterior notification,
the vehicle exterior notification controller causes the vehicle exterior notification again, based on identification by the state identification unit,
the identification is identification of a state where the lane change is to be executed during the automated driving without the monitoring obligation, or a state where the lane change has been executed during the automated driving without the monitoring obligation,
the vehicle interior notification controller causes the vehicle interior notification indicating an execution status of the lane change without causing the vehicle interior notification indicating the automation level of the vehicle, based on identification by the state identification unit, and
the identification is identification of a state that the lane change is to be executed during the automated driving without the monitoring obligation, or a state that the lane change has been executed during the automated driving without the monitoring obligation.

26. The vehicle notification control device according to claim 24, wherein
the vehicle exterior notification device is configured to perform the vehicle exterior notification at least by display,
the vehicle interior notification device is configured to display an image showing at least the vehicle, and
the vehicle interior notification controller is configured to cause the vehicle interior notification device to perform the vehicle interior notification by vehicle interior notification display in a vehicle exterior notification area in an image that is displayed by the vehicle interior notification device and indicates the vehicle, and
the vehicle interior notification is similar to the display of the vehicle exterior notification.

27. The vehicle notification control device according to claim 24, wherein
the state identification unit is configured to identify at least a passing situation of a subject vehicle at an intersection during the automated driving as the automated driving-related state,
in a case where the state identification unit identifies a state where a temporary stop is necessary before the subject vehicle enters a crosswalk at a time when the subject vehicle turns right or left at an intersection during the automated driving, the vehicle exterior notification controller causes the vehicle exterior notification indicating that the temporary stop is scheduled, and
in the case where the state identification unit identifies the state where the temporary stop is necessary before the subject vehicle enters the crosswalk at the time when the subject vehicle turns right or left at the intersection during the automated driving, the vehicle interior notification controller causes the vehicle interior notification indicating that the temporary stop is scheduled.

28. The vehicle notification control device according to claim 27, wherein
in the case where the state identification unit identifies the state where the temporary stop is necessary before the subject vehicle enters the crosswalk at the time when the subject vehicle turns right or left at the intersection during the automated driving, the vehicle exterior notification controller starts the vehicle exterior notification after the vehicle interior notification controller starts the vehicle interior notification, and an end timing of the vehicle exterior notification is same as an end timing of the vehicle interior notification.

29. The vehicle notification control device according to claim 27, wherein in a case where the state identification unit identifies the state where the temporary stop is necessary before the subject vehicle enters the crosswalk at the time when the subject vehicle turns right or left at the intersection during the automated driving, the vehicle exterior notification controller causes the vehicle exterior notification indicating that the temporary stop is being performed, in a case where the state identification unit identifies the state where the temporary stop is necessary before the subject vehicle enters the crosswalk at the time when the subject vehicle turns right or left at the intersection during the automated driving, the vehicle interior notification controller causes the vehicle interior notification indicating that the temporary stop is being performed, and a start timing of the vehicle exterior notification indicating that the temporarily stop is being performed is same as a start timing of the vehicle interior notification indicating that the temporarily stop is being performed.

30. A vehicle notification control device for a vehicle capable of: performing automated driving at a plurality of automation levels; and switching the plurality of automation levels each indicating a degree of the automated driving, the vehicle notification control device comprising:

a state identification unit configured to identify an automated driving-related state that is a state of the vehicle, the state being related to the automated driving; and a vehicle exterior notification controller configured to control a vehicle exterior notification device that performs vehicle exterior notification that is notification of information related to the automated driving toward an outside of the vehicle, wherein the vehicle exterior notification controller changes an execution timing of the vehicle exterior notification according to the automated driving-related state identified by the state identification unit, the state identification unit is configured to identify, as the automated driving-related state, at least a peripheral situation of the vehicle during the automated driving, and the vehicle exterior notification controller causes the vehicle exterior notification when the state identification unit has identified a situation where a vehicle-to-vehicle distance between the vehicle during the automated driving and a rear vehicle with respect to the vehicle is less than a threshold continues for a designated time or more.

31. A vehicle notification control device for a vehicle capable of: performing automated driving at a plurality of automation levels; and switching the plurality of automation levels each indicating a degree of the automated driving, the vehicle notification control device comprising:

a state identification unit configured to identify an automated driving-related state that is a state of the vehicle, the state being related to the automated driving; and a vehicle exterior notification controller configured to control a vehicle exterior notification device that performs vehicle exterior notification that is notification of information related to the automated driving toward an outside of the vehicle, wherein the vehicle exterior notification controller changes an execution timing of the vehicle exterior notification according to the automated driving-related state identified by the state identification unit, the vehicle exterior notification device is placed at least on a front portion of the vehicle, and performs the vehicle exterior notification by at least one of display or light emission, the state identification unit is configured to identify, as the automated driving-related state, at least a following situation of the vehicle during the automated driving, and the vehicle exterior notification controller causes the vehicle notification control device placed on the front portion of the vehicle when the state identification unit has identified a situation where the vehicle starts following a preceding vehicle during the automated driving.

32. The vehicle notification control device according to claim 31, wherein the vehicle exterior notification device is configured to perform the vehicle exterior notification at least by light emission, the vehicle exterior notification controller causes the vehicle exterior notification by blink during adjustment of a vehicle speed of the vehicle, and the vehicle exterior notification controller causes the vehicle exterior notification by lighting while the vehicle travels at a constant speed.

33. A vehicle notification control method for a vehicle capable of: performing automated driving at a plurality of automation levels; and switching the plurality of automation levels each indicating a degree of the automated driving, the vehicle notification control method comprising causing at least one processor to:

identify an automated driving-related state that is a state of the vehicle, the state being related to the automated driving;

control a vehicle exterior notification device that performs vehicle exterior notification that is notification of information related to the automated driving toward an outside of the vehicle;

change an execution timing of the vehicle exterior notification according to the identified automated driving-related state;

identify, as the automated driving-related state, at least a factor causing a decrease in the automation level; and change the execution timing of the vehicle exterior notification according to the factor causing the decrease using the identified automated driving-related state, when the automation level decreases.

34. A vehicle notification control device for a vehicle capable of: performing automated driving at a plurality of automation levels; and switching the plurality of automation levels each indicating a degree of the automated driving, the vehicle notification control device comprising:

a processor configured to identify an automated driving-related state that is a state of the vehicle, the state being related to the automated driving;

control a vehicle exterior notification device that performs vehicle exterior notification that is notification of information related to the automated driving toward an outside of the vehicle;
change an execution timing of the vehicle exterior notification according to the identified automated driving-related state;
identify, as the automated driving-related state, at least a factor causing a decrease in the automation level; and
change the execution timing of the vehicle exterior notification according to the factor causing the decrease using the identified automated driving-related state, when the automation level decreases.

\* \* \* \* \*